US007970574B2

(12) United States Patent
Jin

(10) Patent No.: US 7,970,574 B2
(45) Date of Patent: Jun. 28, 2011

(54) SCALABLE SENSOR LOCALIZATION FOR WIRELESS SENSOR NETWORKS

(75) Inventor: Holly Hui Jin, San Jose, CA (US)

(73) Assignee: The Board of Trustees of the Leland Stanford Jr. University, Palo Alto, CA (US)

(*) Notice: Subject to any disclaimer, the term of this patent is extended or adjusted under 35 U.S.C. 154(b) by 1210 days.

(21) Appl. No.: 11/425,699

(22) Filed: Jun. 21, 2006

(65) Prior Publication Data

US 2007/0005292 A1    Jan. 4, 2007

Related U.S. Application Data

(60) Provisional application No. 60/692,717, filed on Jun. 22, 2005.

(51) Int. Cl.
  *G01C 9/00*   (2006.01)
  *H04W 84/18*   (2009.01)
(52) U.S. Cl. ........ 702/150; 702/152; 702/179; 370/254; 370/255; 455/456.1
(58) Field of Classification Search .................. 342/126, 342/458, 463; 701/300–302; 702/92, 94, 702/95, 97, 10, 152, 179; 370/254, 255; 455/456.1
See application file for complete search history.

(56) References Cited

U.S. PATENT DOCUMENTS

| | | | |
|---|---|---|---|
| 5,537,119 A | 7/1996 | Poore, Jr. | |
| 6,064,809 A | 5/2000 | Braatz et al. | |
| 6,704,692 B1 | 3/2004 | Banerjee et al. | |
| 7,006,944 B2* | 2/2006 | Brand | 702/150 |
| 7,460,976 B2* | 12/2008 | Ye et al. | 702/150 |
| 2004/0073360 A1* | 4/2004 | Foxlin | 701/207 |
| 2004/0250207 A1 | 12/2004 | Gilbert et al. | |
| 2005/0080924 A1* | 4/2005 | Shang et al. | 709/239 |
| 2006/0039300 A1* | 2/2006 | Ogier et al. | 370/254 |

OTHER PUBLICATIONS

Pratik Biswas, Yinyu Ye, A Distributed Method for Solving Semidefinite Programs Arising fromAd Hoc Wireless Sensor Network Localization, Oct. 30, 2003, Electrical Engineering, Stanford University, Stanford, CA 94305, pp. 1-18.*
James Aspnes, On the Computational Complexity of Sensor Network Localization, Apr. 7, 2004, Department of Computer Science, Yale University, New Haven, CT 06520-8285, USA.*

(Continued)

*Primary Examiner* — Eliseo Ramos Feliciano
*Assistant Examiner* — Ricky Ngon
(74) *Attorney, Agent, or Firm* — Wong, Cabello, Lutsch, Rutherford & Brucculeri LLP

(57) ABSTRACT

Adaptive rule-based methods to solve localization problems for ad hoc wireless sensor networks are disclosed. A large problem may be solved as a sequence of very small subproblems, each of which is solved by semidefinite programming relaxation of a geometric optimization model. The subproblems may be generated according to a set of sensor/anchor selection rules and a priority list. The methods scale well and provide improved positioning accuracy. A dynamic version may be used for estimating moving sensors locations in a real-time environment. The method may use dynamic distance measurement updates among sensors, and utilizes subproblem solving for static sensor localization. Methods to deploy sensor localization algorithms in clustered distributed environments are also provided, permitting application to arbitrarily large networks. In addition, the methods may be used to solve sensor localizations in 2D or 3D space. A preprocessor may be used for localization of networks without absolute position information.

20 Claims, 31 Drawing Sheets

OTHER PUBLICATIONS

Juan Liu, Information-Directed Routing in Ad Hoc Sensor Networks, Sep. 19, 2003, WSNA '03, San Diego, California, USA.*

Lichun Bao, Topology Management in Ad Hoc Networks, Jun. 1-3, 2003, MobiHoc, Annapolis, Maryland, USA.*

Jian Ma, Anchor-free Localization with Refinement in Sensor Networks, May 27, 2004, Department of Computer Science Hong Kong University of Science and Technology, Clearwater Bay, Kowloon, Hong Kong.*

Ibriq et al., "Cluster-Based Routing in Wireless Sensor Networks: Issues and Challenges", 2004, SPECTS, pp. 759-766.*

Ji et al., "Sensor Positioning in Wireless Ad-hoc Sensor Networks Using Multidimensional Scaling", 2004, IEEE INFOCOM, pp. 1-10.*

Alfakih, et al.; "Solving Euclidean distance matrix completion problems via semidefinite programming;" Comput. Optim. Appl., 12(1-3) (1999), pp. 13-30. Computational optimization—a tribute to Olvi Mangasarian, Part I.

Benson, et al.; "Solving Large-Scale Sparse Semidefinite Programs for Combinatorial Optimization;" SIAM Journal on Optimization; 10(2): 443-461, 2000.

Bertsimas, et al.; "Semidefinite Relaxations, Multivariate Normal Distributions, and Order Statistics;" Handbook of Combinatorial Optimization; 3:1-19, 1998.

Biswas, et al.; "Semidefinite Programming for Ad Hoc Wireless Sensor Network Localization;" IPSN 2004; Berkeley, CA; Apr. 26-27, 2004.

Biswas, et al.; "A Distributed Method for Solving Semidefinite Programs Arising from Ad Hoc Wireless Wensor Network Localization;" Working Paper, Departments of EE and MS&E, Stanford University, CA, Oct. 30, 2003.

Boyd, et al.; "Linear Matrix Inequalities in System and Control Theory;" SIAM, Philadelphia, 1994.

Bulusu, et al.; "GPS-less low cost outdoor localization for very small devices;" Technical Report 00-729, Computer Science Department, University of Southern California, CA, Apr. 2000.

Capkun, et al.; "GPS—Free Positioning in Mobile Ad-Hoc Networks;" Proceedings of the 34th Hawaii International Conference On System Sciences, 2001.

Carter, et al.; "Spaseloc: An Adaptive Subproblem Algorithm For Scalable Wireless Sensor Network Localization;" SIAM J. On Optimization, Submitted Dec. 2004.

Cha; "Electronic Tracking Is Finding New Uses;" San Jose Mercury News, Sunday, Jan. 16, 2005.

Culler, et al.; "Wireless sensor networks;" Communications of the ACM, 47(6), Jun. 2004, pp. 30-33.

Doherty, et al.; "Convex Position Estimation in Wireless Sensor Networks;" Proc. IEEE Infocom 2001, Anchorage, AK, Apr. 2001, pp. 1655-1663.

Drozdiak; "Automotive Alternative: In German Port City, Cheap, Efficient Car Rentals Catch On;" Washington Post, Sep. 20, 1999, p. A09.

Ganesan, et al.; "An Empirical Study Of Epidemic Algorithms in Large-Scale Multihop Wireless Networks;" Report UCLA/CSD-TR-02-0013, Computer Science Department, UCLA, CA, 2002.

Heinzelman, et al.; "An Application-Specific Protocol Architecture for Wireless Microsensor Networks;" IEEE Transactions on Wireless Communications, 1(4) (Oct. 2002).

Hightower, et al.; "Location Systems for Ubiquitous Computing;" IEEE Computer, 34(8) (2001), pp. 57-66.

Howard, et al.; "Relaxation on a Mesh: A Formalism for Generalized Localization;" Proc. IEEE/RSJ International Conf. on Intelligent Robots and Systems (IROS01), 2001, pp. 1055-1060.

Jin, et al.; "Scalable algorithms for sensor localization;" First-Equal Prize Winner in Showcase Your Research, Stanford-Berkeley Innovators' Challenge competition, Stanford University, Apr. 19, 2005.

Laurent; "Matrix Completion Problems;" The Encyclobedia of Optimization; 3:221-229, 2001.

Lawlor; "Small systems, big business;" Signal Magazine, Jan. 2005.

Lu; "Coordination Layer Control and Decision Making for Automated Ground Vehicles;" Proceedings of the American Control Conference, Anchorage, May 8-10, 2002, pp. 3034-3039.

McMillan; "Car Sharing's Time Comes" CNN Money, Jul. 19, 2000.

Moore, et al.; "Robust Distributed Network Localization with Noisy Range Measurements;" SenSys'04, Nov. 3-5, 2004, Baltimore, Maryland, USA.

Moré, et al.; "Distance Geometry Optimization For Protein Structures;" J. Global Optim., 15(3) (1999), pp. 219-234.

Moré, et al.; "Global Continuation for Distance Geometry Problems;" SIAM Journal on Optimization; 7:814-836, 1997.

Niculescu, et al.; "Ad Hoc Positioning System;" IEEE GlobeCom, Nov. 2001, pp. 2926-2931.

Niculescu, et al.; "DV Based Positioning in Ad Hoc Networks;" Kluwer Journal of Telecommunicaton Systems, 2003, pp. 267-280.

Ricadela; "Sensors Everywhere: A 'bucket brigade' of tiny, wirelessly networked sensors someday may be able to track anything, anytime, anywhere;" Information Week, Jan. 24, 2005.

Savarese, et al.; "Robust Positioning Algorithm for Distributed Ad Hoc Wireless Sensor Networks;" USENIX Technical Annual Conf., Monterey, CA, Jun. 2002.

Savvides, et al.; "Dynamic Fine-Grained Localization in Ad Hoc Networks of Sensors;" ACM/IEEE International Conf. on Mobile Computing and Networking (MOBICON), Jul. 2001, pp. 166-179.

Savvides, et al.; "The Bits and Flops of the N-Hop Multilateration Primitive for Node Localization Problems;" 1st ACM International Workshop on Wireless Sensor Networks and Applications (WSNA'02); Atlanta, GA, 2002; ACM Press; pp. 112-121.

Shang, et al.; "Localization From Mere Connectivity;" MobiHoc 2003, Anapolis, MD, Jun. 2003, ACM Press.

Singh, et al.; "Wireless LAN Performance Under Varied Stress Conditions in Vehicular Traffic Scenarios;" Technical Report, Department of Electrical Engineering, Stanford University, CA, and Robert Bosch Coorporation, Research and Technology Center, Palo Alto, CA.

So, et al.; "Theory of Semidefinite Programming for Sensor Network Localization;" Stanford University, CA, 2004, to appear in SODA 2005.

Sturm; "Let SeDuMi Seduce you too!" http://fewcal.kub.nl/sturm/software/sedumi.html; Oct. 2001.

Szewczyk, et al.; "Habitat Monitoring With Sensor Networks;" Communications of the ACM, 47(6), Jun. 2004, pp. 34-44.

Williams, et al.; "Constrained Global Optimization for Estimating Molecular Structure From Atomic Distances;" J. Computational Biology, 8 (2001), pp. 523-547.

Wu, et al.; "An Updated Geometric Build-Up Algorithm for Molecular Distance Geometry Problems With Sparse Distance Data;" preprint, University of Iowa, 2005.

Xue, et al.; "An Efficient Algorithm for Minimizing a sum of Euclidean Norms With Applications;" SIAM Journal on Optimization; 7:1017-1036, 1997.

Zou, et al.; "A Stochastic/Perturbation Global Optimization Algorithm for Distance Geometry Problems;" Technical Report; Dept. of Computer Science; University of Colorado; Boulder, CO; 1996.

* cited by examiner

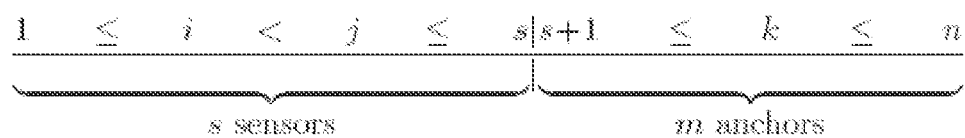
FIG. 1
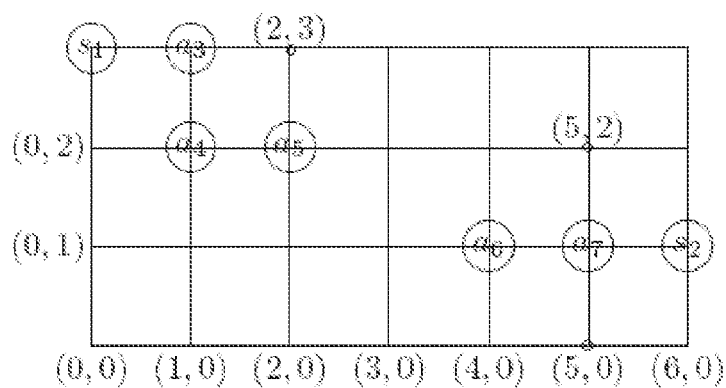
FIG. 3
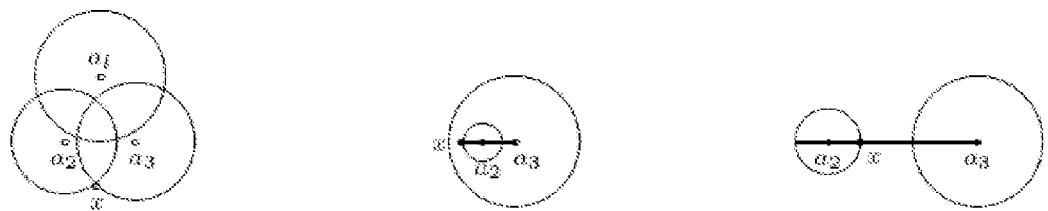
*FIG. 4A*   *FIG. 4B*   *FIG. 4C*

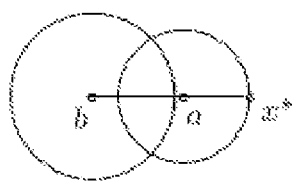
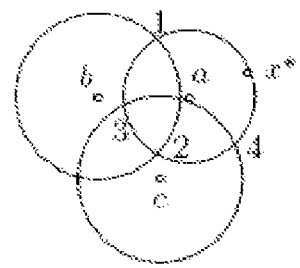
*FIG. 5A*  *FIG. 5B*
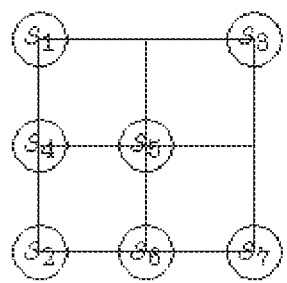
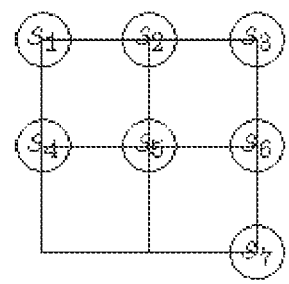
*FIG. 6A*  *FIG. 6B*

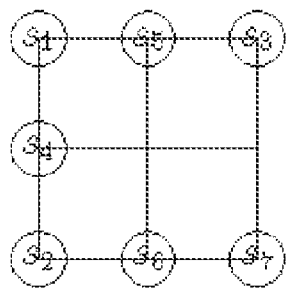
*FIG. 7A*
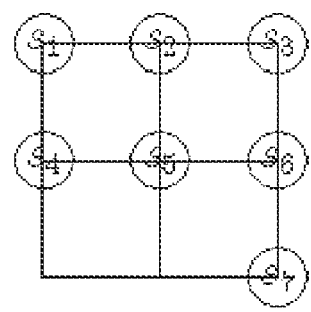
*FIG. 7B*
*FIG. 8*

$$dist = \begin{bmatrix} 0 & 1 & 0 & 0 & 1 & \sigma & 0 & 0 & 0 & 0 & 0 & 0 & 0 & 0 & 0 \\ 1 & 0 & 1 & 0 & \sigma & 1 & \sigma & 0 & 0 & 0 & 0 & 0 & 0 & 0 & 0 \\ 0 & 1 & 0 & 1 & 0 & \sigma & 1 & \sigma & 0 & 0 & 0 & 0 & 0 & 0 & 0 \\ 0 & 0 & 1 & 0 & 0 & 0 & \sigma & 1 & 0 & 0 & 0 & 0 & 0 & 0 & 0 \\ 1 & \sigma & 0 & 0 & 0 & 1 & 0 & 0 & 1 & \sigma & 0 & 0 & 0 & 0 & 0 \\ \sigma & 1 & \sigma & 0 & 1 & 0 & 1 & 0 & \sigma & 1 & \sigma & 0 & 0 & 0 & 0 \\ 0 & \sigma & 1 & \sigma & 0 & 1 & 0 & 1 & 0 & \sigma & 1 & \sigma & 0 & 0 & 0 \\ 0 & 0 & \sigma & 1 & 0 & 0 & 1 & 0 & 0 & 0 & \sigma & 1 & 0 & 0 & 0 \\ 0 & 0 & 0 & 0 & 1 & \sigma & 0 & 0 & 0 & 1 & 0 & 0 & 1 & \sigma & 0 & 0 \\ 0 & 0 & 0 & 0 & \sigma & 1 & \sigma & 0 & 1 & 0 & 1 & 0 & \sigma & 1 & \sigma & 0 \\ 0 & 0 & 0 & 0 & 0 & \sigma & 1 & \sigma & 0 & 1 & 0 & 1 & 0 & \sigma & 1 & \sigma \\ 0 & 0 & 0 & 0 & 0 & 0 & \sigma & 1 & 0 & 0 & 1 & 0 & 0 & 0 & \sigma & 1 \\ 0 & 0 & 0 & 0 & 0 & 0 & 0 & 0 & 1 & \sigma & 0 & 0 & 0 & 1 & 0 & 0 \\ 0 & 0 & 0 & 0 & 0 & 0 & 0 & 0 & \sigma & 1 & \sigma & 0 & 1 & 0 & 1 & 0 \\ 0 & 0 & 0 & 0 & 0 & 0 & 0 & 0 & 0 & \sigma & 1 & \sigma & 0 & 1 & 0 & 1 \\ 0 & 0 & 0 & 0 & 0 & 0 & 0 & 0 & 0 & 0 & \sigma & 1 & 0 & 0 & 1 & 0 \end{bmatrix}$$

FIG. 11

× Errors using Full SDP
* Errors using Subproblem approach (a) Number of 3-anchor clusters = 2.

FIG. 20A

(b) Number of 3-anchor clusters = 3.

FIG. 20B

(c) Number of 3-anchor clusters = 4.

FIG. 20C

(d) Number of 3-anchor clusters = 5.

FIG. 20D

(e) Number of 3-anchor clusters = 6.

FIG. 20E

(f) Number of 3-anchor clusters = 7.

FIG. 20F

(g) Number of 3-anchor clusters = 8.

FIG. 20G

(h) Number of 3-anchor clusters = 9.

FIG. 20H

(i) Number of 3-anchor clusters = 12.

(j) Number of 3-anchor clusters = 13.

(k) Number of 3-anchor clusters = 17.

(l) Number of 3-anchor clusters = 20.

SCALABLE SENSOR LOCALIZATION FOR WIRELESS SENSOR NETWORKS

CROSS-REFERENCE TO RELATED APPLICATIONS

This application is related to Application No. 60/692,717 entitled "Scalable Sensor Localization Algorithms for Wireless Sensor Networks," which was filed on Jun. 22, 2005. The benefit of priority under 35 U.S.C. §119(e) is hereby claimed. The contents of Application No. 60/692,717 are hereby incorporated by reference.

This application is also related to co-pending application Ser. No. 10/864,836 entitled "Semi-Definite Programming Method for Ad Hoc Network Node Localization," which was filed on Jun. 9, 2004. The contents of application Ser. No. 10/864,836 are hereby incorporated by reference.

BACKGROUND OF THE INVENTION

1. Field of the Invention

The present invention relates generally to node position determination in a network, and more particularly, to systems, methods, and software for determining location of sensors in wireless sensor networks.

2. Related Art

Ad hoc wireless sensor networks involve hundreds or thousands of small, inexpensive devices (sensors) that can communicate with neighboring devices within a limited radio range. The devices include a sensing ability, computational ability, and bi-directional wireless communications ability, and may sometimes include a power supply. By relaying information to each other, they can transmit signals to a command post anywhere within the network.

Wireless sensing devices are used to detect any of a variety of parameters, including without limitation environmental (e.g., pressure, humidity, light, temperature, etc.), motion or force (e.g., acceleration, rotation, microphone, piezoresistive strain, vibration, position, etc.), electromagnetic (e.g., magnetometers, antenna, cameras, etc.), and chemical or biological (e.g., chemical composition, presence or absence of agents, etc.) data. They are used in a wide variety of applications such as agriculture, weather, aerospace, military, environment or industrial control and monitoring, wildlife monitoring, security monitoring, inventory control, and many others. For example, California Edison's Nuclear Generating Station in San Onofre, Calif. has deployed wireless mesh networked sensors from Dust Networks to obtain real-time trend data. The data are used to predict which motors are about to fail, so they can be preemptively rebuilt or replaced during scheduled maintenance periods. The use of a wireless sensor network therefore saves the station money and avoids potential machine shutdown. Implementation of a sensor localization algorithm would provide a service that eliminates the need to record every sensor's location and its associated ID number in the network.

Wireless sensor networks are potentially important enablers for many other advanced applications. By 2008, there could be 100 million wireless sensors in use, up from about 200,000 in 2005, according to the market-research company Harbor Research. The worldwide market for wireless sensors, it says, will grow from $100 million in 2005 to more than $1 billion by 2009. This is motivating great effort in academia and industry to explore effective ways to build sensor networks with feature-rich services.

In order to make practical use of the data collected by the sensors, the location of each sensor in the network is desired. Accurate locations are typically known for only some of the sensors (which are referred to as anchors) in a wireless sensor network. One approach to localizing sensors with unknown locations is to use known anchor locations and distance measurements that neighboring sensors and anchors obtain among themselves. Sensor locations are estimated using a sparse data matrix of noisy distance measurements. This leads to a large, non-convex, constrained optimization problem. Large networks may contain many thousands of sensors, whose locations are desired to be determined accurately and quickly.

Prior sensor localization methods include use of the satellite-based global positioning system (GPS), triangulation-based multidimensional scaling, convex optimization, and semidefinite programming (SDP) relaxation. Detailed information regarding the prior art methods may be found in the following: J. Hightower and G. Borriello, Location systems for ubiquitous computing, IEEE Computer, 34(8) (2001), pp. 57-66; L. Doherty, L. El Ghaoui, and K. Pister, Convex position estimation in wireless sensor networks, Proc. IEEE Infocom 2001, Anchorage, Ak., April 2001, pp. 1655-1663; and P. Biswas and Y. Ye, Semidefinite programming for ad hoc wireless sensor network localization, IPSN 2004, Berkeley, Calif., Apr. 26-27, 2004.

GPS-based localization suffers from many drawbacks. For example, a GPS-based system is typically very expensive to deploy because the devices using it are more costly. In addition, GPS can be less accurate. Without the use of specialized equipment, normal GPS can pinpoint subject locations with approximately five-meter accuracy. In addition, GPS localization requires line of sight, thus limiting its use to an outdoor environment. Furthermore, for certain applications that require high security, GPS could compromise that requirement through its use of satellite communication. Moreover, due to satellite communication delay, use of GPS might not be an effective method for real-time tracking of moving sensors.

Non-GPS-based methods also suffer from various drawbacks. A significant drawback is that the prior methods are not suitable for large-scale networks. The performance deteriorates rapidly as the network increases in size. The execution times are not fast enough for real-time applications. Another problem is the lack of an indication of the accuracy of each position estimation. Without the knowledge of how accurate the position estimation is, the use of the resulting estimation is very limited. In addition, most triangulation-based methods require the unknown point to be within detecting range of at least three reference points whose locations are already known.

A need therefore exists for a system, method, and software for sensor localization that overcomes the limitations of the prior art. It would be desirable to have non-GPS-based localization algorithms that are effective for the large-scale networks, with minimal localization errors while achieving the efficiency desired for real-time environments.

SUMMARY OF THE INVENTION

It would desirable in most instances to minimize errors in the estimated sensor locations. It would also be desirable in some instances to localize sensors quickly enough for real-time applications. It would also be desirable in some instances to allow for large-scale deployment, such as tens of thousands of nodes.

To determine sensor localization in a network, which may be a large network of tens of thousands of sensors, an iterative process is provided which estimates only a portion of the total sensors' locations at each iteration. Some anchors and sensors may be chosen according to an intelligent rule set. They form a sensor localization subproblem that is fed back to the full problem, and the algorithm iterates again until all sensors are localized. Embodiments of the present invention can solve small or large problems more accurately with improved scalability over the prior art. With the inventive tools in hand, a dynamic sensor localization method may be provided to track hundreds or thousands of sensors moving within a larger network. Distributed methods for deployment in arbitrarily large systems may also be performed. A 3D version extends its utility even further. A preprocessor may be provided to solve anchorless network sensor localizations.

In accordance with the principles of various embodiments of the present invention, at each iteration, a subset of the unpositioned sensors and anchors is selected. The selected subsensors and subanchors, together with their known distance measurements and known anchors' locations, form a sub SDP relaxation model, which may be solved according to the method disclosed in U.S. application Ser. No. 10/864,836.

The subsensors and subanchors for each subproblem may be chosen dynamically according to intelligent rule sets. Rather than using predefined data, every new iteration's subproblem generation is based on the previous iteration's results. The resulting SDP subproblems are of varying but limited size. Each subproblem determines the final estimate of the associated sensor positions. Each subproblem may be chosen in a way that the subproblem satisfies the optimality condition as much as possible such that the resulting solutions are substantially exact (or close to exact under noise condition) locations of the nodes.

In accordance with various embodiments of the present invention, a method for estimating positions of wireless sensors in a wireless sensor network is provided. The method includes obtaining pair-wise distance measurements between a sensor whose position is unknown and an anchor sensor whose position is known and between sensors whose positions are unknown. The method also include formulating a subproblem to include a subset of anchor sensors whose positions are known and to further include a subset of sensors whose positions are unknown. The method further include determining positions of at least one of the subset of sensors by solving the subproblem using a semidefinite programming relaxation. The method also includes classifying the sensor whose position has been determined within a tolerable error as a new anchor sensor. The steps are iteratively repeated in order to estimate positions of all or substantially all of the wireless sensors in the network. The method may be adapted for 2D or 3D networks. The method may be adapted for static or dynamic networks. The method may be adapted for a distributed environment. The method may be used with large networks, including networks of thousands or tens of thousands of sensors.

In accordance with other various embodiments of the present invention, a method for estimating relative positions of wireless sensors in an anchorless network is provided. For each sensor in the network, a pair-wise distance measurement between each sensor and a neighboring sensor is obtained. The method includes selecting at least three surrogate anchor sensors. A position for one of the surrogate anchor sensors is assigned, and positions for the other surrogate anchor sensors are determined. The subproblem is formulated and solved in an iterative fashion.

In accordance with various other embodiments of the present invention, a machine-readable medium having machine-executable instructions for performing any of the described methods may be provided.

In accordance with various other embodiments of the present invention, a wireless sensor network is provided, comprising a plurality of nodes and a control station. The plurality of nodes comprises sensors with known positions and anchor sensors with unknown positions. Each node comprises a network interface operable to exchange data with one or more other nodes. The control station is operable to determine at least one distance between two sensors whose positions are unknown. The control station is operable to determine at least one distance between one of the sensors whose position is unknown and one of the anchor sensors whose position is known. The control station comprises a control module operable to formulate and solve a subproblem in an iterative fashion.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 1 depicts indexing of sensors and anchors.

FIG. 3 depicts an exemplary plot of sensors, wherein the sensors have connections to at most two anchors.

FIG. 4A depicts an exemplary plot of sensors, wherein a sensor has two anchors' circles intersecting.

FIG. 4B depicts an exemplary plot of sensors wherein a sensor has an anchor's circle in another anchor's circle.

FIG. 4C depicts an exemplary plot of sensors, wherein a sensor has two anchor's circles disjointed.

FIG. 5A depicts an exemplary plot of sensors, wherein a sensor has one anchor connection and one neighboring anchor.

FIG. 5B depicts an exemplary plot of sensors, wherein a sensor has one anchor connection and two neighboring anchors.

FIG. 6A depicts an exemplary plot of moving sensors at time t.

FIG. 6B depicts an exemplary plot of moving sensors at time t+1.

FIG. 7A depicts an exemplary plot of sensors moving at the same speed at time t.

FIG. 7B depicts an exemplary plot of sensors moving at the same speed at time t+1.

FIG. 8 depicts an exemplary plot of sensors with clusters.

FIG. 11 depicts an exemplary table of pair-wise measurements in an anchorless network.

FIG. 20A depicts an exemplary plot of sensors with two three-anchor clusters.

FIG. 20B depicts an exemplary plot of sensors with three three-anchor clusters.

FIG. 20C depicts an exemplary plot of sensors with four three-anchor clusters.

FIG. 20D depicts an exemplary plot of sensors with five three-anchor clusters.

FIG. 20E depicts an exemplary plot of sensors with six three-anchor clusters.

FIG. 20F depicts an exemplary plot of sensors with seven three-anchor clusters.

FIG. 20G depicts an exemplary plot of sensors with eight three-anchor clusters.

FIG. 20H depicts an exemplary plot of sensors with nine three-anchor clusters.

FIG. 20I depicts an exemplary plot of sensors with twelve three-anchor clusters.

FIG. 20J depicts an exemplary plot of sensors with thirteen three-anchor clusters.

FIG. 20K depicts an exemplary plot of sensors with seventeen three-anchor clusters.

FIG. 20L depicts an exemplary plot of sensors with twenty three-anchor clusters.

DETAILED DESCRIPTION OF THE INVENTION

Figure 2:
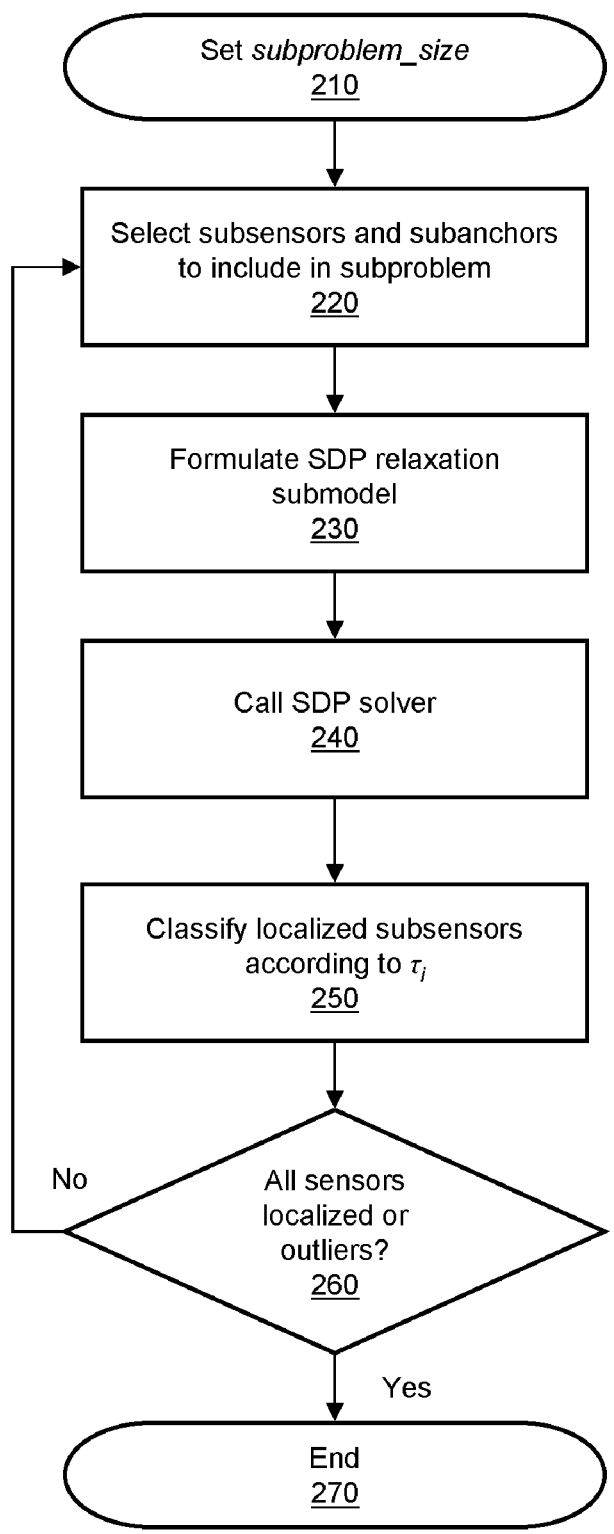
FIG. 2 depicts a process flow diagram for an exemplary method of sensor localization in accordance with one embodiment of the present invention.

Reference is now made to FIG. 1, which depicts an indexing of s sensors and m anchors in a network. The total number of points, or nodes, n in the network is as follows:

$$n = s + m \qquad \text{Eq. 1}$$

The unknown points are s sensors, whose locations $x_i$ are determined as follows:

$$x_i \in R^2, i=1,\ldots,s \qquad \text{Eq. 2}$$

The known points are m anchors whose locations $a_k$ are known, as follows:

$$a_k \in R^2, k=s+1,\ldots,n \qquad \text{Eq. 3}$$

Index k is specific for indexing anchors, as shown in FIG. 1.

The known distance measurements include the nonzero elements of a sparse matrix $\hat{d}$ containing the readings of certain ranging devices for estimating the distance between two points, where $\hat{d}_{ij}$ is the distance measurement between two sensors $x_i$ and $x_j$, wherein ($i < j \leq s$), and $\hat{d}_{ik}$ is the distance measurement between a sensor $x_i$ and an anchor $a_k$, wherein ($i \leq s < k$).

Distance measurements can include the distance information between two anchor points. Distance measurements can also include the distance measurement between two sensors (i and j) with unknown positions. Distance measurements can also include the distance measurement between sensor i and anchor k with known position. The Euclidean distance between two vectors v and w is defined to be $\|v-w\|$, where $\|\cdot\|$ means the 2-norm. Nodes are referred to as connected if the associated measurements $\hat{d}_{ij}$ or $\hat{d}_{ik}$ exist. The remaining elements of the distance matrix d are zero. If a measurement does exist between node i and j but it is zero (i and j are at the same spot), $\hat{d}_{ij}$ is not set to zero; it is set to machine precision $\epsilon$ instead to distinguish from the case of $\hat{d}_{ij}=0$ when two nodes' distance is beyond the sensor device's measuring range.

Thus, the problem of solving locations of all sensors in a wireless sensor network considers the total number of nodes, the number of unknown sensors, the number of known anchors, and known distance measurements as inputs. The output includes the locations $x_i$ for s sensors.

In the Subproblem SDP model, sets $N_1$, $\overline{N}_1$, $N_2$, and $\overline{N}_2$ are defined as follows:

$N_1$ includes pairwise sensors (i,j) if i<j and there exists a distance measurement $\hat{d}_{ij}$ between sensor i and sensor j:

$$N_1 = \{(i,j) \text{ with known } \hat{d}_{ij} \text{ and } i<j\}. \qquad \text{Eq. 4}$$

$\overline{N}_1$ includes pairwise sensors (i,j) with unknown measurement $\hat{d}_{ij}$ and i<j:

$$\overline{N}_1 = \{(i,j) \text{ with unknown } \hat{d}_{ij} \text{ and } i<j\}. \qquad \text{Eq. 5}$$

$N_2$ includes pairs of sensor i and anchor k if there exists a distance measurement $\hat{d}_{ik}$ between sensor i and anchor k:

$$N_2 = \{(i,k) \text{ with known } \hat{d}_{ik}\}. \qquad \text{Eq. 6}$$

$\overline{N}_2$ includes pairs of sensor i and anchor k with unknown measurement $\hat{d}_{ik}$:

$$\overline{N}_2 = \{(i,k) \text{ with unknown } \hat{d}_{ik}\}. \qquad \text{Eq. 7}$$

The full set of nodes and pair-wise distance measurements form a graph $G = \{V, E\}$, where $V = \{1, 2, \ldots, s, s+1, \ldots, n\}$ and $E = N_1 \cup N_2$.

Lower bounds $r_{ij}$ or $r_{ik}$ are imposed if $(i,j) \in \overline{N}_1$ or if $(i,k) \in \overline{N}_2$. Typically each $r_{ij}$ or $r_{ik}$ value is the radio range (also known as radius) within which the associated sensors can detect each other.

The difference between the measured squared distance $(\hat{d}_{ij})^2$ and the squared Euclidean distance $\|x_i - x_j\|^2$ from sensor i to sensor j is $\alpha_{ij}$. Also, $\alpha_{ik}$ is the difference between the measured squared distance $(\hat{d}_{ik})^2$ and the squared Euclidean distance $\|x_i - a_k\|^2$ from sensor i to anchor k. A solution $x_i$ is sought for which the magnitude of these differences is small.

Thus, the sensor localization problem can be formulated as minimizing the $l_1$ norm of the squared-distance errors $\alpha_{ij}$ and $\alpha_{ik}$ subject to mixed equality and inequality constraints:

$$\underset{x_i, x_j, \alpha_{ij}, \alpha_{ik}}{\text{minimize}} \sum_{(i,j) \in N_1} |\alpha_{ij}| + \sum_{(i,k) \in N_2} |\alpha_{ik}| \qquad \text{Eq. 8}$$

$$\begin{aligned}
\text{subject to } \|x_i - x_j\|^2 - \alpha_{ij} &= (\hat{d}_{ij})^2, & \forall (i,j) \in N_1, \\
\|x_i - a_k\|^2 - \alpha_{ik} &= (\hat{d}_{ik})^2, & \forall (i,k) \in N_2, \\
\|x_i - x_j\|^2 &\geq r_{ij}^2, & \forall (i,j) \in \overline{N}_1, \\
\|x_i - a_k\|^2 &\geq r_{ik}^2, & \forall (i,k) \in \overline{N}_2, \\
x_i, x_j \in \mathcal{R}^2, \quad \alpha_{ij}, \alpha_{ik} &\in \mathcal{R}, \\
i, j = 1, \ldots, s, \quad k = s+1, \ldots, n,
\end{aligned}$$

The above model is a non-convex constrained optimization problem. The distance model in Eq. 8 is reformulated into Eq. 9 by introducing matrix variables as follows:

$$\text{minimize} \sum_{(i,j) \in N_1} (\alpha_{ij}^+ + \alpha_{ij}^-) + \sum_{(i,k) \in N_2} (\alpha_{ik}^+ + \alpha_{ik}^-) \qquad \text{Eq. 9}$$

$$\begin{aligned}
\text{subject to } e_{ij}^T Y e_{ij} - \alpha_{ij}^+ + \alpha_{ij}^- &= (\hat{d}_{ij})^2, \forall (i,j) \in N_1, \\
\begin{pmatrix} e_i \\ -a_k \end{pmatrix}^T \begin{pmatrix} Y & X^T \\ X & I \end{pmatrix} \begin{pmatrix} e_i \\ -a_k \end{pmatrix} - \alpha_{ik}^+ + \alpha_{ik}^- &= (\hat{d}_{ik})^2, \forall (i,k) \in N_2, \\
e_{ij}^T Y e_{ij} &\geq r_{ij}^2, \forall (i,j) \in \overline{N}_1, \\
\begin{pmatrix} e_i \\ -a_k \end{pmatrix}^T \begin{pmatrix} Y & X^T \\ X & I \end{pmatrix} \begin{pmatrix} e_i \\ -a_k \end{pmatrix} &\geq r_{ik}^2, \forall (i,k) \in \overline{N}_2, \\
Y &= X^T X, \\
\alpha_{ij}^+, \alpha_{ij}^-, \alpha_{ik}^+, \alpha_{ik}^- &\geq 0, \\
i, j = 1, \ldots, s, k = s+1, \ldots n,
\end{aligned}$$

where: $X = (x_1 \; x_2 \; \ldots \; x_s)$ is a $2 \times s$ matrix to be determined; $e_{ij}$ is a zero column vector except for 1 in location i and –1 in location j, so that $$\|x_i - x_j\|^2 = e_{ij}^T X^T X e_{ij}; \qquad \text{Eq. 10}$$

$e_i$ is a zero column vector except for 1 in location i, so that $$\|x_i - a_k\|^2 = \begin{pmatrix} e_i \\ -a_j \end{pmatrix}^T (X \; I)^T (X \; I) \begin{pmatrix} e_i \\ -a_k \end{pmatrix}; \qquad \text{Eq. 11}$$

Y is defined to be $X^T X$; and
the substitutions $\alpha_{ij} = \alpha_{ij}^+ - \alpha_{ij}^-$ and $\alpha_{ik} = \alpha_{ik}^+ - \alpha_{ik}^-$ are made to deal with $|\alpha_{ij}|$ and $|\alpha_{ik}|$ in the normal way.

The constraint $Y = X^T X$ may be relaxed to $Y \succeq X^T X$, for which an equivalent matrix inequality is:

$$Z_I \equiv \begin{pmatrix} Y & X^T \\ X & I \end{pmatrix} \succeq 0. \qquad \text{Eq. 12}$$

With the definitions $$A_I = \begin{pmatrix} 0 & 0 & 0 \\ 1 & 0 & 1 \\ 0 & 1 & 1 \end{pmatrix}, b_I = \begin{pmatrix} 1 \\ 1 \\ 2 \end{pmatrix}, \qquad \text{Eq. 13}$$

where 0 in $A_I$ is a zero column vector of dimension s, Eq. 11 is relaxed to a linear SDP:

$$\text{minimize} \sum_{(i,j) \in N_1} (\alpha_{ij}^+ + \alpha_{ij}^-) + \sum_{(i,k) \in N_2} (\alpha_{ik}^+ + \alpha_{ik}^-) \qquad \text{Eq. 14}$$

subject to $$\begin{aligned}
\text{diag}(A_I^T Z A_I) &= b_I, \\
\begin{pmatrix} e_{ij} \\ 0 \end{pmatrix}^T Z \begin{pmatrix} e_{ij} \\ 0 \end{pmatrix} - \alpha_{ij}^+ + \alpha_{ij}^- &= (\hat{d}_{ij})^2 \; \forall (i,j) \in N_1, \\
\begin{pmatrix} e_i \\ -a_k \end{pmatrix}^T Z \begin{pmatrix} e_i \\ -a_k \end{pmatrix} - \alpha_{ik}^+ + \alpha_{ik}^- &= (\hat{d}_{ik})^2 \; \forall (i,k) \in N_2, \\
\begin{pmatrix} e_{ij} \\ 0 \end{pmatrix}^T Z \begin{pmatrix} e_{ij} \\ 0 \end{pmatrix} &\geq r_{ij}^2 \quad \forall (i,j) \in \overline{N}_1, \\
\begin{pmatrix} e_i \\ -a_k \end{pmatrix}^T Z \begin{pmatrix} e_i \\ -a_k \end{pmatrix} &\geq r_{ik}^2 \quad \forall (i,k) \in \overline{N}_2, \\
Z \succeq 0, \quad \alpha_{ij}^+, \alpha_{ij}^-, \alpha_{ik}^+, \alpha_{ik}^- &\geq 0, \\
i, j = 1, \ldots, s, k = s+1, \ldots, n,
\end{aligned}$$

where the constraint $\text{diag}(A_I^T Z A_I) = b_I$ ensures that the matrix variable Z's lower right corner is a $2 \times 2$ identity matrix I, so that Z takes the form of $Z_I$ in (Eq. 12).

Initially, the $\geq$ inequalities involving $r_{ij}$ and $r_{ik}$ may be omitted, and the resulting problem is solved to obtain an initial solution $Z_I$. (The inequality constraints increase the problem size dramatically, and $Z_I$ is likely to satisfy most of them.) Then an iterative active-constraint generation technique is adopted in which inequalities violated by $Z_k$ are added to the problem, and the resulting SDP is solved to give $Z_{k+1}$ (k=1, 2, ...). The process usually terminates before all constraints are included.

A solution of the relaxed SDP problem (Eq. 14) may be given as:

$$\overline{Z} = \begin{pmatrix} \overline{Y} & \overline{X}^T \\ \overline{X} & I \end{pmatrix} \qquad \text{Eq. 15}$$

Assuming the distance measurements are exact (no noise), $\overline{X}$ and $\overline{Y}$ solve problem (Eq. 12) exactly when $\overline{Z}$ is the unique optimal solution of Eq. 14, including all inequality constraints, and in Eq. 14, there are $2n+n(n+1)/2$ exact pair-wise distance measurements.

These conditions ensure that $\overline{Y} = \overline{X}^T \overline{X}$. In practice, distance measurements have noise and it is known that the SDP solution satisfies $\overline{Y} - \overline{X}^T \overline{X} \succeq 0$. This inequality can be used for error analysis of the location estimates provided by the relaxation. For example, trace $\overline{Y} - \overline{X}^T \overline{X} = \Sigma \tau_i$, where $$\tau_i \equiv \overline{Y}_{ii} - \|\overline{x}_i\|^2 \geq 0, \qquad \text{Eq. 16}$$

is a measure of the deviation of the SDP solution from the desired constraint $Y = X^T X$ (ignoring off-diagonal elements). The individual trace $\tau_i$ can be used to evaluate the location estimate $\overline{x}_i$ for sensor i. In particular, a smaller $\tau_i$ indicates higher accuracy in the estimated location $x_i$.

When the number of sensors in Eq. 14 is large, applying a general SDP solver does not scale well. In accordance with embodiments of the present invention, a sequential subproblem approach is provided to solve the overall localization problem iteratively. The overall sensor localization problem including all sensors and anchors is referred to as the full problem. At each iteration, a subset of the unlocalized sensors and a subset of the anchors is selected from the full problem to form a localization subproblem. The selected sensors in the subproblem are referred to as subsensors, and the selected anchors in the subproblem are referred to as subanchors. These subsensors and subanchors, together with their known distance measurements and known anchors' locations, form a sub SDP relaxation model to be solved using Eq. 14.

In accordance with various embodiments of the present invention, the subsensors and subanchors for each subproblem may be chosen dynamically according to rule sets. (Rather than using predefined data, every new iteration's subproblem generation may be based on the previous iteration's results.) The resulting SDP subproblems are of varying but limited size. Benson, Ye, and Zhang's DSDP5.0 is one example of a suitable SDP solver which may be used to solve the SDP subproblem. Each subproblem may determine the final estimate of the associated sensor locations.

Reference is now made to FIG. 2, which depicts a process flow diagram for a method of sensor localization in accordance with one embodiment of the present invention. First, in step 210, the subproblem_size is set. This parameter specifies a limit on the number of unlocalized sensors to be included in each subproblem. The subproblem_size can range from 1 to some maximum value that is potentially solvable for the SDP solver. The most effective subproblem_size may change with the full_problem size, the model parameters such as radius, and the SDP solver used. An approximate linesearch may be performed to find a subproblem size that corresponds to the minimum time, since empirically the total execution time with all other parameters fixed is essentially a convex function of subproblem size.

Next, in step 220, a subproblem is created as explained further below. In this step, subsensors and subanchors are selected for inclusion in the subproblem. This involves choosing a subset of unpositioned sensors (no more than subproblem_size) and an associated subset of nodes with known locations. The latter can include a subset of the original anchors and/or a subset of sensors already positioned by a previous subproblem (referred to as acting anchors). The choice of sensors to be included in this iteration as subsensors and subanchors is based on intelligent rules discussed further below.

Next, in step 230, the SDP relaxation submodel is formulated based on the chosen subsensors and subanchors, together with the known distances among them and the subanchors' known locations. Then, in step 240, the SDP solver is called to obtain a solution for the subsensors' locations.

Next, in step 250, the localized subsensors are classified according to their $\tau_i$ value. The error in sensor i's positioning is estimated by its individual trace $\tau_i$ as discussed above. Subsensors whose $\tau_i$ value is within a given tolerance T are labeled as localized and treated as acting anchors for the next iteration, whereas subsensors whose positioning error is higher than the tolerance are also labeled as localized but are not used as acting anchors in later iterations. These new acting anchors are labeled with different acting levels as explained further below.

The value of $\tau$ has an impact on the localization accuracy. Larger values allow more localized sensors to be acting anchors, but with possibly greater transitive errors. Smaller values may increase the estimation accuracy for some of the sensors, but could lead to less connections to anchors for some unlocalized sensors. A small $\tau$ may be used for networks with higher anchor density to achieve potentially more accuracy, and a larger $\tau$ may be used for networks with lower anchor density to avoid lacking connections to anchors. In order to avoid the side effect of a larger $\tau$ eliminating too many potential acting anchors, at some later iteration all localized sensors may be utilized as acting anchors (including those whose $\tau_i$ is larger than the given tolerance $\tau$). This change only starts when the remaining unlocalized sensors are connected to less than three anchors. It makes sure that acting anchors with higher accuracy are used first, but if no such acting anchors are available, localized points whose locations might be less accurate are used. In most cases, this is better than using no reference points at all.

If all sensors in the network become localized or are determined to be outliers in decision 260, the process ends at 270; if not, process flow returns to step 220 for the next iteration. An unlocalized sensor may be considered an outlier when it does not have enough distance information to decide its location. If a sensor has no connection to any other sensors or anchors, it may be classified as an outlier. In addition, if a connected cluster of sensors has no connection to any anchors, then all sensors in the cluster may be outliers.

Subproblem Creation

The following paragraphs describe the subproblem creation step in more detail. As explained above, subproblem_size is a predetermined parameter that represents the maximum number of unlocalized sensors that can be selected as subsensors in a subproblem. If there are more than subproblem_size unlocalized sensors, there is a choice to make among them.

The subproblem creation procedure makes a choice of subsensors which may be based on the number of connected anchors they have and on the type of connected anchors such as original anchors and different levels of acting anchors as defined by a priority list described below, and a choice of subanchors based on a set of rules described below. The following steps S1-S8 may be used in creating a subproblem.

S1: In step S1, a value for MaxAnchorReq is specified. MaxAnchorReq determines the initial (maximum) value of AnchorReq. It is useful for scalability when connectivity is dense. A smaller MaxAnchorReq would generally cause fewer subanchors to be included in the subproblem, thus reducing the number of distance constraints in each SDP subproblem, and hence reducing execution time for each iteration. For instance, under ideal conditions (where there is no noise), even if a sensor has ten distance measurements to ten anchors, all ten anchors need not to be included because three anchors can be used to localize that sensor accurately.

In the presence of noise, a larger MaxAnchorReq should reduce the average estimation error. For example, if there is a large distance measurement error from one particular anchor, since MaxAnchorReq anchors are all taken into consideration for deciding the sensor's actual location, the large error would be averaged out. Another consideration for setting MaxAnchorReq is the trade-off between estimation accuracy and execution speed. If it is desired to have sensor positioning as accurate as possible in a static environment under noise conditions, a large MaxAnchorReq might be chosen; however, in a real-time environment involving moving sensors, where speed might take priority, a smaller MaxAnchorReq might be considered.

S2: In step S2, AnchorReq is initialized as MaxAnchorReq. AnchorReq is a dynamic parameter that may decrease in later steps.

S3: In step S3, the process loops through unlocalized sensors, finding all that are connected to at least AnchorReq anchors. If AnchorReq is greater than or equal to 3, determine if there are 3 independent subanchors; if not, go to next sensor. Each found sensor is entered into a candidate subsensor list, and its connected anchors are entered into a corresponding candidate subanchor list. Each sensor in the candidate subsensor list has its own candidate subanchor list. Thus, there are as many candidate subanchor lists as the number of sensors in the candidate subsensor list. The term sub_s_candidate represents the length of the candidate subsensor list.

S4: If $0<\text{sub\_s\_candidate} \leq \text{subproblem\_size}$, the candidate subsensor list becomes the chosen subsensors list, and process jumps to step S7. The subproblem may contain less than subproblem_size subsensors, and this may be perfectly acceptable. The alternative is to reduce AnchorReq by one and find more subsensor candidates that have fewer distance connections. However, this approach might reduce accuracy, and the newly localized subsensors could be further used as acting anchors for the next iteration.

S5: If sub_s_candidate>subproblem_size, the choice of subsensors may be further based on subsensor selection rules as further described below. After subproblem_size subsensors are selected from the candidate list according these rules, process jumps to step S7.

S6: Now sub_s_candidate=0. AnchorReq is reduced by 1. AnchorReq is iteratively reduced from MaxAnchorReq to 0. This approach allows sensors with at least AnchorReq connections to anchors to be localized before sensors with fewer connections to anchors. If AnchorReq>0, process flows to step S3 for another round of subproblem creation. Otherwise, AnchorReq=0 and sub_s_candidate=0, indicating that there are still unlocalized sensors left that are not connected to any localized node. They may be classified as outliers and the process may jump to step A6 described below.

S7: A subsensor list and candidate subanchor lists have been formed. The subanchors may be chosed using subanchor selection rules discussed below.

S8: The subsensors and subanchors are selected and the subproblem creation routine ends here. If AnchorReq≧3, the process jumps to step A2 described below. If AnchorReq=2, a geometric subroutine (wherein there are two connected anchors) may be applied as described below, and process goes to step A5. If AnchorReq=1, a geometric subroutine (wherein there is one connected anchor) may be applied as described below, and process goes to step A5.

Under no-noise conditions, a sensor's position can be uniquely determined by at least three distance measurements to three anchors. If a sensor has only two distance measurements to two anchors, there are two possible locations; and if there is only one distance measurement to an anchor, the sensor can be anywhere on a circle. In step S8, heuristic subroutines may be used to include the sensor's anchors' connected neighboring nodes in the subproblem in order to improve the estimation accuracy.

Subsensor Selection

In step S5, when the number of sensors in the candidate subsensor list is larger than subproblem_size, the choice of subsensors may be further based on the types of anchors each sensor is connected to.

A priority may be assigned to each sensor in the candidate subsensor list. A sensor with a smaller priority value is selected to be localized before one with a larger priority value. A sensor's priority is based on the types of anchors the sensor is directly connected to.

In order to define different types of anchors, anchor acting levels may be used. The anchors including acting anchors are assigned certain acting levels. Original anchors are set to acting level 1. Every acting anchor is set to an acting level after it is being localized as a sensor. Essentially, acting anchors are set with acting levels depending on the levels of the anchors that localized them.

Various priority rules for selecting subsensors from the candidate subsensor list are used. For example, when AnchorReq≧3 and a sensor has at least three connected anchors that are independent, the sensor's priority may depend on the three connected anchors that have the lowest acting levels among all its connected anchors. The sensor's priority value may be defined as the summation of these three connected anchors' acting levels.

If the sensor has three connected anchors that are dependent, it is ranked with the same priority as when the sensor is connected to only two anchors.

Sensors with two anchor connections are ranked with equal priority, independent of the acting levels of the two connected anchors. (This can be easily expanded to be more granular according to the connected anchors' acting levels.) Sensors in this category are assigned lower priority than any sensors that have at least three independent anchor connections.

Sensors with one anchor connection are ranked with equal priority, independent of the acting level of the connected anchor. (Again, this can be more granular according to the connected anchor's acting level.) Sensors in this category are assigned lower priority than any sensors that have at least two anchor connections.

Table 1 illustrates a priority list for an example where MaxAnchorReq=3 and the sensor's priority is determined by the three anchors that have the lowest acting levels among all the sensor's connected anchors. More granularity can be added by further classifying the acting levels of the sensor's fourth or fifth connected anchors (if any). Although more categorizations of the priorities should increase localization accuracy under most noise conditions, more computational effort may generally be required to handle more levels of priorities.

Each item in Table 1 represents the number of anchors with different acting levels that are needed at each priority. The last column represents the resulting acting anchors' acting levels for subsequent iterations. For example, if a sensor has at least three independent connections to anchors, and if three of the anchors are original anchors (acting level 1), this sensor belongs to priority 1 as listed in row 1 of Table 1. Also, when this sensor is localized, it becomes acting anchor level 3 (the summation of the anchor levels of the three anchors that localized it). Similarly, if a sensor has at least three independent connections to anchors, and if two of the anchors are original anchors (acting level 1) and at least 1 of the connected anchors is at acting level 3, this sensor belongs to priority 2 as listed in row 2 of Table 1. Also, when this sensor is localized, it becomes acting anchor level 5. The sensors that connect to two anchors belong to the second last priority, and sensors that connect to only one anchor belong to the last priority. (A number bigN can be used to ensure that sensors connected to less than three anchors are given the lowest priority).

Subanchor Selection

In step S7, for each unlocalized subsensor, only AnchorReq of the connected anchors are included in the subproblem. Various rules may be used to select subanchors from candidate subanchor list that contains more than AnchorReq anchors.

For example, original anchors may be selected first, followed by acting anchors with lower acting level.

In addition, the subanchors chosen should be linearly independent, as discussed further below.

Among independent anchors in the candidate subanchor list, distance scalefactors are used to encourage selection of the closest subanchors. This is based on the assumption that under noise conditions, the shorter distance measurements are more likely to be accurate than the longer ones.

Independent Subanchors Selection

If sensor i is connected to K anchors at locations $a_{ik}$ with corresponding distance measurements $\hat{d}_k$ (k=1, ..., K), and if K>3, and the following matrices are defined:

$$A = \begin{pmatrix} 1 & 1 & \cdots & 1 \\ -a_{i1} & -a_{i2} & \cdots & -a_{iK} \end{pmatrix}, \qquad \text{Eq. 17}$$

$$D_1 = diag\left(1 / \sqrt{1 + \|a_{ik}\|^2}\right), \text{ and} \qquad \text{Eq. 18}$$

$$D_2 = diag\left(1 / \hat{d}_{ik}\right). \qquad \text{Eq. 19}$$

An independent subset may be selected by a QR factorization with column interchanges: $B=AD_1D_2$, $BP=QR$, where Q is orthogonal, R is upper-trapezoidal, D is diagonal, and P is a permutation chosen to maximize the next diagonal of R at each stage of the factorization. ($D_1$ normalizes the columns of A, and $D_2$ biases them in favor of anchors that are closer to sensor i.) If the third diagonal of R is larger than a predefined threshold (for example, $10^{-4}$ is used in a simulation), the first three columns of AP are regarded as independent, and the associated anchors are chosen. Otherwise, all subsets of three among the K anchors are regarded as dependent.

Geometric Subroutine (Two Connected Anchors)

In step S8 described above, a geometric subroutine may be applied to localize sensors connected to only two anchors. When a sensor's connected anchors are also connected to other anchors, this subroutine may improve the accuracy of the sensor's localization. For example, FIG. 3 depicts a system of sensors $s_1$ and $s_2$ with unknown locations, and anchors $a_3(1, 3)$, $a_4(1, 2)$, $a_5(2, 2)$, $a_6(4, 1)$, and $a_7(5, 1)$ with known locations in brackets. In this example, it is assumed the sensors' radio range is $\sqrt{2}$, and two distance measurements $\hat{d}_{13}=1$ and $\hat{d}_{14}=\sqrt{2}$ are given for sensor $s_1$ and one measurement $\hat{d}_{27}=1$ is given for sensor $s_2$.

Given two distances $\hat{d}_{13}$ and $\hat{d}_{14}$ to two anchors $a_3(1, 3)$ and $a_4(1, 2)$, $s_1$ should be either at (0, 3) or (2, 3). If only $s_1$, $a_3(1, 3)$, and $a_4(1, 2)$ are used in an SDP subproblem, SDP relaxation will give a solution near the middle of the two possible points, which would be very close to (1, 3). If there is any anchor ($a_5$) that is near $s_1$'s connected anchors ($a_3$ and $a_4$) with any of the two possible sensors' points within their radio range (point (2, 3) is within $a_5$'s range), that point (2, 3) must not be the real location of $s_1$, or else $s_1$ would be connected to this anchor ($a_5$) as well. Thus $s_1$ must be at the other point, (0, 3).

When a sensor has at most two connected anchors, these anchors' connected anchors (referred to as the connected anchors' neighboring anchors) are included in the subproblem together with the sensor and its directly connected anchors. By including the neighboring anchors, it would be expected that the inequality constraints in the SDP relaxation model in Eq. 14 would push the estimation towards the right point; however, because of the relaxation, enforcing inequalities in Eq. 14 is not equivalent to enforcing them in the distance model in Eq. 9. The added inequality constraints only push the original solution near (1, 3), a tiny bit towards $s_1$'s real location (0, 3), and the solution essentially stays at around (1, 3).

Instead of the SDP relaxation approach, a geometric approach as illustrated in FIGS. 4A-4C may be utilized. Suppose $s_1$ has measurements $\hat{d}_{12}$ to anchor $a_2(a_{2x}, a_{2y})$ and $\hat{d}_{13}$ to anchor $a_3(a_{3x}, a_{3y})$. Let $a_l$(l=4, ..., k) be $a_2$ and/or $a_3$'s neighboring anchors with radio range $r_{1l}$ (l=4, ..., k), and let $d_{23}$ be the known (exact) Euclidean distance between $a_2$ and $a_3$.

If the circle centered at $a_2$ (with radius $\hat{d}_{12}$) intersects with the circle centered at $a_3$ (with radius $\hat{d}_{13}$) as shown in FIG. 4A, two possible locations of $s_1$ are given by the solutions x* and x** of the equations:

$$\|x - a_2\|^2 = \hat{d}_{12}^2, \qquad \text{Eq. 20}$$

$$\|x - a_3\|^2 = \hat{d}_{13}^2. \qquad \text{Eq. 21}$$

Sensor $s_1$'s location may be selected from x* and x**, whichever is farther away from any neighboring anchor. Thus, for l=4 to k, if $\|x^*-a_l\|^2 < r_{1l}^2$, then x=x and stop; else if $\|x^{}-a_l\|^2 < r_{1l}^2$, then x=x* and stop. Otherwise, x=(x*+x**)/2 and stop.

Under noise conditions, the $a_2$ circle may be inside the $a_3$ circle ($\hat{d}_{12}+\hat{d}_{13} \geq d_{23}$ and $\hat{d}_{13}-\hat{d}_{12} > d_{23}$) as shown in FIG. 4B. The solutions x* and x** of the following equations give two possible points for $s_1$ on the $a_2$ circle:

$$(x_x-a_{2x})^2+(x_y-a_{2y})^2=\hat{d}_{12}^2, \text{ and} \qquad \text{Eq. 22}$$

$$(a_{2x}-a_{3x})(x_y-a_{2y})=(a_{2y}-a_{3y})(x_x-a_{2x}), \qquad \text{Eq. 23}$$

where x is on the line through $a_2$ and $a_3$ represented by the second equation.

If $\|x^*-a_3\| < \|x^{}-a_3\|$, then x=x; otherwise x=x*. This guarantees that the point further from $a_3$ is chosen. Note that the sensor's estimation is based on the closest anchor ($a_2$ here since $\hat{d}_{13} \geq \hat{d}_{12}$), assuming that a shorter measurement is generally more accurate than longer ones, given similar anchor properties.

The same approach may apply when the $a_3$ circle is inside the $a_2$ circle ($\hat{d}_{12}-\hat{d}_{13} > d_{23}$).

Under noise conditions, the $a_2$ and $a_3$ circles may have no intersection ($\hat{d}_{12}+\hat{d}_{13} < d_{23}$) as shown in FIG. 4C. The solutions x* and x** of the following equations give two possible points for $s_1$ on the circle for the anchor with smaller radius. It is assumed that $\hat{d}_{12} \leq \hat{d}_{13}$:

$$(x_x-a_{2x})^2(x_y-a_{2y})^2=\hat{d}_{12}^2, \qquad \text{Eq. 24}$$

$$(a_{2x}-a_{3x})(x_y-a_{2y})=(a_{2y}-a_{3y})(x_x-a_{2x}), \qquad \text{Eq. 25}$$

where x is on the line through $a_2$ and $a_3$ represented by the second equation.

If $\|x^*-a_3\| < \|x^{}-a_3\|$, then x=x; otherwise x=x*. This guarantees that the point closer to $a_3$ (in between $a_2$ and $a_3$) is chosen.

Geometric Subroutine (One Connected Anchor)

In step S8 described above, a geometric subroutine may be applied to localize sensors connected to only one anchor. A heuristic may be used for estimating the location of a sensor with only one connecting anchor. A neighboring anchor's radio range information may be used to eliminate the portion of the circle that the sensor would not be on, and then the middle of the other portion of the circle may be calculated to be the sensor's location. For the example in FIG. 3, because the distance between $s_2$ and $a_7$ is known as 1, $s_2$ could be anywhere on the circle surrounding $a_7$ with a radius of 1. Knowing $a_7$'s neighboring anchor node $a_6$ is not connected to $s_2$, it can be known that $s_2$ would not be in the area surrounding $a_6$ with a radius of $\sqrt{2}$. Thus, $s_2$ could be anywhere around the half circle including points (5, 2), (6, 1), and (5, 0). The heuristic chooses the middle point between the two circles' intersection points (5, 2) and (5, 0), which happens to be (6, 1) in this example.

In FIG. 5A, it is assumed that s has one distance measurement $\hat{d}$ to anchor a, and b is the closest connected neighboring anchor to a with radio range r. It is assumed that $a=(a_x, a_y)$, $b=(b_x, b_y)$, and $x=(x_x, x_y)$.

The solutions x* and x** of the following equations give two possible points s on the circle:

$$(x_x-a_x)^2+(x_y-a_y)^2=\hat{d}^2, \quad \text{Eq. 26}$$

$$(a_x-b_x)(x_y-a_y)=(a_y-b_y)(x_x-a_x), \quad \text{Eq. 27}$$

where x is on the line through a and b represented by the second equation.

If $\|x^*-b\| < r$, then $x=x^{**}$; otherwise $x=x^*$. This guarantees that the point further from b is chosen.

The above heuristic provides a way of estimating a sensor's location when the sensor connects to only one anchor. A more complicated approach, referred to as an arc elimination heuristic, can be used when the connected anchor has more than one neighboring anchor, which can increase the accuracy of the sensor's location. In the arc elimination heuristic, the method is to loop through each of the neighboring anchors and find the portion of the circle that the sensor will not be on, and eliminate that arc as a possible location of the sensor. Eventually, when one or more plausible arcs remain, the middle of the largest arc is chosen as the sensor's location.

As an example, FIG. 5B depicts one more neighboring anchor c added to sensor s's anchor a from the previous example in FIG. 5A. First, the intersections (points 1 and 2) of two circles are found: one at a with radius $\hat{d}$, the other at b with radius r. The 1-2 portion of the arc closer to point b is known not to be the location of s. Second, the intersections (points 3 and 4) of two circles are found: one at a with radius $\hat{d}$, the other at c with radius r. The arc 3-4 closer to point c is known not to be the location of s. Thus, s must be somewhere on the arc 1-4 further away from b or c. The estimation of s is given in the middle of the arc 1-4. This method provides more accuracy than the one-neighboring-anchor approach.

Subroutine Optimality

For the case of one sensor connected to three independent anchors, a prior method proves when there is no noise that the SDP relaxation (Eq. 14) gives an optimal solution to (Eq. 9). The proof depends on the fact that there are three independent equations and only three variables.

In accordance with various embodiments of the present invention, the subproblems are constructed from sensors that do have three independent anchors (or acting anchors) where possible. If each of these subsensors (totaling s) were included in separate subproblems together with their connected 3 independent anchors, the proof in shows they would be localized exactly by the SDP approach. If these s subsensors and their connected anchors are treated together in a single subproblem, the larger SDP relaxation contains sets of the same three equations that would arise in the separate SDP relaxations. The equations form a block-diagonal system in the larger SDP. There are 3s independent equations and the same number of variables containing only $x_i$ and $y_{ii}$, $i=1, \ldots, s$. The $\hat{d}_{ik}$ equation in Eq. 14 reduces under no noise conditions to $y_{ii}=x_i^T x_i$ for all relevant pairs (i, k). The constraint $Y-X^T X \succeq 0$ then guarantees $y_{ij}=x_i^T x_j$ for all $j=1, \ldots, s$. Hence, the SDP solution for the subproblem is also rank 2 and can give the exact locations for all subsensors.

Moving Sensor Localizations

In many applications, some of the sensors are dynamic rather than static. In accordance with another embodiment of the present invention, methods for sensor localization wherein some of the sensors are moving are provided.

A primary difference between a static localization network and a dynamic one is that the distance measurements among sensors are constant in the static case, while some distance measurements are changing in the dynamic case because of the sensor movements. In a moving sensor localization method, at any given moment a static view of the dynamic sensor network can be taken. For each snapshot of the network with all the sensors frozen in their positions and with the connection information among them, the static localization method can be used to estimate the locations of the moving sensors at that particular instant. This provides an approximation if the computation time is less than the interval between snapshots.

In dynamic sensor localization, a tracking instant generally refers to the instant of time that some sensors' locations are to be updated. A tracking instant can be triggered at a fixed frequency after a given time interval. A tracking instant can also be triggered upon detection of sensor movements, which are revealed by changes in the distance measurement matrix $\hat{d}$.

At any given tracking instant, the static sensors are assumed to be already localized by the previous iteration and can be used as anchors by the present iteration. There are various situations in determining which sensors are dynamic. One situation is when the dynamic sensors are specified ahead of time. All of their locations are updated at all tracking instants, regardless of whether they have moved or not since the previous instant. Another situation is when any sensor could be static or dynamic at any instant. The ones that have moved from the previous instant are the dynamic ones. Under this situation, which ones are moving are found by searching the distance matrix $\hat{d}$ for measurement changes.

As mentioned, at any given instant t the dynamic sensor localization problem can be treated as a static one, and the static localization method can be used to localize the moving sensors at that instant. The dynamic sensor localization problem as follows at tracking instant t.

In formulating the dynamic sensor localization problem, the total number of static and dynamic sensors, including anchors, is referred to as n. The unknown points are s sensors that are dynamic and whose locations $x_i$ are to be determined at tracking instant t, as follows:

$$x_i \in R^2, i=1, \ldots, s \quad \text{Eq. 28}$$

The known points are m anchors that are static sensors whose locations $a_k$ are known at tracking instant t, as follows:

$$a_k \in R^2, k=s+1, \ldots, n \quad \text{Eq. 29}$$

The distance matrix $\hat{d}$ consisting of $\hat{d}_{ij}$ and $\hat{d}_{ik}$ are as explained above, except $\hat{d}$ is partitioned according to $$\hat{d} = \begin{pmatrix} DIST11 & m\_distance \\ m\_distance' & DIST22 \end{pmatrix}, \quad \text{Eq. 30}$$

where DIST11 is an s by s matrix representing the distance measurements among s dynamic sensors. In some applications, distance measurements among moving sensors are not used. Under this condition, DIST11 will be all zeroes. The m_distance is an s by m matrix representing the distance measurements among s dynamic sensors with the m static sensors. DIST22 is an m by m matrix representing the distance measurements among m static sensors themselves. They remain unchanged in between tracking instants if static sensors are continuing to be static.

As indicated above, when the moving sensors are not known, they can be identified by detecting the distance changes between two tracking instants $\hat{d}_t$ and $\hat{d}_{t+1}$. The following routine illustrates one such approach.

1. Define $$D = \hat{d}_{t+1} - \hat{d}_t \qquad \text{Eq. 31}$$

2. Find a permutation P that sorts D's rows in descending order of the number of nonzero elements in each row. The resulting matrix is referred to as DR. At the same time, keep track of the corresponding row indexes.

3. Define $$\Delta = PDP^T = \begin{pmatrix} DELTA11 & DELTA12 \\ DELTA12' & 0 \end{pmatrix}. \qquad \text{Eq. 32}$$

4. Indexes corresponding to DELTA11 indicate all the moving sensors.

Equations 30 and 32 have one to one correspondence in matrix partitioning. The moving sensor identification routine aims to isolate the 0 matrix from $\Delta$, that corresponds to DIST22. This is because static sensors do not move, and so their relative distance changes are always zero. Thus, DELTA11 represents the distance measurement changes among moving sensors, DELTA12 represents the distance measurement changes between moving sensors and static sensors, and DELTA22 represents the distance measurement changes among static sensors, which would be zero under no-noise conditions. To allow for noise, a tolerance in defining D may be used. Elements smaller than the tolerance would be treated as zero.

Reference is now made to FIGS. 6A and 6B which show an example with seven sensors at time t (FIG. 6A), and at time t+1 (FIG. 6B). Distance measurements at t and t+1 are assumed as follows:

$$\hat{d}_t = \begin{pmatrix} 0 & 0 & 0 & 1 & 1.5 & 0 & 0 \\ 0 & 0 & 0 & 1 & 1.5 & 1 & 0 \\ 0 & 0 & 0 & 0 & 1.5 & 0 & 0 \\ 1 & 1 & 0 & 0 & 1 & 0 & 0 \\ 1.5 & 1.5 & 1.5 & 1 & 0 & 1 & 1.5 \\ 0 & 1 & 0 & 0 & 1 & 0 & 1 \\ 0 & 0 & 0 & 0 & 1.5 & 1 & 0 \end{pmatrix},$$

$$\hat{d}_{t+1} = \begin{pmatrix} 0 & 1 & 0 & 1 & 1.5 & 0 & 0 \\ 1 & 0 & 1 & 1.5 & 1 & 1.5 & 0 \\ 0 & 1 & 0 & 0 & 1.5 & 1 & 0 \\ 1 & 1.5 & 0 & 0 & 1 & 0 & 0 \\ 1.5 & 1 & 1.5 & 1 & 0 & 1 & 1.5 \\ 0 & 1.5 & 1 & 0 & 1 & 0 & 1 \\ 0 & 0 & 0 & 0 & 1.5 & 1 & 0 \end{pmatrix}$$

Applying the first two steps yields:

$$D = \begin{pmatrix} 0 & 1 & 0 & 0 & 0 & 0 & 0 \\ 1 & 0 & 1 & .5 & -.5 & .5 & 0 \\ 0 & 1 & 0 & 0 & 0 & 1 & 0 \\ 0 & .5 & 0 & 0 & 0 & 0 & 0 \\ 0 & -.5 & 0 & 0 & 0 & 0 & 0 \\ 0 & .5 & 1 & 0 & 0 & 0 & 0 \\ 0 & 0 & 0 & 0 & 0 & 0 & 0 \end{pmatrix}$$

$$PD = \begin{pmatrix} 1 & 0 & 1 & .5 & -.5 & .5 & 0 \\ 0 & .5 & 1 & 0 & 0 & 0 & 0 \\ 0 & 1 & 0 & 0 & 0 & 1 & 0 \\ 0 & -.5 & 0 & 0 & 0 & 0 & 0 \\ 0 & .5 & 0 & 0 & 0 & 0 & 0 \\ 0 & 1 & 0 & 0 & 0 & 0 & 0 \\ 0 & 0 & 0 & 0 & 0 & 0 & 0 \end{pmatrix}$$

Applying the third step yields:

$$\Delta = PDP^T = \begin{pmatrix} 0 & .5 & 1 & -.5 & .5 & 1 & 0 \\ .5 & 0 & 1 & 0 & 0 & 0 & 0 \\ 1 & 1 & 0 & 0 & 0 & 0 & 0 \\ -.5 & 0 & 0 & 0 & 0 & 0 & 0 \\ .5 & 0 & 0 & 0 & 0 & 0 & 0 \\ 1 & 0 & 0 & 0 & 0 & 0 & 0 \\ 0 & 0 & 0 & 0 & 0 & 0 & 0 \end{pmatrix}$$

DELTA11 corresponds to sensor indexes 2 and 6. From step 4, it can be known that these two are the moving ones, which indeed are the ones that moved from time t to time t+1.

There may be a situation when the number of moving sensors is greater than the number of static sensors, and the moving sensors are all moving in the same direction at the same speed. For example, in FIGS. 7A and 7B, sensors 2 and 6 both move diagonally with the same distance.

In this example, it will be assumed that distance measurements at t and t+1 are as follows:

$$\hat{d}_t = \begin{pmatrix} 0 & 0 & 0 & 1 & 1 & 0 & 0 \\ 0 & 0 & 0 & 1 & 0 & 1 & 0 \\ 0 & 0 & 0 & 0 & 1 & 0 & 0 \\ 1 & 1 & 0 & 0 & 1.5 & 1.5 & 0 \\ 1 & 0 & 1 & 1.5 & 0 & 0 & 0 \\ 0 & 1 & 0 & 1.5 & 0 & 0 & 1 \\ 0 & 0 & 0 & 0 & 0 & 1 & 0 \end{pmatrix}$$

$$\hat{d}_{t+1} = \begin{pmatrix} 0 & 1.5 & 0 & 1 & 1 & 0 & 0 \\ 1.5 & 0 & 1.5 & 1 & 1 & 1 & 1.5 \\ 0 & 1.5 & 0 & 0 & 1 & 1 & 0 \\ 1 & 1 & 0 & 0 & 1.5 & 0 & 0 \\ 1 & 1 & 1 & 1.5 & 0 & 1.5 & 0 \\ 0 & 1 & 1 & 0 & 1.5 & 0 & 1 \\ 0 & 1.5 & 0 & 0 & 0 & 1 & 0 \end{pmatrix}$$

Applying the moving sensor identification routine yields:

$$\Delta = \begin{pmatrix} 0 & 0 & 1 & 1.5 & 1.5 & 0 & 1.5 \\ 0 & 0 & 1.5 & 1 & 0 & -1.5 & 0 \\ 1 & 1.5 & 0 & 0 & 0 & 0 & 0 \\ 1.5 & 1 & 0 & 0 & 0 & 0 & 0 \\ 1.5 & 0 & 0 & 0 & 0 & 0 & 0 \\ 0 & -1.5 & 0 & 0 & 0 & 0 & 0 \\ 1.5 & 0 & 0 & 0 & 0 & 0 & 0 \end{pmatrix}$$

DELTA11 corresponds to sensor indexes 2 and 6, from step 4. Thus, it is shown that these two sensors are the moving ones, which indeed are the ones that moved from time t to time t+1.

DELTA11 is also a zero matrix. This is because there is no relative movement between sensor 2 and sensor 6. Since DELTA22 has larger dimensions than DELTA11, the correct moving sensors can still be identified. Static sensors will generally outnumber the moving ones, and it is rarely the case that all moving sensors would move at the same speed in the same direction at the same time.

In accordance with one embodiment of the present invention, moving sensor localization is provided. First, all sensors' locations are initialized. This step assumes that none of the sensors is moving. The number of sensors, number of anchors, anchor locations, and the distance measurements matrix $\hat{d}$ are given. The method described above in connection with FIG. 2 is called to estimate the initial locations of all sensors.

Next, dynamic sensors' locations are tracked at every tracking instant by repeating the following steps at each tracking instant t:

1. Determine moving sensors: identify s dynamic sensors and m static sensors (anchors) using the moving sensor identification routine described above.
2. Update distance matrix $\hat{d}$: replace only the m_distance portion, and the DIST11 portion if distance measurements among moving sensors are used.
3. Formulate new SDP model with updated sensors, anchors, and $\hat{d}$.
4. Call the subproblem routine described above in connection with FIG. 2 to obtain s dynamic sensors' locations at the given tracking instant.

In most moving sensor localization applications, seeking the best estimation accuracy of the moving sensors' locations might prove costly to real-time performance. Hence, when there is sufficient connectivity among sensors in the network and that the network is not too noisy, it may be advantageous to simplify the subsensor selection priority rules for greater real-time performance. This can be achieved by reducing the total number of priorities for sensors and the number of acting levels for acting anchors.

Dynamic sensor networks may find applications in many areas. For example, an ad hoc wireless sensor network can be used to form a battlefield tracking system. Static sensors can be spread around a battlefield by a helicopter. They may be used to track enemy forces or friendly forces (depending on the type of sensor and who is currently occupying the territory).

All soldiers could wear dynamic sensors in order to determine where their comrades are in the adjacent neighborhood. At the same time, commanders my have a real-time view of their troops' positions by using the localization methods of the present disclosure in order to assess the current situation and direct the next move.

Another application in the battlefield is to track moving vehicles. In a hostile environment, it can be difficult to communicate with a vehicle directly. Predefined moving patterns or paths the vehicles are supposed to follow can be set. Through the tracking traces of the moving vehicles, the command center can analyze the environment each vehicle is in, and how safe the vehicle is likely to be.

Another example application is a police patrol car monitoring and dispatching system. Static sensors may be installed to form an ad hoc wireless network for the patrol environment, and each police car may carry a sensor. The moving sensor localization method of the present disclosure could be used to find out where each patrol car is at each given instant. These locations could be used to determine the nearest police cars to a crime or accident scene, in order to minimize the time for the cars to arrive at the scene.

Similar logic can be applied to taxi monitoring and dispatching. Each taxi in a network may carry a dynamic sensor. Finding an idle taxi nearest to the customer requiring service can then be accomplished using the methods of the present disclosure.

Car-sharing networks have been successfully deployed in Europe and are becoming popular in North America. In such a network, cars are scattered around a city or region to be shared by the network members. Ideally, a member should carry some type of wireless device such as a PDA or a cell phone to locate and reserve the nearest idle car anytime the person needs to rent it.

An ad hoc wireless sensor network can be designed around the car-sharing network. Each car in the network may carry a dynamic sensor, to enable monitoring of the car's location at any time. Each person in the desiring to find a car may have a dynamic sensor installed in his or her user-portable wireless data devices (such as PDAs or cell phones, etc.). For privacy reasons, the person may turn off the sensing device if he or she is not using the car-sharing service. The dynamic sensor localization method of the present disclosure may be used in this system to track the locations of both cars and the people who are currently looking for a shared car.

A similar method could be used for bike-sharing networks. Some cities like Copenhagen already offer bicycles for free use from a public pool. The service should become more widely used if the matching of people to free bicycles can be implemented more efficiently.

A traffic monitoring system is yet another application that may benefit from the methods of the present disclosure. There have been many studies on the automated highway system, particularly on the development of an inter-vehicle communication system. Such a system may be used for dynamic traffic routing, driver assistance and navigation, co-operative driving, and platooning.

Static sensors may be spread around major highways to form ad hoc wireless sensor networks, and cars may carry dynamic sensors. Highway traffic conditions can be evaluated by tracking the movement of sensors within the cars. For example, by looking at the current traces of most cars traveling on a particular highway, the average actual speed of the cars can be determined. By comparing this speed with the maximum speed of the highway, it can be determined whether traffic on the highway is jammed. One by one, all highways' real-time traveling speed may be included on a map maintained by a central computing facility.

The real-time speed map may be used by police patrol officers, or by fire-fighters to predict a problem even before people could report a problem on the road. At the same time, if a car's display is connected to the central computing facility, the car driver may download any portion of the map in real-time to decide on the best option to his or her destination.

An even more proactive approach may be achieved by predefining the route a particular driver is to take to his or her destination. If there are abnormal conditions on any road along the route, the driver may be notified with a number of top alternative routes with estimated total distance and travel times. An alternative is to mark the actual speed on the map in real-time instants for the driver to reference while driving. Various different labels may be used to correspond to different traffic conditions of highways according to the speed detected by the sensors. For example, five levels may be used to represent traffic conditions, with level 1 being totally smooth and level 5 being totally blocked.

Another application of the methods of the present disclosure is for a personnel monitoring system. Static sensors can be installed to form an ad hoc wireless sensor network in a limited area such as a university campus, a corporate complex, a retail mall, or a prison to monitor people's movements for different purposes. One example application is the prisoner monitoring system. Sensors could be worn by prisoners (or embedded if permitted by law) so that all their movements are actively monitored. Legitimate movements and locations are ignored by the system, but if any prisoner appears to be too near the fence, for example, the system could warn relevant personnel immediately.

Still another application of the methods of the present invention is for a bus transit arrival reporting system. For most public bus transit systems, there are fixed schedules for each bus route. However, uncertainties on the road can often cause a bus to be delayed, leaving new passengers waiting longer than expected. In some cities with harsh climates, such as in Ottawa, Canada, there is a phone number allocated for each bus stop. Passengers can phone for the arrival times of the next coming bus and the one after that before heading to the bus stop, thus avoiding a long wait in the cold during winter times. However, the times given to the callers are mostly from a pre-recorded arrival schedule. If heavy traffic causes a certain bus to be late, the caller would still be informed about the scheduled time, rather than the true delayed time of arrival. It would be desirable to have the schedule for each phone number and bus stop updated with more accurate arrival times based on the current locations of the next two buses.

An improved bus transit arrival reporting system may be achieved using the dynamic sensor localization methods of the present disclosure, wherein each bus stop is equipped with a static sensor, and each bus carries a dynamic sensor. If the distance between bus stops is longer than the sensor's sensing range, more static sensors may be added in between to form an ad hoc wireless sensor network. At each tracking instant, the method can be used to estimate each bus's location in the network. The estimated arrival times of the two buses closest to a particular stop can be calculated according to average traveling speed, or if there is a current road condition detection, the current traveling speed can be used to estimate the expected arrival times of the two buses. This information is fed back to the bus stop and passed on to the callers. A user-portable wireless data device (e.g., a PDA or cell phone), or a fixed LED/LCD display at each stop may be used to inform riders of the anticipated wait time for their current location.

Distributed Computing for Clustered Networks

The predicted explosive deployment of wireless sensor networks may involve tens of thousands of sensors per network in the future. In such large networks, centralized computing may not be practical.

Large sensor networks are generally inherently clustered by design. Such networks may exhibit the following characteristics:

- A hierarchical adaptive clustering architecture is recommended for scalability and energy saving.
- Sensors are partitioned into clusters. Each cluster has a cluster head, and each sensor belongs to one cluster.
- Dynamic cluster head selection is adopted. All cluster heads broadcast announcements at system startup. When a sensor hears these announcements, it chooses the cluster head from which the strongest signal is received. Essentially, a sensor selects the nearest cluster head.
- Application software, for example, the localization algorithm, resides in the cluster head.
- There is a multi-layer communication hierarchy. Sensors communicate only with their own cluster heads. All cluster heads communicate with a central command center. Depending on the particular implementation, cluster heads may be able to communicate directly among themselves.

Taking advantage of the intrinsic clustering of large networks, such as those having the above-described characteristics, a hierarchical computational scheme may be used that can utilize distributed computing for sensor localization. Scalability is achieved through parallelism at the cluster head level. The distributed method utilizes three levels of machine devices as imposed by the clustered sensor network architecture, and three levels of software structure.

The top-level machine is regarded as a central command center and has relatively more computing power, analogous to a desktop PC. The second-level machines constitute the cluster level; they are the cluster heads. These machines are generally devices that have less computing power, analogous to a current PDA. The lowest level devices are the sensors that communicate with their own cluster heads. These devices generally do not handle any applications. They have signal communications with their neighboring sensors and with their own cluster heads to report distance information, for instance.

The three levels of software structure are: distributed algorithm, cluster-level algorithm, and subproblem algorithm. The top-level algorithm is the distributed algorithm is responsible for distributing a subset of anchors, sensors, and connection information to each cluster head in order for each cluster head to know when and how to conduct sensor localization at the cluster level. It is in charge of the overall sequencing and synchronization of parallel processes.

Sequencing rules are created for all clusters according to their priorities, as described further below. A synchronization procedure is formulated in order to impose the sequencing rules. Typical applications can have thousands or even tens of thousands of sensors being controlled by this command center.

The second level, which is the cluster-level algorithm, utilizes the methods described above as a cluster level problem solver. Typical applications can have hundreds of sensors in each cluster.

The problem is further adaptively separated into a sequence of smaller subproblems. An SDP solver is called iteratively as discussed above. The SDP solver in turn is effective at this lower level.

Careful considerations should be in place for the distributed algorithm to achieve network-wide optimal speed without compromising accuracy. For example, the sequencing and synchronization of clusters allow them to be processed in parallel in the correct order.

Sequencing of Parallel Processes

A sequencing rule deals with the order in which all the clusters run the localization algorithm. It is there to make sure that certain favorable clusters get localized first before some other clusters so that estimation error is minimized. At the same time it ensures that clusters in similar favorable conditions get localized in parallel to optimize computation time.

The sequencing of clusters becomes necessary because the distribution of anchors is often not uniform across the whole network. For example, in order to save cost, network designers might allocate enough anchors to localize the sensors in only some of the clusters.

Other clusters might not have sufficient anchor density to localize their own sensors by themselves. In this situation, information regarding anchors and acting anchors is needed from neighboring clusters. (Neighboring clusters $\{c_1, c_2, \ldots, c_q\}$ of a cluster c include any cluster that has a sensor within sensing range of some sensor in cluster c.) This information may become available only after the neighboring clusters' localizations run in the previous computation (iteration). Thus, if all clusters are processed in parallel without careful ordering, some of the clusters may fail to localize all their sensors, or to localize with lower accuracy than if they had waited for more information when available from their neighboring clusters.

For example, FIG. 8 depicts a sensor network of twenty-five square clusters $\{c_1, c_2, \ldots, c_{25}\}$. Each cluster head is an anchor and is located in the center of each square cluster. Three clusters $\{c_7, c_8, c_{18}\}$ have two extra anchors that are within communication range of each other and their cluster head. In the present example, all other sensors in the network (not shown) are almost uniformly distributed around the network (which is not known prior to localization).

The borders for each cluster are drawn as squares for ease of understanding. It should be appreciated, however, that they need not necessarily conform to such a shape.

Given the above conditions, it can be seen that at the beginning of the localization, only the three clusters $\{c_7, c_9, c_{18}\}$ with three original anchors should be localized first. Since they are in similar anchor conditions, they can all be processed in parallel. All the other clusters have only one anchor at this time (iteration); they would not achieve good estimation accuracy if they were localized before $\{c_7, c_9, c_{18}\}$ are localized. It can also be seen that clusters $\{c_{21}, c_{25}\}$ should wait longer than the rest of the one-anchor clusters, until after one of their neighboring clusters has been localized.

A priority-driven cluster-labeling approach may be used to address this sequencing need. In one approach, all clusters are labeled with numerical values, called cluster priorities, to indicate their sequencing order. Clusters with a smaller priority value have the higher priority and are localized before clusters with a bigger priority value. Clusters with the same priority can be localized in parallel at any time.

Many factors can be considered in classifying the clusters' priorities. For example, the original anchor density in the cluster may be considered.

For better accuracy, a cluster with higher anchor density within its own cluster should be considered higher priority than the one with lower anchor density. In FIG. 8, cluster $c_{18}$ with 3 original anchors is assigned higher priority than, for example, clusters $c_{16}, c_{17}, c_{22}$, which have only one original anchor within each cluster.

In addition, the cluster's neighbor-priority and the number of neighboring clusters with that priority may be a factor. A cluster's neighbor-priority is the highest priority among all the cluster's neighboring clusters. A cluster c is assumed to have has neighboring clusters $\{c_1, c_2, \ldots, c_q\}$, the highest priority among all q clusters is assumed to be h, and the number of clusters with this priority h is assumed to be p. Cluster c's neighbor-priority is h, and there are $p \leq q$ neighboring clusters with that priority.

If cluster c has to rely on its neighboring clusters' information to localize itself, a higher neighbor-priority h will give cluster c a higher priority than that of a cluster with a lower neighbor-priority h. For example in FIG. 8, among all of cluster $c_{23}$'s neighboring clusters $\{c_{17}, c_{18}, c_{19}, c_{22}, c_{24}\}$, $c_{18}$ has the highest priority. Hence, the cluster priority associated with $c_{18}$ determines the neighbor-priority for $c_{23}$. From the previous factor, it is known than cluster $c_{18}$ has a higher priority than any of $c_{21}$'s neighboring clusters $\{c_{16}, c_{17}, c_{22}\}$. Hence, cluster $c_{23}$ will be assigned a higher priority than cluster $c_{21}$.

When two clusters have the same neighbor-priority h, the one with the larger number p will rank with higher priority. For example in FIG. 8, clusters $c_{19}$ and $c_{13}$ have the same neighbor-priority, both defined by cluster $c_{18}$'s priority. However, cluster $c_{13}$ has three neighboring clusters at this priority $\{c_7, c_9, c_{18}\}$. Hence, p=3 for cluster $c_{13}$, while p=1 for cluster $c_{19}$. Therefore, cluster $c_{13}$ is assigned a higher priority than $c_{19}$.

Another factor to consider may be the priority and number of anchors that are in the cluster's neighboring clusters and are within any of the cluster's sensors' radio range. A cluster's neighboring anchors are all the anchors in the cluster's neighboring clusters that have distance measurements with any sensor in this cluster. A cluster associated with more neighboring anchors and with more neighboring anchors at lower anchor levels will be assigned a higher priority than one with fewer neighboring anchors and with more neighboring anchors at higher anchor levels.

Depending on the applications, designers may choose to consider all these factors in determining the cluster priorities, or simply select any combination of them. Different granularity of the cluster priorities can be achieved by specifying a range of the above factors rather than specific values.

For example, a wireless sensor network may be used to detect environmental hazards over a region by using individual sensors in the network to detect smoke, chemicals, or temperatures, etc. Sensors are generally spread roughly on regular square grids across the protected area according to hazard detection regulations. For example, the hazard detection rule may require that all detectors (sensors) must be within a certain distance of another detector (sensor) to guarantee coverage.

Localization would not be difficult if all sensors could be placed perfectly uniformly on the regular square grids at installation. In practice, however, only certain required anchors are placed at known spots; the sensors are placed roughly within the regulated distance without exact knowledge of their locations. This might be caused by the fact that certain sensors have to be further apart or closer to each other because of installation barriers such as a wall. Or, it might be more efficient or convenient to install sensors on certain landmarks, such as on doors, windows, etc. At system startup, the localization routine is performed to determine all the sensors' locations.

Typically, this type of network is divided into clusters, each with a cluster head. The cluster head also acts as an original anchor. For most applications, cluster heads are too far apart from each other to be used as a group of three anchors to localize other sensors. For localization to function, one or more of the clusters must add at least two extra anchors that are within its cluster head's and each other's certain communication range (usually within radio range of each other would be sufficient). The example shown in FIG. 8 represents one such network.

Combining the first two criteria for assigning cluster priority, the following Cluster Priority Assignment Routine may be designed to determine the cluster priority for such a network.

1. Find all clusters that have three original anchors, and assign all these clusters priority 10 (the smallest priority value but the highest priority).

For example, in FIG. 8, clusters $\{c_7, c_9, c_{18}\}$ all have three original anchors; therefore, they are all assigned cluster priority 10. Table 2 tabulates partial cluster priority assignment rules for such a network. As can be seen from the first row, when the cluster is a three-anchor cluster itself, the cluster is assigned cluster priority 10.

2. If all clusters have been assigned a priority, go to Step 4. Otherwise go to Step 3.

3. For each cluster that has not been assigned a priority, find the cluster c that has the highest neighbor-priority, h. To avoid too many cluster priorities being generated in this step, the neighbor-priorities that have the same first digit (say s) are classified as one category and they are all counted towards the number p. Thus, p is set to be the number of neighboring clusters whose priorities have the same first digit as cluster c's neighbor-priority, h. Next, cluster c's priority is assigned to be (10(s+1)−p+9). It is assumed that a cluster has a maximum of eight neighboring clusters. For most applications, the design of network would inherently limit the cluster priorities to never go beyond the 100 range. The cluster priority calculation will therefore apply.

For example, in FIG. 8, cluster $c_{13}$ has three neighboring clusters with priority 10. This cluster will be assigned priority (10(1+1)−3+9=26), as listed in the 7th row in Table 2.

4. Report all cluster priorities and stop.

Going through the whole Cluster Priority Assignment routine for the example in FIG. 8, yields the cluster priorities listed in Table 3.

Synchronization Among Parallel Processes

As discussed above, after the cluster priorities are assigned, a sequence of clusters is generated from these priorities to determine the order of localization for each cluster. A cluster with a higher priority goes before a cluster with a lower priority. Clusters with the same priority go in parallel.

For each cluster that is ready for the coming parallel iteration, a cluster-level "full" problem is formed from all reachable anchors in the neighboring clusters plus sensors and anchors belonging to this cluster. These smaller "full" problems for each cluster are solved by the methods of the present disclosure described above, and are processed in parallel by the cluster heads in the network. Thus, the synchronization process involves the following:

Enforcing the order: The lower priority clusters should be run after the higher priority clusters are localized, to take advantage of the newly available anchors in the neighboring clusters. Only clusters at the same priority proceed in parallel.

Updating the neighboring clusters with newly localized anchor information: After the parallel clusters have been localized, their newly localized acting anchors should be fed into all their neighboring cluster heads so that the next parallel iteration will make use of the new information.

Distributed Sensor Localization Algorithm

In accordance with one embodiment of the present invention, a distributed sensor localization method is provided. First, the cluster priority is determined for each cluster in the network. This may be done at the command center machine level by the routine described above. Second, at the command center machine, the cluster localization order is sequenced according to cluster priorities. A cluster with a higher priority ranks before a cluster with lower priority. Clusters with the same cluster priority are put in the same rank. Hence, a list of cluster ranks is produced. Assuming r ranks are produced, for each rank i in the list, there is a list of cluster indexes l associated with i. The list l could include one index, or multiple indexes, which means that there are multiple clusters put in the same rank.

In the command center level, all cluster heads are synchronized to do localizations.

For each rank i from 1 to r:
For all clusters in l of same rank i:
Request all cluster heads in l to localize their own sensors simultaneously. For each cluster c in l, the cluster head does the following tasks in parallel:

Formulate cluster-level "full" problem, consisting of all the sensors, anchors, and distance measurements among them in cluster c, and all the anchor information from cluster c's neighboring clusters that are within cluster c's radio range;

Call the localization routine of the present disclosure to solve the cluster-level "full" problem;

Update all cluster c's neighboring clusters with the newly localized acting anchors; and Report to the command center that localization is done.

When the command center receives reports from all clusters in l that they have finished localizing their own clusters, go to next i.

Finally, localization results are reported, and the process ends.

With reference to the example in FIG. 8, the method is executed as follows: First, the cluster priorities for this network are generated, as in Table 3. Next, a cluster rank list is generated as shown in Table 4. A total of 6 ranks are produced.

Synchronization is performed as follows:

For i=1, cluster heads {7, 9, 18} localize their clusters in parallel.

For i=2, cluster head {13} localizes its cluster alone.

For i=3, cluster heads {3, 8, 12, 14} localize their clusters in parallel.

For i=4, cluster heads {1, 2, 4, 5, 6, 10, 11, 15, 17, 19, 22, 23, 24} localize their clusters in parallel.

For i=5, cluster heads {16, 20} localize their clusters in parallel.

For i=6, cluster heads {21, 25} localize their clusters in parallel.

All clusters are now localized; the results are reported, and the process ends.

Figure 9:
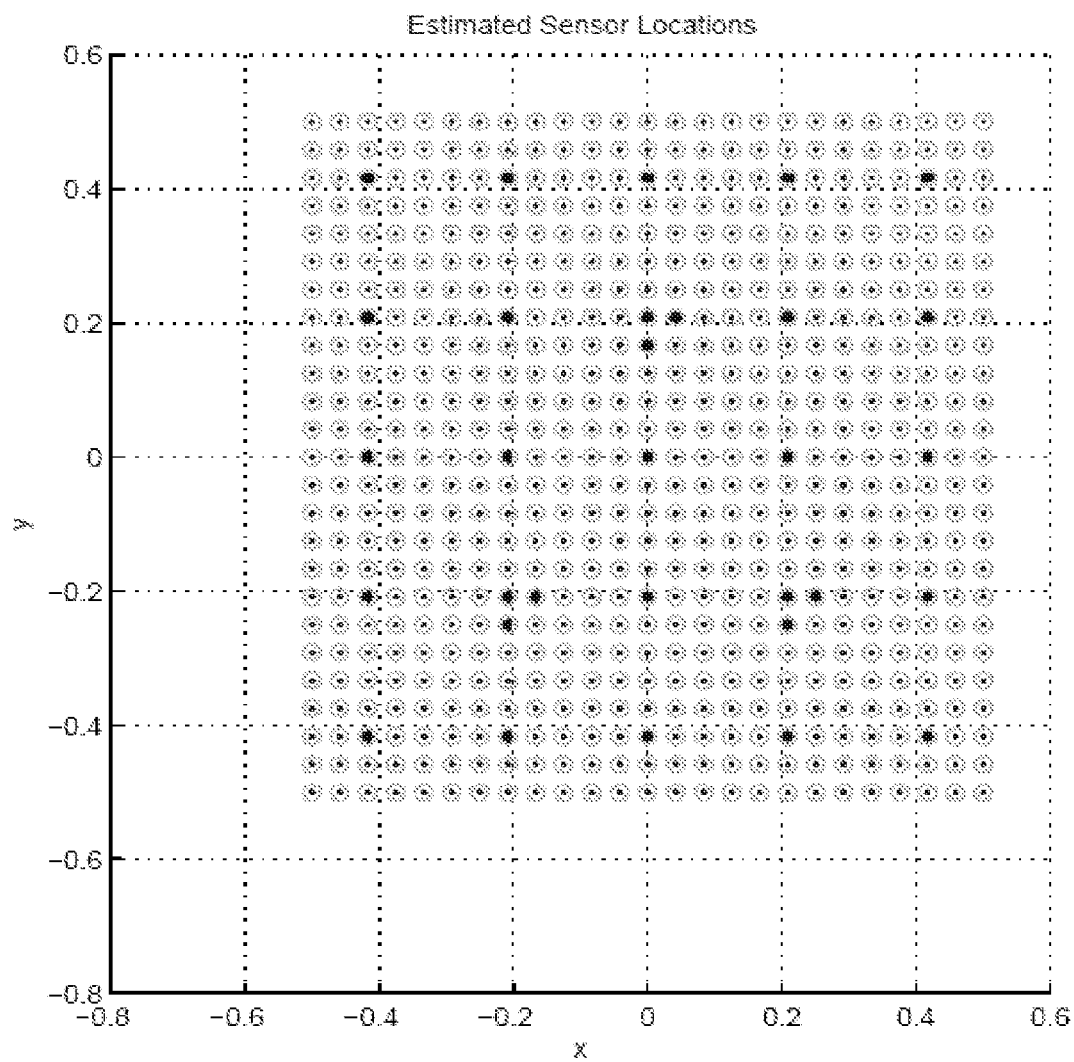
FIG. 9 depicts an exemplary plot of sensors localized in accordance with one embodiment of the present invention.

FIG. 9 shows the localization results for the above example with 625 total nodes in the network, including 25 clusters and 25 nodes in each cluster, with a radius of approximately 0.16, and no noise. The algorithm accurately localized all sensors one cluster at a time with substantially zero errors.

3D Extensions

Sensor localization in three-dimensional space addresses the desire to estimate sensors' locations whose distributions are beyond a plane surface in wireless sensor networks. For example, if an ad hoc wireless sensor network is used to detect fire hazard in a high-rise building, sensors may be placed on different floors. In accordance with one embodiment of the present invention, a 3D sensor localization method is provided which extends the 2D localization method. Modifications to the 2D implementation may be made to permit effective 3D sensor localizations.

3D Sensor Localization Geometry

To be localizable in 3D, at least four known distance measurements to at least four anchors that are not on a plane are used. For example, assume a sensor at location $x \in R^3$ connects to four anchors whose known locations are $a, b, c, e \in R^3$. The four known distance measurements between the sensor and the four anchors are $\hat{d}_1, \hat{d}_2, \hat{d}_3, \hat{d}_4$.

The first two spheres centered at anchors $a, b$ with respective radii of $\hat{d}_1, \hat{d}_2$ put sensor x on a circle defined by the following two spheres' surfaces:

$$\|x-a\|^2 = \hat{d}_1^2, \qquad \text{Eq. 28}$$

$$\|x-b\|^2 = \hat{d}_2^2. \qquad \text{Eq. 29}$$

Adding the third sphere centered from anchor c with radius of $\hat{d}_3$ puts sensor x on two points x* or x** defined by the following three spheres' surfaces:

$$\|x-a\|^2 = \hat{d}_1^2, \qquad \text{Eq. 30}$$

$$\|x-b\|^2 = \hat{d}_2^2, \qquad \text{Eq. 31}$$

$$\|x-c\|^2 = \hat{d}_3^2. \qquad \text{Eq. 32}$$

Adding the fourth sphere centered at anchor e with radius of $\hat{d}_4$ puts sensor x exactly on one of the two points x* or x** defined by the following four spheres' surfaces:

$$\|x-a\|^2 = \hat{d}_1^2, \qquad \text{Eq. 33}$$

$$\|x-b\|^2 = \hat{d}_2^2, \qquad \text{Eq. 34}$$

$$\|x-c\|^2 = \hat{d}_3^2, \qquad \text{Eq. 35}$$

$$\|x-d\|^2 = \hat{d}_4^2. \qquad \text{Eq. 36}$$

Therefore, to localize a sensor uniquely under no-noise conditions, at least four distance measurements from at least four of the sensor's connected anchors are used.

3D Localization Design

Various adjustments are made to the 2D version of the localization method in order to provide for 3D localization, as discussed further below.

A parameter called DIM for dimensions is assigned a value of two for the 2D case, or three for the 3D case.

The rules for subproblem creation for the 2D scenario discussed above may be adjusted for the 3D scenario. The subproblem to be processed by the SDP solver may also be adjusted to accommodate the extra dimension.

In the independent subanchor selection routine discussed above, instead of checking whether three points are on a line in the 2D case, the routine can check whether four points are on a plane. If so, the four anchors may be said to be dependent.

The auxiliary geometric routines discussed above can still be applied to the 3D case with proper adjustment of dimensions. For example, the routine for sensors in 2D with only two connected anchors to localize with more accuracy utilizing neighboring anchors' information can be extended to 3D space for sensors with only three connected anchors. The same technique can be used first to calculate the two possible points where the sensor could be using three distance equations. Then, one of the two possible points may be eliminated by the sensor's anchors' neighboring anchors.

Sensor Localization in Anchorless Networks

A preprocessor referred to as a Surrogate Anchor Selection may be used to localize a network where no absolute locations are known for any node in the network. Such networks are referred to as anchorless networks. Sensor localization without absolute position information is helpful for homogeneous networks, where any node may become mobile.

In an anchorless network, each node can estimate the distance to each of its neighbors, but no absolute position references such as GPS or fixed anchor nodes are available. Localization of sensors in this type of network involves, given pair-wise distance measurements between sensors, recovering the relative positions of each sensor up to a global rotation and translation.

Surrogate Anchor Selection

In accordance with the present embodiment, certain sensors may be chosen as reference points (referred to as surrogate anchors), such that the rest of the sensors can be localized relative to these positions. Three surrogate anchors that are not on a line can be used to localize the rest of the sensors uniquely on the plane that the three surrogate anchors are on. (It is assumed that the network is on a plane; however, the method can be intuitively expanded to 3D space.) The surrogate anchors $SA = \{a_1, a_2, a_3\}$ in a network are a subset of sensors in the same network. Suppose the subset happens to be sensors $\{s_1, s_2, s_3\}$ with pair-wise distance measurements $\hat{d}_{12}, \hat{d}_{13}, \hat{d}_{23}$. These surrogate sensors satisfy the following properties:

The first surrogate anchor $a_1$ corresponding to $s_1$ is artificially set to a position of (0+0). The second surrogate anchor $a_2$ corresponding to $s_2$ is set to a position of $(\hat{d}_{12}, 0)$. The third surrogate anchor $a_3$ corresponding to $s_3$ is set to a position of $(x^*_x, x^*_y)$, an intersection of the following two circles:

$$x_x^2 + x_y^2 = (\hat{d}_{13})^2, \qquad \text{Eq. 37}$$

$$(x_x - \hat{d}_{12})^2 + x_y^2 = (\hat{d}_{23})^2. \qquad \text{Eq. 38}$$

Generally there would be two solutions to the above equations. Either one can be chosen as $(x^*_x, x^*_y)$.

A preprocessor may be provided to select three sensors to act as surrogate anchors in the network. The sensor localization method can then be applied to localize the remaining sensor nodes relative to the surrogate anchors' positions.

In choosing the surrogate anchors, priority may be given to sensors with the highest connectivity to other nodes in the network, in order to reduce transitive errors.

Figure 10:
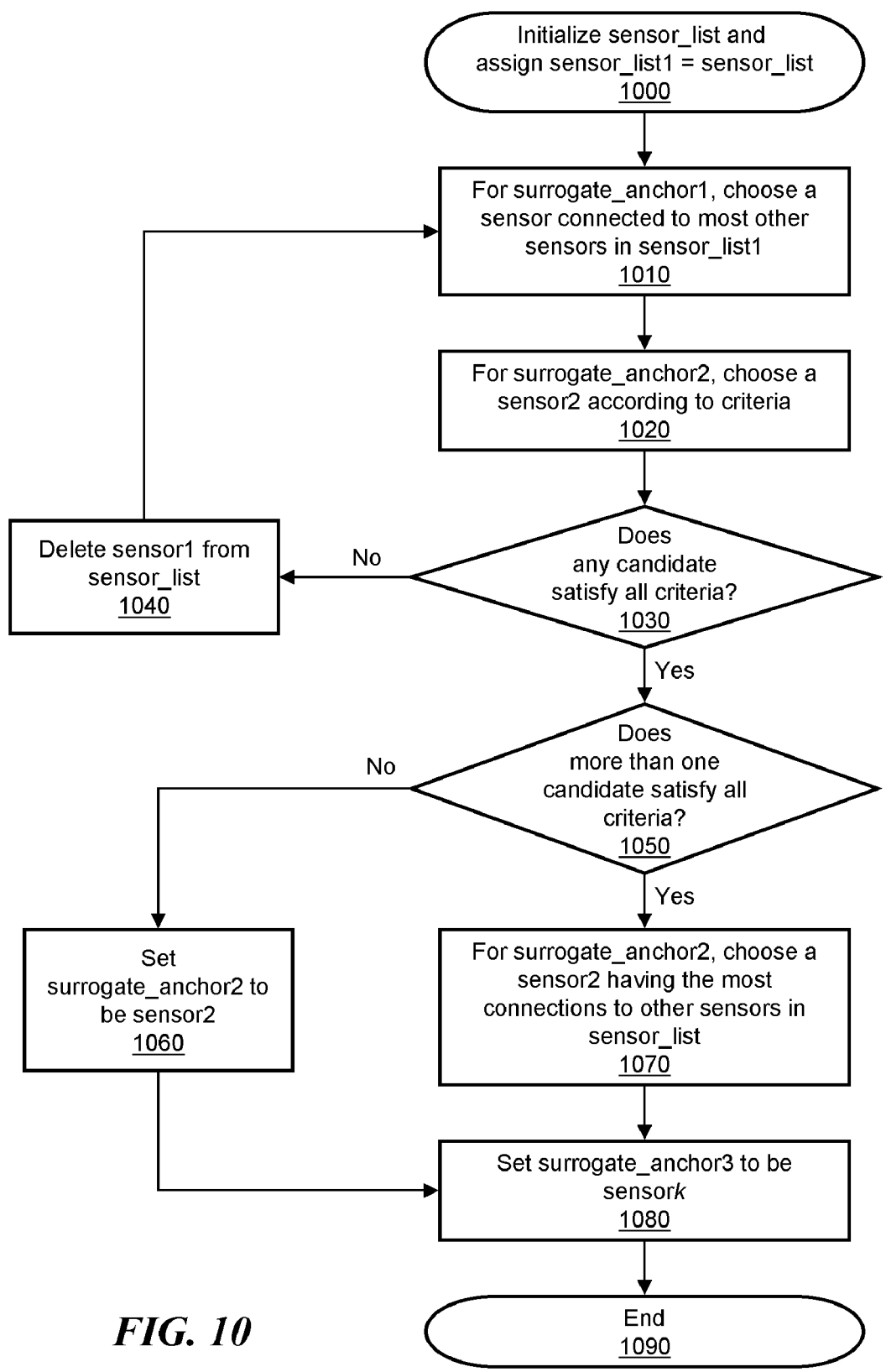
FIG. 10 depicts a process flow diagram for an exemplary method of selecting surrogate anchors in an anchorless network accordance with one embodiment of the present invention.

Reference is now made to FIG. 10, which depicts a process flow diagram for a process for selecting three surrogate anchors in accordance with one embodiment of the present invention. The process begins in step 1000 by initializing the sensor list to include all sensors in the network, and assigning sensor_list1=sensor_list.

In step 1010, for surrogate_anchor1, the sensor connected to most other sensors in sensor list1 is chosen, e.g., sensor1.

In step 1020, for surrogate_anchor2, sensor2 is chosen such that certain criteria are met. For example, it may be selected such that it is connected to surrogate anchor1; it is connected to some node sensor k that is also connected to surrogate anchor1; and sensor1, sensor2, and sensork are not on the same line.

If there is no candidate satisfying the criteria in decision 1030, sensor1 is deleted from sensor_list1 in step 1040, and process flow returns to step 1010.

If only one candidate satisfies the above criteria in decision 1050, surrogate_anchor2 is set to sensor2 in step 1060.

If more than one candidate satisfies the criteria in decision 1050, the one that has the most connections to other sensors in sensor_list is chosen in step 1070, and surrogate_anchor3 is set to be sensork in step 1080. The process ends at step 1090.

The following illustrative example applies the above approach for sensor localization of anchorless networks using the surrogate anchor preprocessor.

As an example, suppose a network has 16 sensors, and a table of pair-wise distance measurements shown as dist in FIG. 11 is given, where $\sigma = \sqrt{2}$.

In step 1010, the surrogate anchor selection procedure finds surrogate_anchor1 to be sensor 11 because that sensor has the most connections to other sensors. In step 1020, sensor 10 is chosen to be surrogate_anchor2 because it connects to sensor 11 and to sensor 7 (this is sensor k, which is also connected to 11) and it has the most connections to other sensors. Thus, surrogate_anchor3 is determined to be sensor 7.

Now there are three surrogate anchors $s_{11}, s_{10}, s_7$. The first surrogate anchor $s_{11}$ is given point position (0, 0), and the second surrogate anchor $s_{10}$ is given point position (1, 0) because the distance between $s_{11}$ and $s_{10}$ is 1. For surrogate_anchor 3's position, the following equations can be solved:

$$x_x^2 + x_y^2 = 1, \qquad \text{Eq. 39}$$

$$(x_x-1)^2 + x_y^2 = 2. \qquad \text{Eq. 40}$$

The roots of these equations give two points: (0, 1) and (0, −1). Either point can be chosen. Out of habit, the one with a positive coordinate, namely, (0, 1), is chosen in this example.

Figure 12:
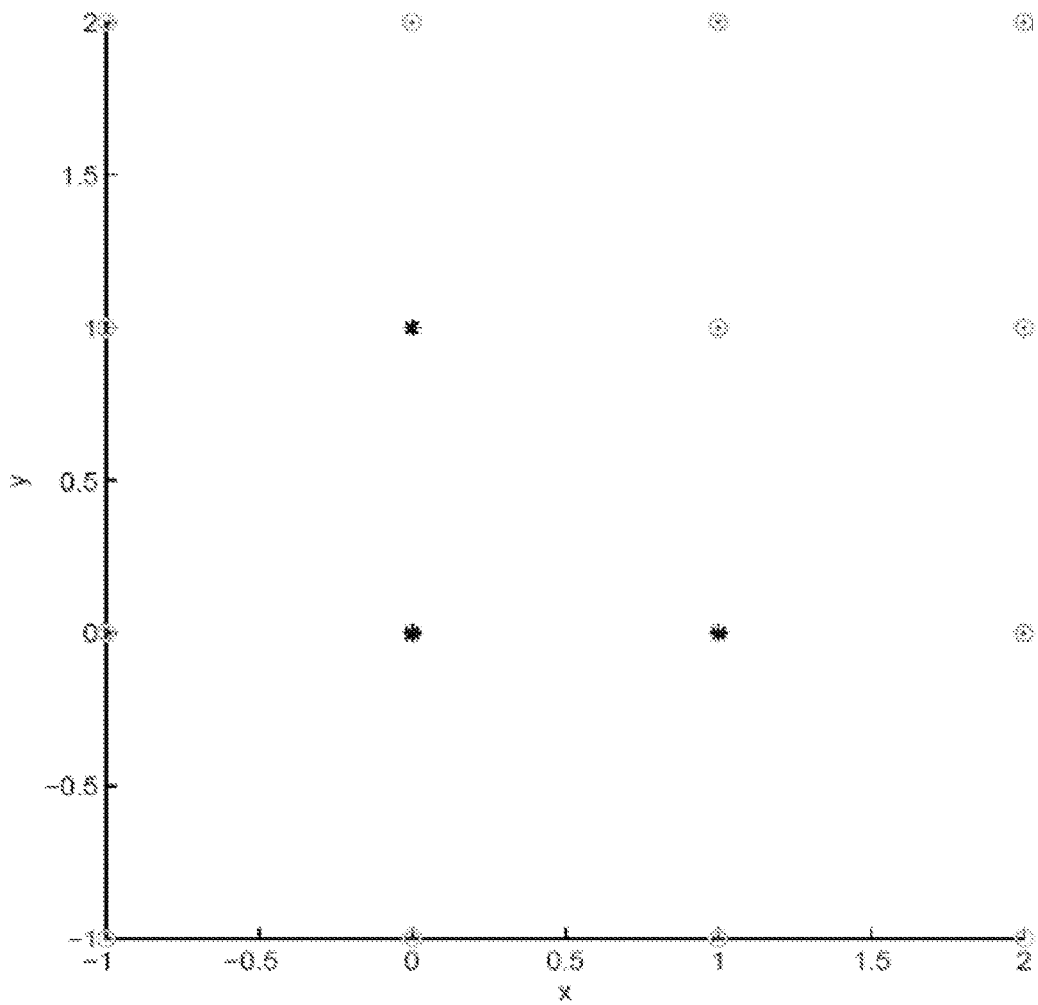
FIG. 12 depicts an exemplary plot of sensors localized in accordance with one embodiment of the present invention.

With the distance matrix and three surrogate anchors and their reference positions, the sensor localization routine is called to localize the remaining sensors. The relative positions of all sensors output by the sensor localization routine are depicted in FIG. 12. As can be seen, the illustration recovers the relative positions of all 16 nodes satisfying all the distance measurements in dist.

Simulation

The methods disclosed herein can allow for advancements in scalability and accuracy as compared with existing methods. Existing localization methods have been applicable for only moderate-sized networks. One recent optimization approach uses SDP to find an approximate solution. The speed and accuracy of that approach can decline with network size. The computational complexity of that approach is $O(n^p)$, where p is between approximately 3 and approximately 4.

The complexity of various embodiments of the disclosed methods is $O(n)$. For example, on a 2.4 GHz laptop with 1 GB memory, the algorithm can maintain efficiency and provide accurate position estimation for networks with approximately 10,000 sensors and beyond.

For the simulation, a total number of nodes n (including s sensors and m anchors) was specified in the range of approximately 4 to approximately 10,000. The locations of these nodes were assigned with a uniform random distribution on a square region of size r×r where r=1, or put on the grid points of a regular topology such as a square or an equilateral triangle on the same region. The m anchors were randomly chosen from the given n nodes. It was assumed that all sensors have the same radio range (radius) for any given test case. Various radio ranges were tested in the simulation.

Euclidean distances $d_{ij}=\|x_i-x_j\|$ were calculated among all sensor pairs (i, j) for i<j. Then $d_{ij}$ was used to simulate measured distances, where $\hat{d}_{ij}$ is $d_{ij}$ times a random error simulated by noise_factor∈[0, 1]. For a given radius ⊂[0, 1], if $d_{ij}$>radius, the lower bound $r_{ij}$=1.001*radius is used in the SDP model. If $d_{ij}$<radius, then $\hat{d}_{ij}=d_{ij}(1+\text{rn}*\text{noise\_factor})$, where rn is normally distributed with mean zero and variance one. (Any numbers generated outside (−1,1) are regenerated.)

In practical networks, depending on the technologies that are being used to obtain the distance measurements, there may be many factors that contribute to the noise level. For example, one way to obtain the distance measurement is to use the received radio signal strength between two sensors. The signal strength could be affected by media or obstacles in between the two sensors. A noise_factor with a normally distributed random variable with mean zero and variance one was used to simulate noises. This model can be replaced by any other noise level models in practice.

If $d_{ij}$>radius, then $\hat{d}_{ij}$=0 and the bound $r_{ij}$=1.001*radius is used in the SDP model.

In the simulation, the average estimation error was $$\frac{1}{e}\sum_{i=1}^{e}\|\bar{x}_i - x_i\|,$$

where $\bar{x}_i$ is from the SDP solution and $x_i$ is the ith node's true location. However, in a practical setting, the node's trace $\tau_i$ (2.5) would be used to gauge the estimation error.

To convey the distribution of estimation errors and trace, the 95% quartile is provided. Factors such as noise level, radio range and anchor densities can have direct impacts on localization accuracy. The sensors' estimated locations are derived directly for the given distance measurements. If the noise level on these measurements is high, it would directly impact the estimation accuracy of the sensor's position. A sufficiently large radio range is helpful for achieving accurate location estimation. Too small of a radio range might cause most sensors to have low connectivity or even be unreachable. Intuitively, more anchors in the network should help with the sensors' estimation accuracy due to more accurate reference points.

The simulation results were averaged over several runs and show the accuracy and scalability of the methods of various embodiments of the present invention. The impact of various radio ranges, anchor densities, and noise levels on the accuracy and performance of the methods are observable. Computations were performed on a laptop computer with 2.4 GHz CPU and 1 GB system memory, using MATLAB 6.5 for various embodiments of the present invention, and a Mex interface to DSDP5.0 (Benson, Ye, and Zhang) for the SDP subproblem solutions.

As discussed above, because of the $Y \succeq X^T X$ constraint relaxation, enforcing inequality constraints in Eq. 14 is not equivalent to enforcing them in the distance model Eq. 9. In order to observe the effectiveness of including these inequality constraints, simulations were conducted pursuant to various strategies, according to the number of times violated inequality constraints were checked and then included to obtain a new solution.

Figure 13:
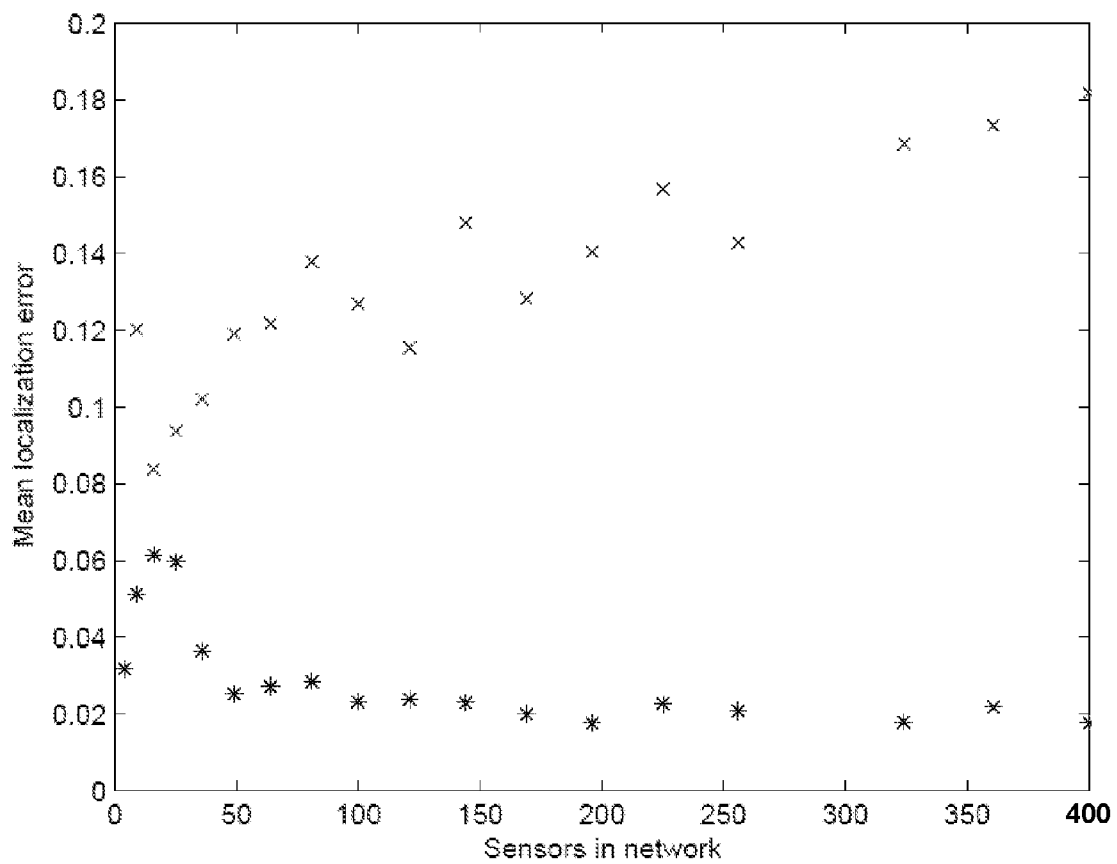
FIG. 13 depicts an exemplary plot of mean localization errors, for a prior-art localization method and for localization methods in accordance with various embodiments of the present invention.

FIG. 13 depicts a comparison of localization results in terms of the estimation accuracy between a pure SDP approach (labeled as SDP) and an approach in accordance with various embodiments of the present invention (labeled as Subproblem), for networks of various sizes. The sensors were placed at the vertices of an equilateral triangle grid with 0:1 noise_factor added to distance measurements. As shown, various embodiments of the present invention provide improved localization accuracy over the prior method.

Figure 14:
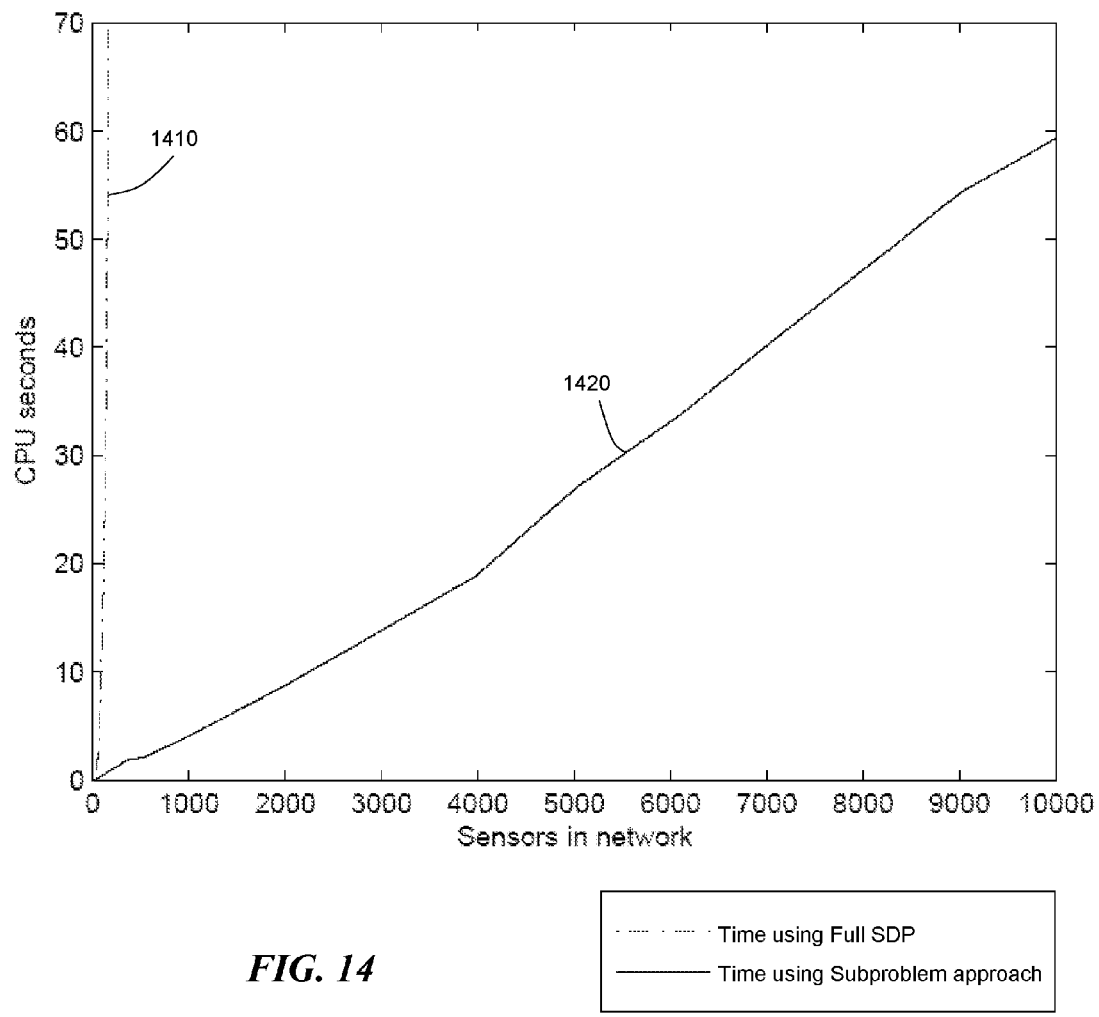
FIG. 14 depicts an exemplary plot of localization time, for a full SDP localization method and for localization methods in accordance with various embodiments of the present invention.

FIG. 14 depicts a comparison of localization results in terms of execution time for various sizes of networks. Data for the SDP curve 1410 was taken from simulation results as reflected in Table 5(a). Data for the curve 1420 was taken from simulation results as reflected in Table 6.

In the simulation results, I0 corresponds to solving the SDP problem with equality constraints only. (No inequality constraints are ever added.) The final solution is optimal for Eq. 14 without the inequality constraints involving $r_{ij}^2$ and $r_{ik}^2$.

In the simulation results, I1 corresponds to solving the SDP problem with all equalities and then adding all violated inequality constraints and re-solving it at most once.

In the simulation results, I2 corresponds to solving the SDP problem with all equalities (and no inequalities), and then adding violated inequality constraints and re-solving one or more times until all inequalities are satisfied. The final solution is an optimal solution to Eq. 14.

The simulation results show that the added inequality constraints do not always provide better localization accuracy, but can increase the execution time. In the following examples, the inequality constraints' impact is illustrated. In one example, there is no noise but low connectivity. In the other example, there is full connectivity but with noise.

In the first example, simulation results were run on a network of 100 randomly uniform-distributed sensors with radius of approximately 0.2275 and ten randomly selected anchors. One of the sensors happened to be connected to only two other nodes. The sensors were localized with the full SDP and with various embodiments of the present invention, using each of the I0, I1, I2 strategies in turn. And for various embodiments of the present invention, each case was examined with or without geometric routines. The results are shown in FIGS. 15A-15D and Table 9.

Figure 15A:
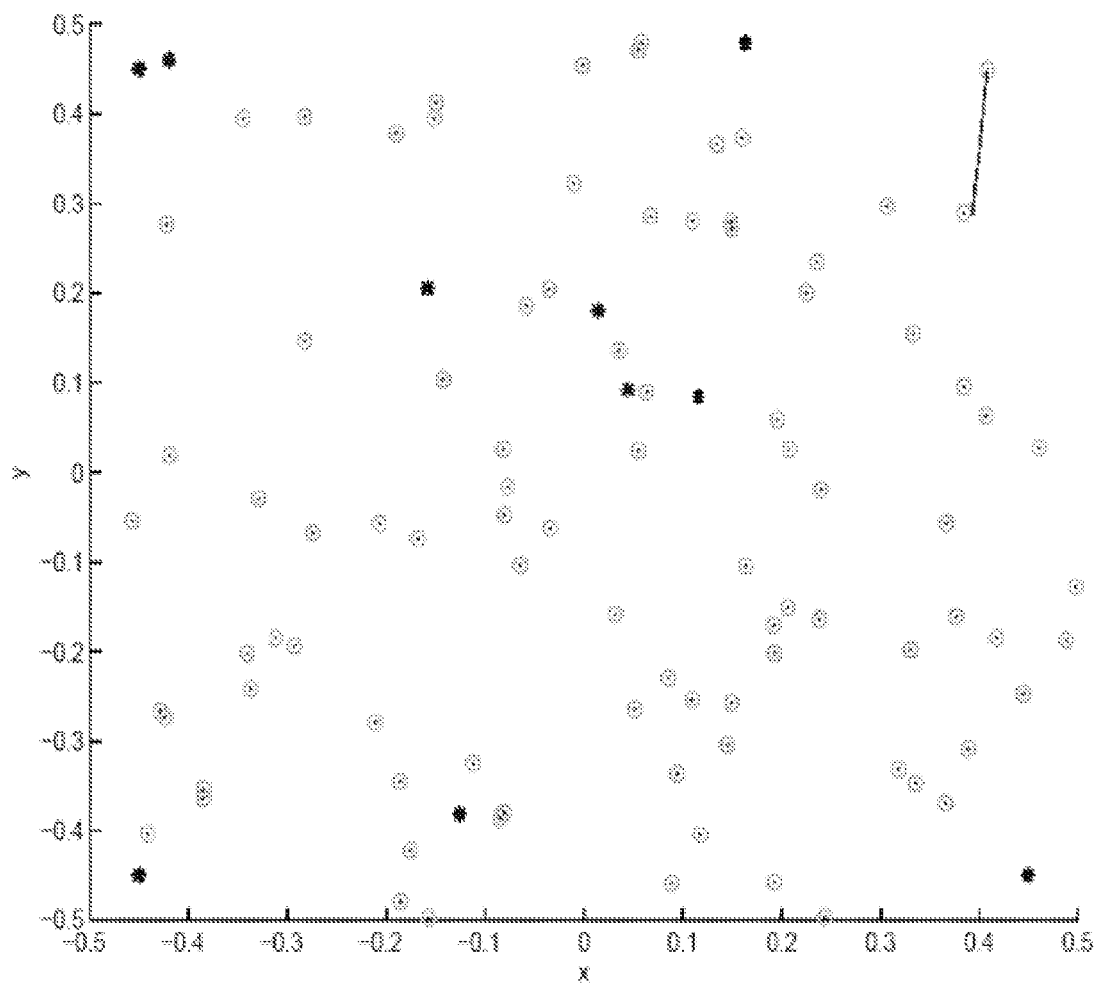
FIG. 15A depicts an exemplary plot of sensors localized in accordance with a SDP localization method.
Figure 15B:
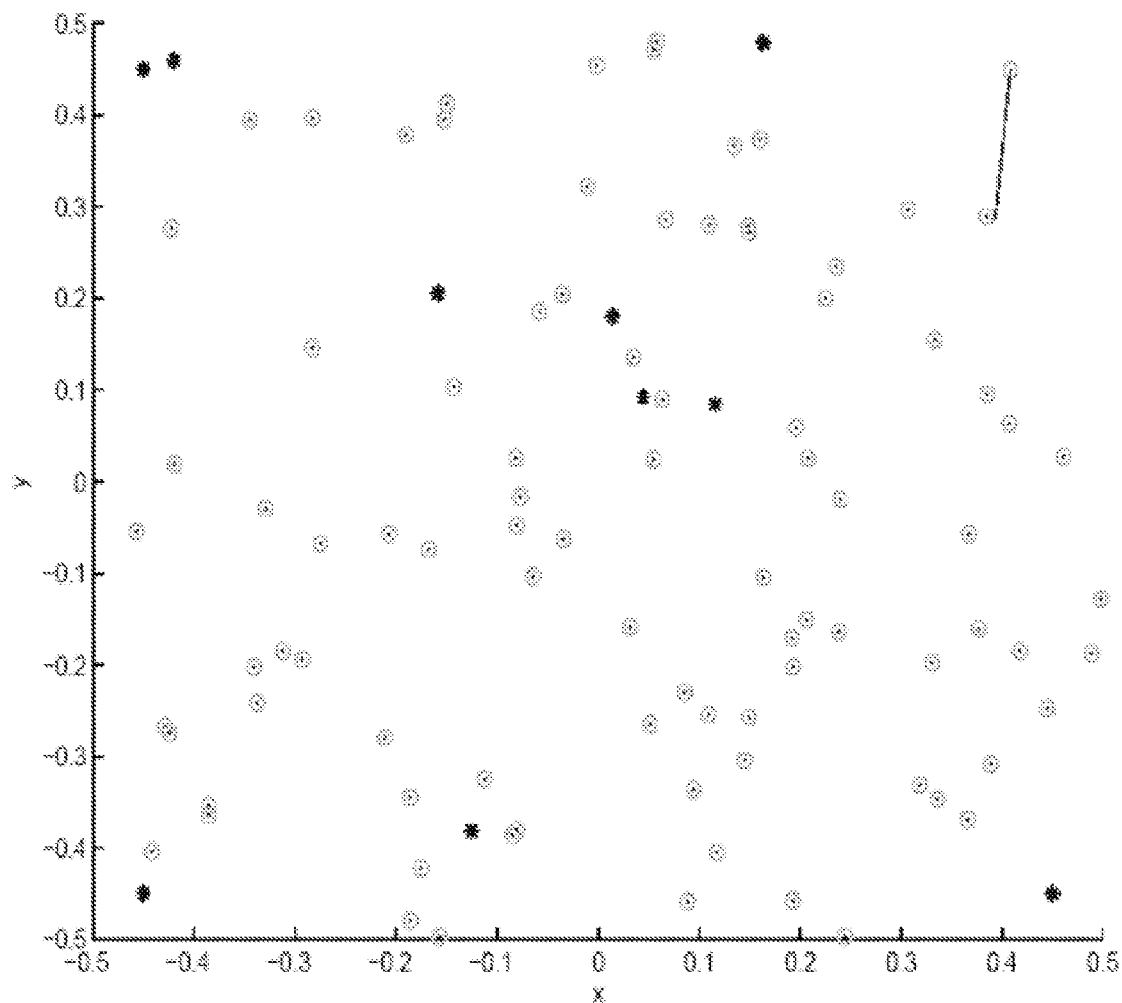
FIG. 15B depicts an exemplary plot of sensors localized in accordance with one embodiment of the present invention.
Figure 15C:
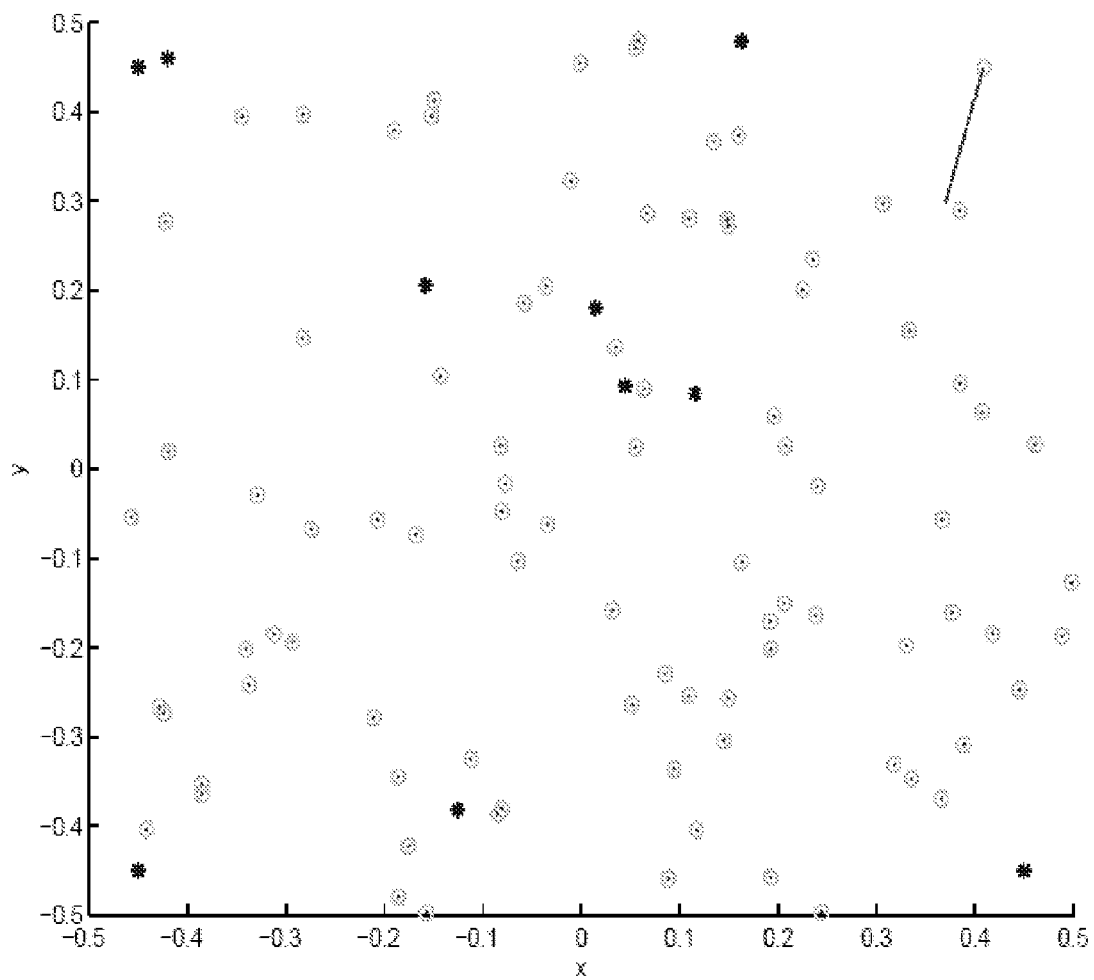
FIG. 15C depicts an exemplary plot of sensors localized in accordance with one embodiment of the present invention.
Figure 15D:
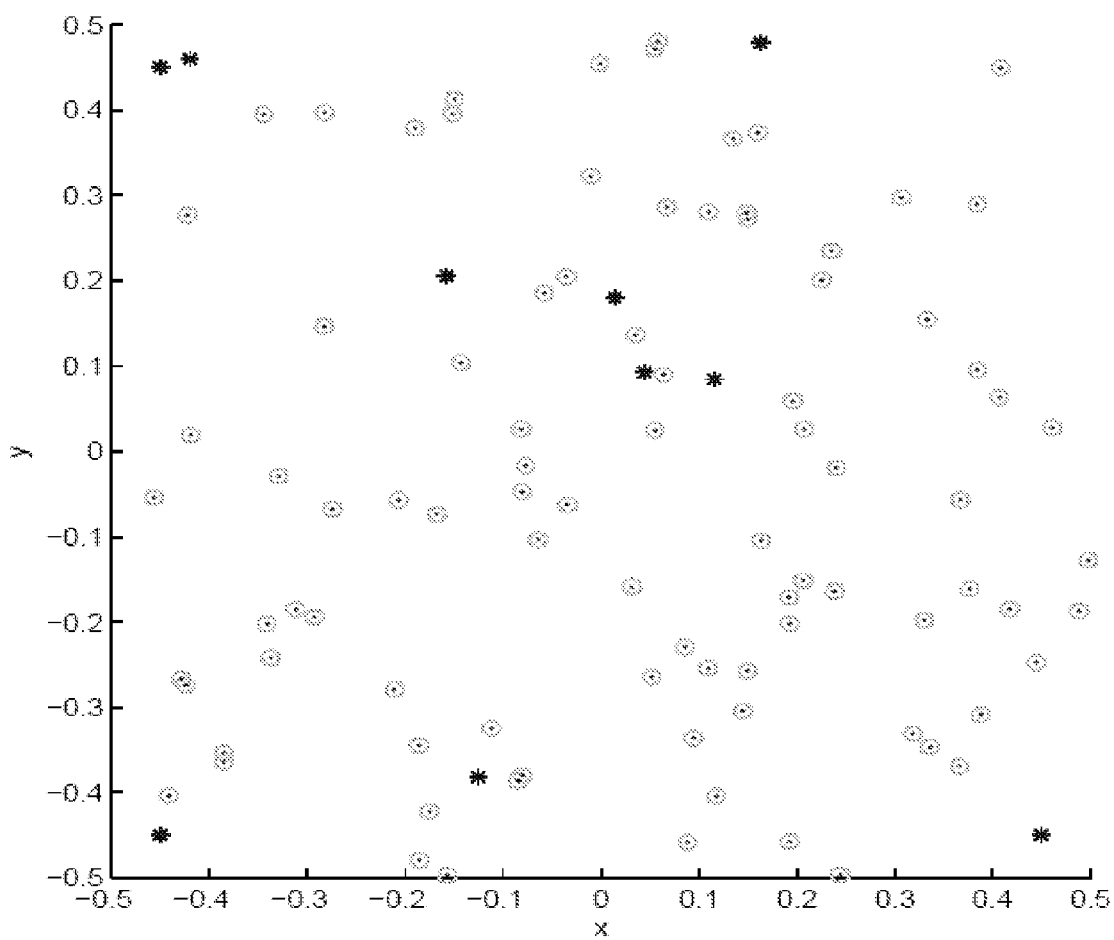
FIG. 15D depicts an exemplary plot of sensors localized in accordance with one embodiment of the present invention.

FIGS. 15A-15D show there is a sensor connected to only two anchors. For full SDP shown in FIG. 15A, no violated inequalities were found, so full SDP with I0, I1, I2 or had only one SDP call and generated the same results. In FIG. 15B with I0 and no geometric routine, SDP was called approximately 47 times (with no subsequent check for violated constraints). It produced similar estimation accuracy as the full SDP approach but with improved performance. In FIG. 15C, various embodiments of the present invention with I1 or I2 produced the same results, which means violated inequalities were found only once. Comparing FIG. 15B and FIG. 15C, it can be seen that including violated inequalities did improve the estimation accuracy slightly. Furthermore, in FIG. 15D, various embodiments of the present invention with I0 and geometric routines localized all sensors with virtually no error.

Table 9 shows that adding violated inequalities increases execution time slightly for various embodiments of the present invention.

In the second example, in order to observe the effectiveness of the inequality constraints under noise conditions, simulations were run for a network of 100 nodes whose true locations are at the vertices of an equilateral triangle grid. Ten anchors were placed along the middle grid-points of each row, and the radius is approximately 0.25. A noise factor of approximately 0.1 was applied to the distance measurements. The sensors were localized with either full SDP or various embodiments of the present invention using I0, I1, I2 in turn without geometric routines. (Although the geometric routines were not activated in this case, they are not a factor here because the localization error is not caused by low connectivity but by the noisy measurements.)

Figure 16A:
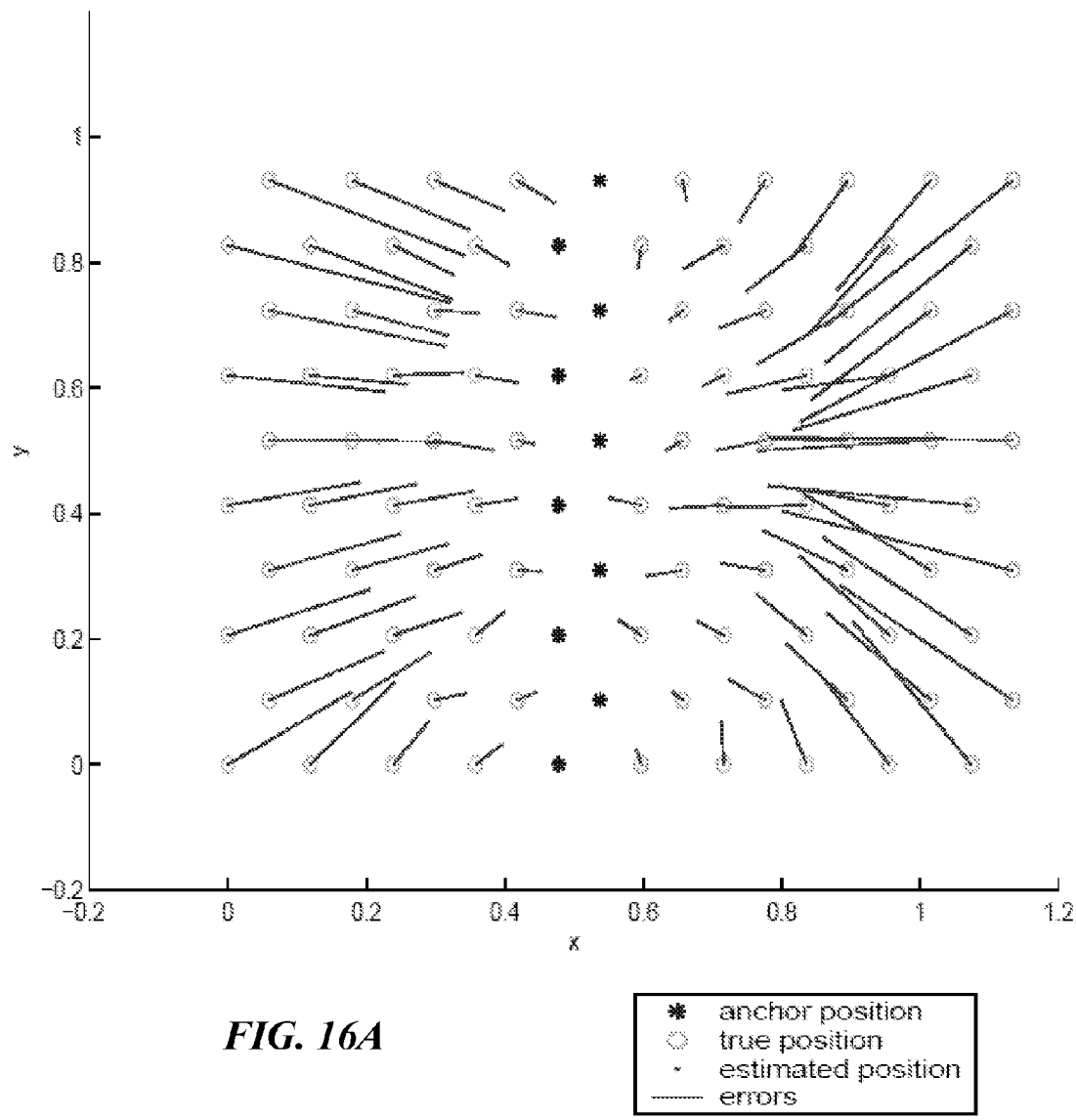
FIG. 16A depicts an exemplary plot of sensors localized in accordance with a full SDP localization method.
Figure 16B:
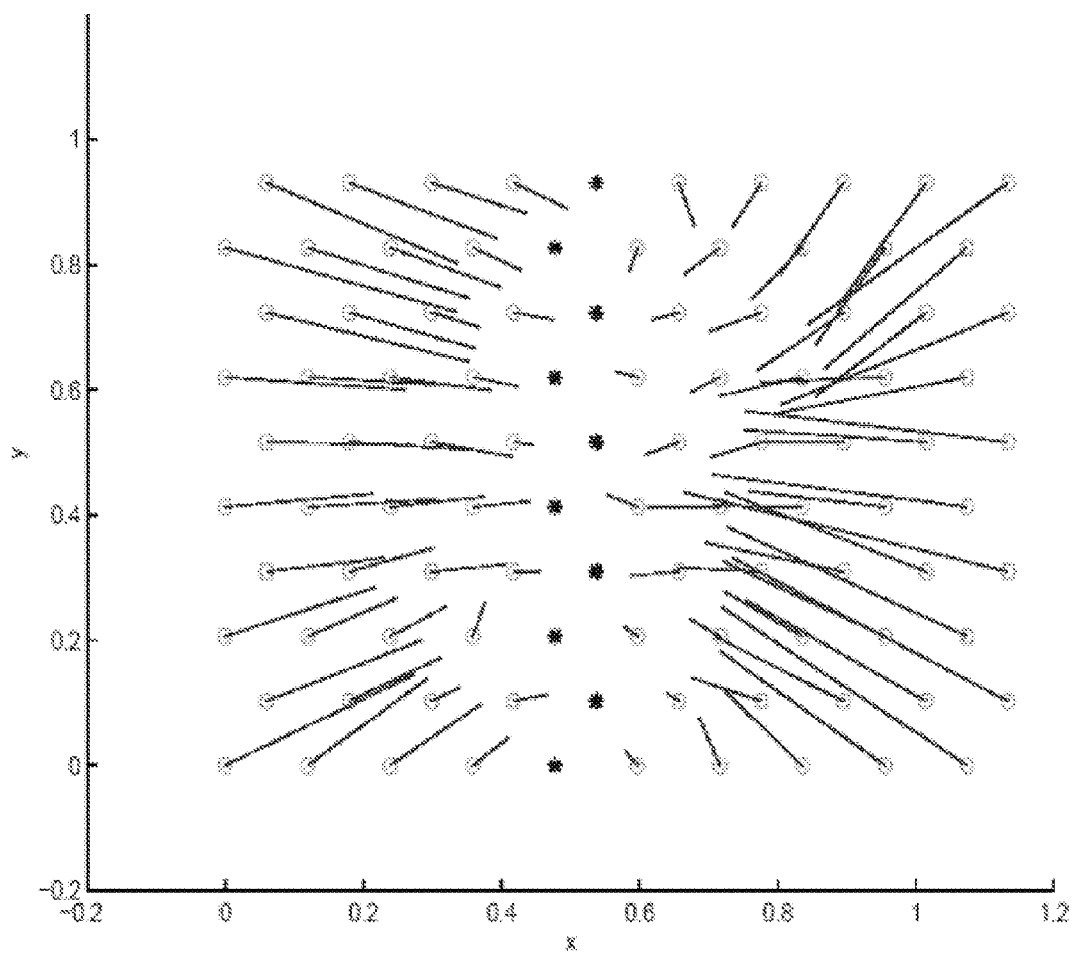
FIG. 16B depicts an exemplary plot of sensors localized in accordance with a full SDP localization method.
Figure 16C:
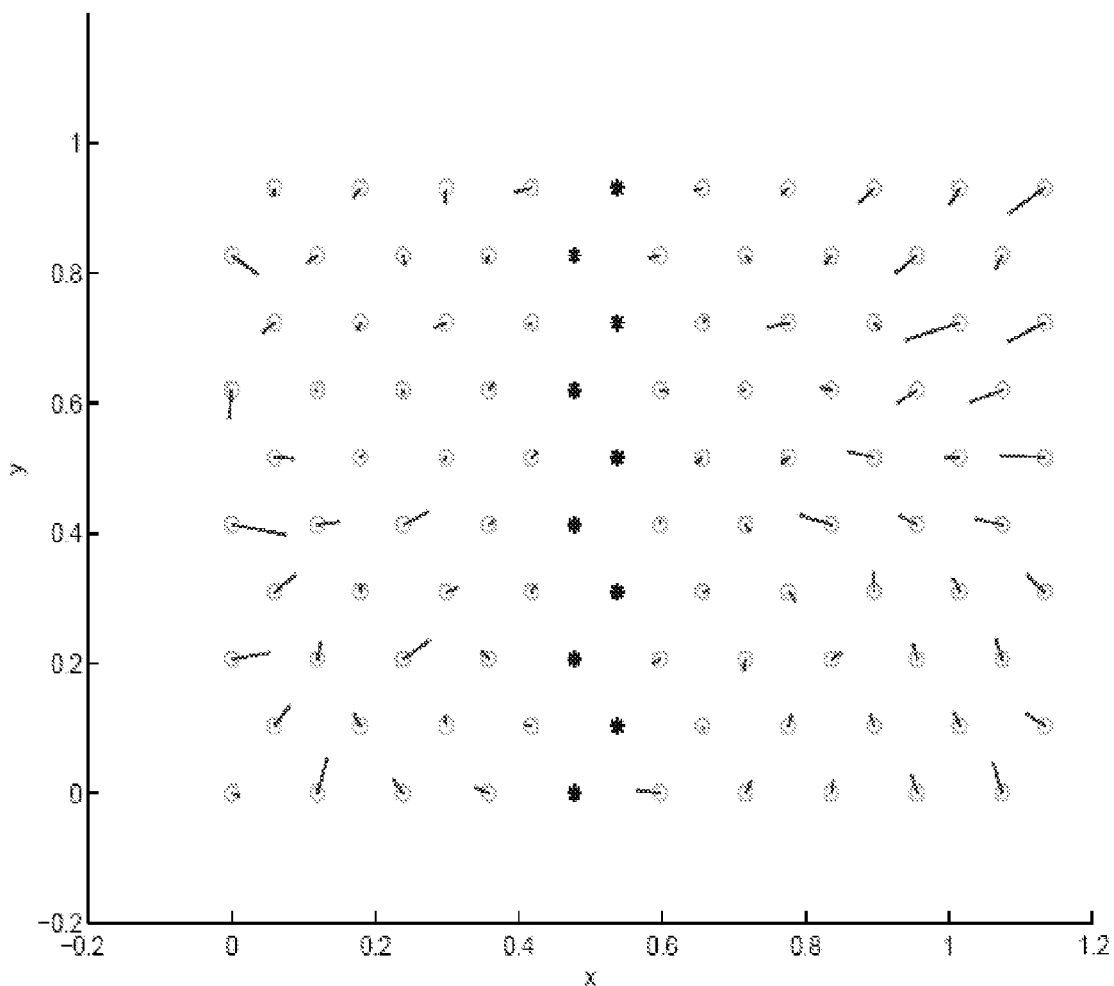
FIG. 16C depicts an exemplary plot of sensors localized in accordance with one embodiment of the present invention.
Figure 16D:
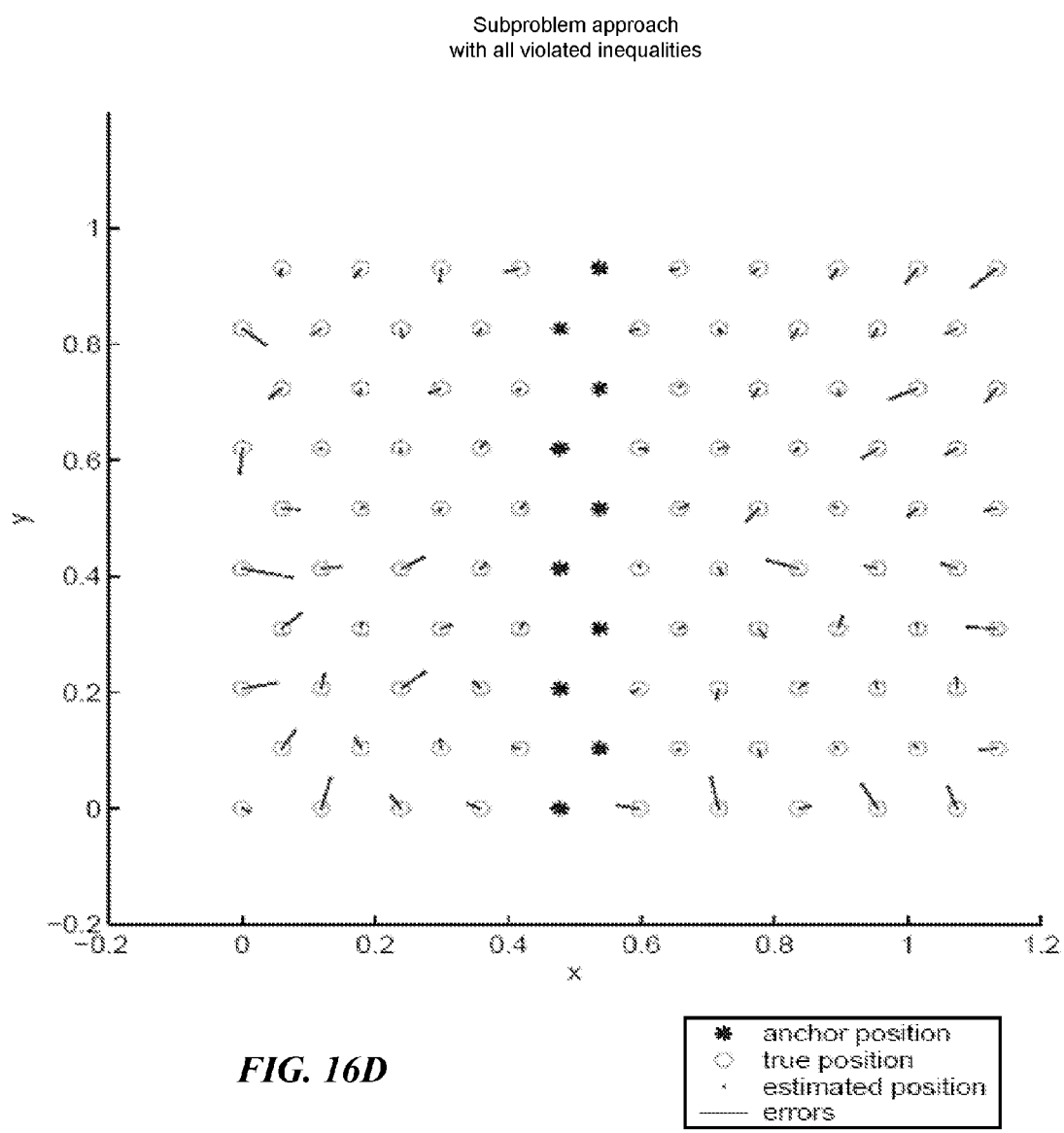
FIG. 16D depicts an exemplary plot of sensors localized in accordance with one embodiment of the present invention.

The results are shown in FIGS. 16A-16D and Table 10. FIG. 16B and FIG. 16D correspond to strategy I1 or I2 for full SDP and various embodiments of the present invention.

As shown, adding violated inequalities for full SDP not only increased the execution times dramatically, but also increased the localization error. For various embodiments of the present invention, adding violated inequalities improved the estimation accuracy slightly. Note that I1 and I2 produced the same results in accordance with various embodiments of the present invention.

In summary, the first experiment shows that when the errors are caused by low connectivity, various embodiments of the present invention with geometric routines and no inequality constraints (I0) outperforms various embodiments of the present invention with inequalities (I1 or I2) and all of the full SDP options. Given this observation, from now on geometric routines may be used instead of SDP to localize sensors connected to fewer than three anchors.

The second experiment indicates that under noise conditions, although adding violated inequalities does not seem to improve the estimation accuracy for full SDP, it does improve accuracy for various embodiments of the present invention.

In the subsequent sections, the inequality constraints' effects on accuracy and speed are discussed.

The performance of the pure SDP approach can decline rapidly with network size. Table 5 shows the localization results using full SDP (a) and using methods in accordance with various embodiments of the present invention (b) for a range of examples with various numbers of nodes whose true locations in the network were at the vertices of an equilateral triangle grid. Anchors were placed along the middle points of each row. A noise factor of approximately 0.1 was applied to the distance measurements.

The results show the impact of I0, I1, and I2 on estimation accuracy. As can be seen from Table 5(a), for full SDP, eight errors with I1 were larger than with I2, and five errors with I2 were larger than with I1, and eight errors with I1 were larger than with I2. Comparing I0 with I2, it can be seen that for each strategy, nine errors in I0 were larger than the errors for the other strategy. It appears that full SDP with added inequalities does not always improve the estimation accuracy in this simulation. For various embodiments of the present invention, I1 and I2 generate almost equivalent estimation accuracy, I0 had eight errors that were larger than with I1, while I1 had five errors that were larger than with I0. It is therefore difficult to judge the effectiveness of the added inequalities. Therefore, the added inequalities can provide only marginal accuracy improvement in various embodiments of the present invention.

Figure 17A:
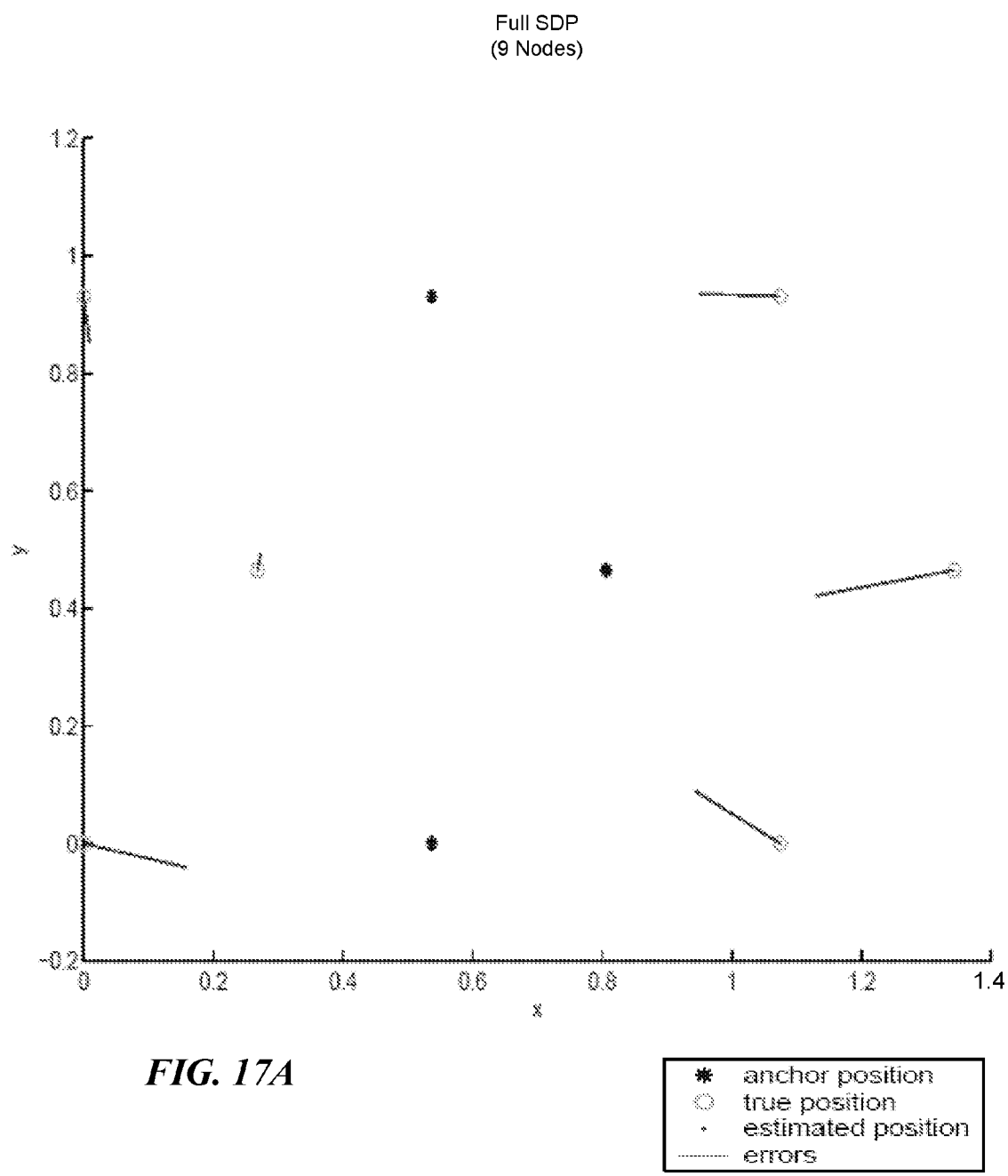
FIG. 17A depicts an exemplary plot of sensors localized in accordance with a SDP localization method.
Figure 17B:
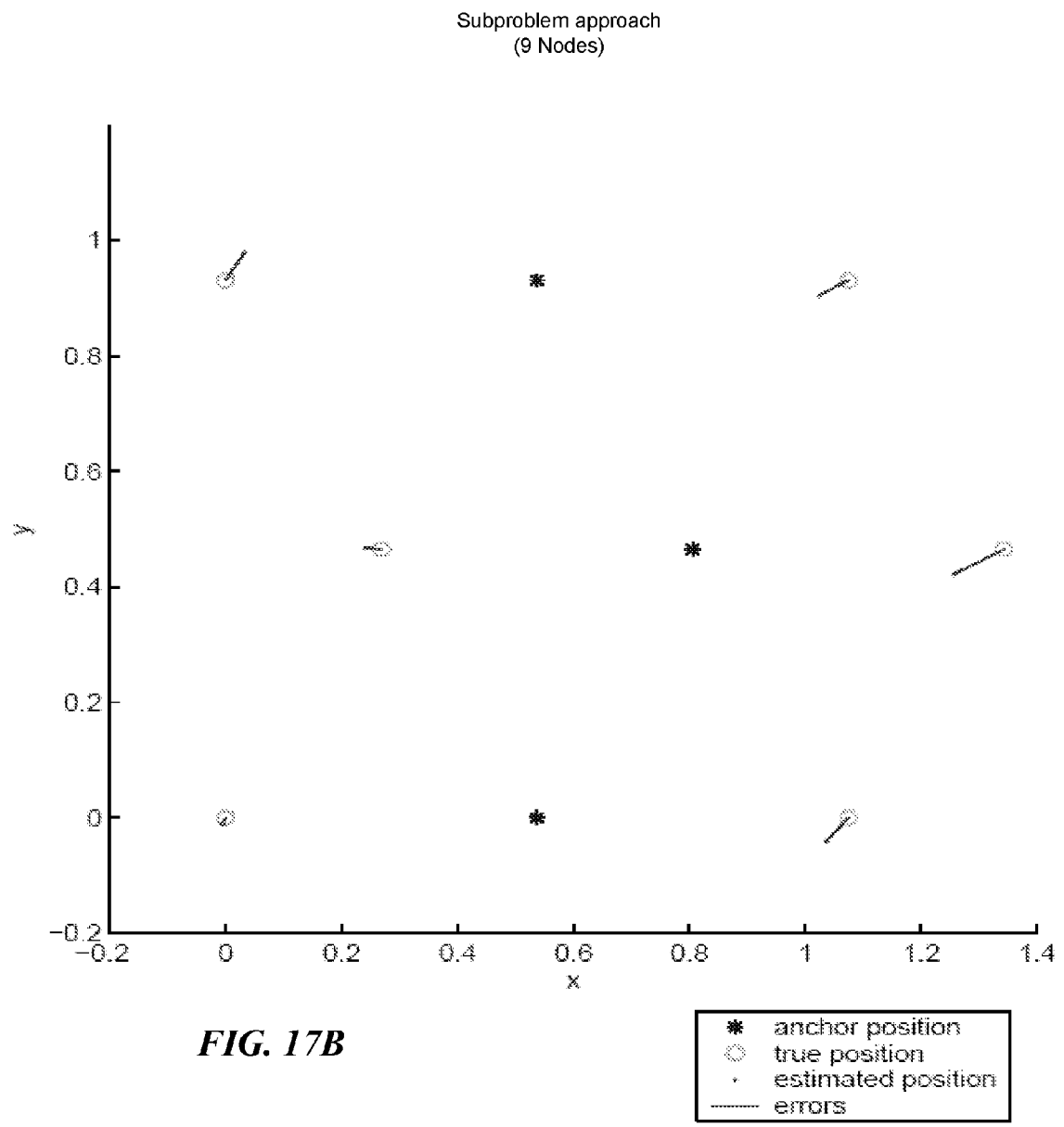
FIG. 17B depicts an exemplary plot of sensors localized in accordance with one embodiment of the present invention.
Figure 17C:
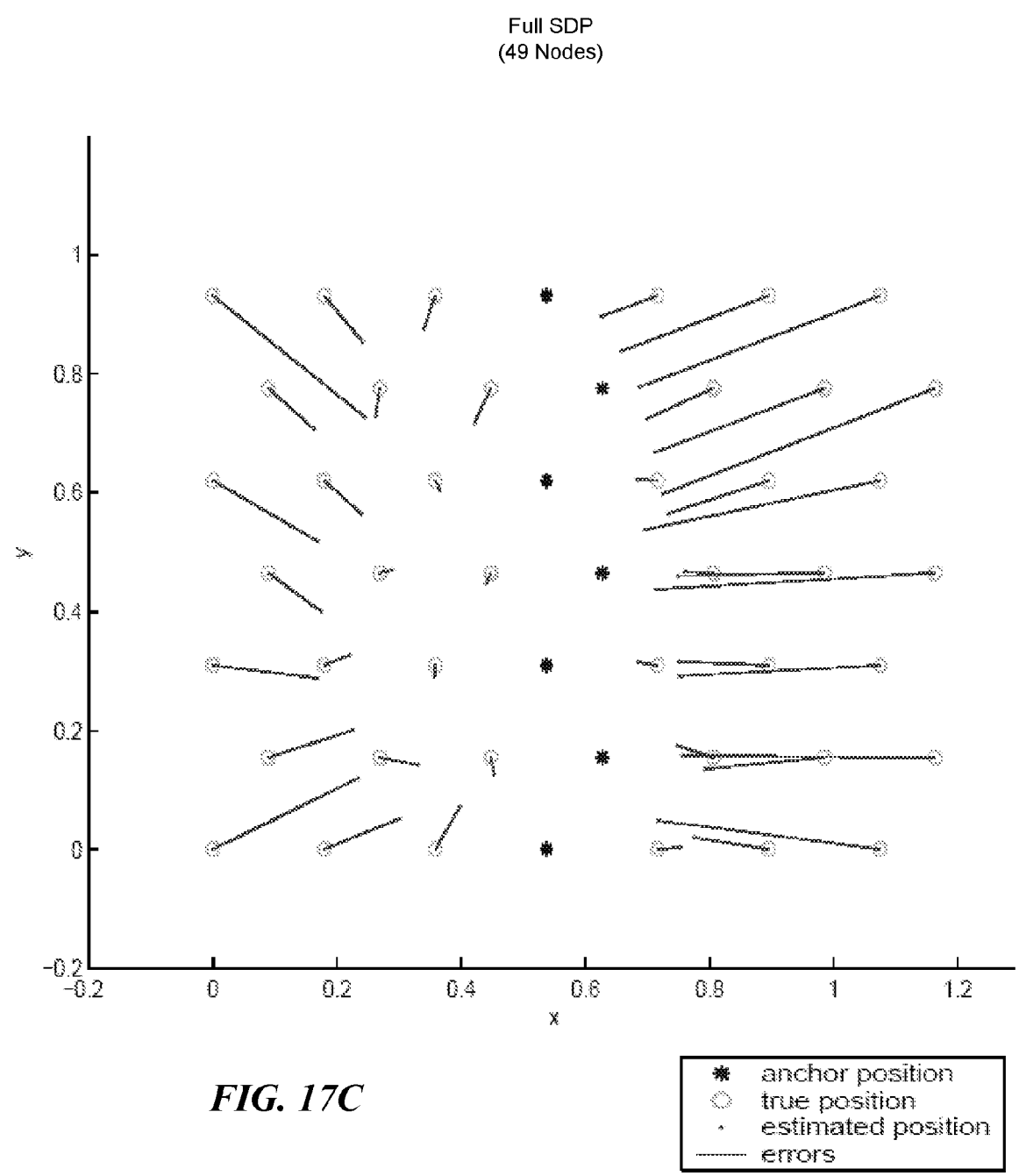
FIG. 17C depicts an exemplary plot of sensors localized in accordance with a SDP localization method.
Figure 17D:
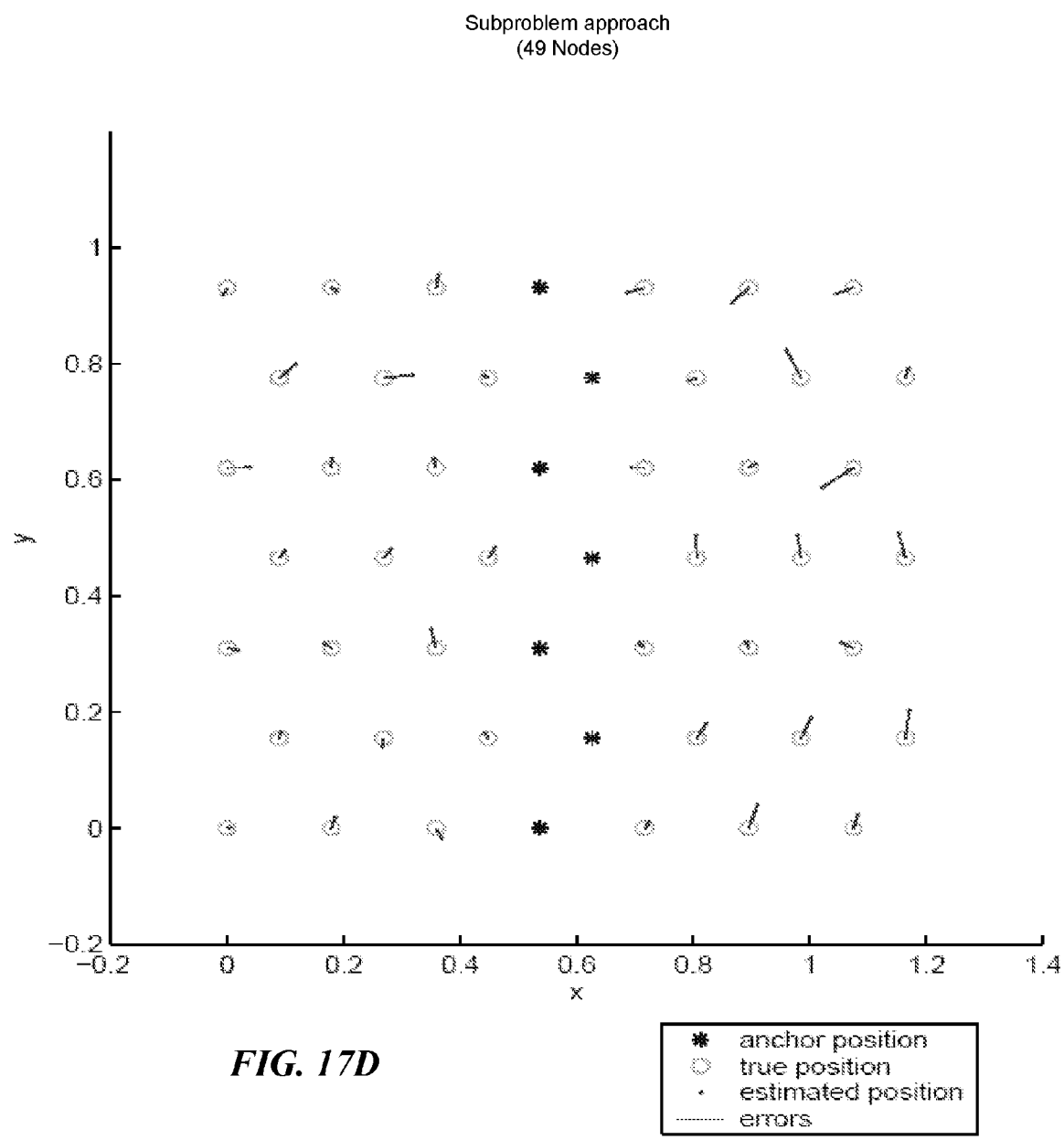
FIG. 17D depicts an exemplary plot of sensors localized in accordance with one embodiment of the present invention.

FIGS. 17A and 17C show results for full SDP with I0, and FIGS. 17B and 17D show results for methods in accordance with various embodiments of the present invention with I0, for two examples. In the examples of FIGS. 17A and 17B, nine nodes on equilateral-triangle grids were used, including three anchors placed at the grid-point in the middle of each row, with approximately 0.1 noise and radius of approximately 1.12. In the examples of FIGS. 17C and 17D, 49 nodes on equilateral-triangle grids were used, including seven anchors positioned at the grid-point in the middle of each row, with approximately 0.1 noise and radius of approximately 0.40. As can be seen from these figures and Table 5, for localizing 4 and 9 nodes, full SDP and various embodiments of the present invention showed comparable performance. Beyond that size, however, the contrast grew rapidly. For localizing 49 nodes, various embodiments of the present invention were approximately ten times faster than the full SDP method, with more than four times the accuracy. For 400 nodes, various embodiments of the present invention with strategies I0, I1, and I2 were approximately 800, 2500, and 8500 times faster, respectively, than full SDP with the same strategies, while achieving approximately ten times greater accuracy. Thus, the full SDP model appears to become less effective as problem size increases. For problem sizes above approximately 49 nodes, the average estimation error using full SDP becomes so large that the computed solution can be of little value.

It may seem non-intuitive that such an approach could produce smaller errors than the full SDP method. However, all of the SDP problems and subproblems of the form of Eq. 14 are relaxations of Euclidean models of the form of Eq. 9. A subproblem whose subsensors have three independent anchor connections yields an exact solution. The same conclusion cannot be drawn under noise conditions, but experimentally the relaxations under noise conditions appear to be tighter in the subproblems of various embodiments of the present invention than in the single large SDP.

Scalability

Table 6 shows simulation results for 49 to 10,000 randomly uniform-distributed sensors localized using various embodiments of the present invention with strategies I0, I1, and I2. The node numbers 49, 100, 225, ... were squares $k^2$, and the radius was the minimum value that permitted localization on a regular k×k grid. The number of anchors changed with the number of sensors and was chosen to be k. Noise was not included in this simulation. When the items under I1, I2 are shown as empty, this indicates that they are equal to the values under I0 in the same row.

The three strategies I1 and I2 produced the same results, and I0 gave essentially the same results. This is because the inaccuracy of the estimation was caused by low connectivity, not by noisy distance measurements. Empirically it can be seen that the method scales well, almost linearly in the number of nodes in the network. Indeed, the computational complexity of the method is of order n, the number of sensors in the network, even though the full SDP approach has much greater complexity, as shown below.

In the full SDP model (Eq. 14), the number of constraints is $O(n^2)$, and in each of iteration of its interior-point algorithm the SDP solver solves a sparse linear system of equations whose dimension is the number of constraints. It appears that the SDP complexity with strategy I0 lies somewhere between $O(n^3)$ and $O(n^4)$.

In accordance with various embodiments of the present invention, the full problem may be partitioned into p subproblems of size q or less, where p×q=n, and q is generally set to be much smaller than n, ranging from 2 to around 10 in most of the simulations. If τ represents the execution time taken by the full SDP method for a ten-node network, in the worst case the computation time for various embodiments of the present invention is τ×O(p). Thus, various embodiments of the present invention are really linear in p in theory. Since q can be assumed to be a parameter ranging from 2 to 10, with worst case 2, $O(p)=O(n/q) \leq O(n/2)=O(n)$. Now it can be seen that the computation time is O(n) in accordance with various embodiments of the present invention.

Using the middle network size from Table 6 (nodes=3,969), the following sections discuss the effect of varying radio range, number of anchors, and noise factor.

Radio Range Impact

With a fixed total number of randomly uniform-distributed nodes (3,969, of which 63 are anchors), Table 11 shows the direct impact of radius in the range of 0.0304 to 0.0334 on accuracy and performance. Strategies I1 and I2 produced essentially the same results. Strategies I1 or I2 provided slightly better accuracy than I0 for eight of the sixteen radius values, while I0 produced slightly better accuracy than I1 or I2 in four cases. However, I1 and I2 took more time than I0 because they made more SDP calls.

As indicated, increasing radius leads to increased accuracy and only slightly more computational time. The simulation could assist sensor network designers in selecting a radio range to achieve a desired estimation accuracy with little concern about algorithm speed.

Number of Anchors Impact

With constant radius (approximately 0.0334) and the same randomly distributed nodes (3,969), Table 13 shows the impact of the number of anchors, ranging from 1% to 10% of the total points. (Noise was not included.) As can be seen, when the radio range is sufficiently large, the number of anchors in the network had a very slight impact, improving the estimation accuracy in general, with no obvious impact on algorithm speed. This analysis is beneficial for designers who wish to avoid the cost of deploying unnecessary anchors.

Strategies I1 and I2 produced identical results. Comparing I0 with I1 or I2, added inequalities slightly improved the average error consistently, although the 95% error remained essentially the same. Increasing the number of anchors in the network improved the estimation accuracy in general, with no obvious impact on algorithm speed. However, accuracy improvement was not observed when the number of anchors reached more than 10% of the total points. This analysis is beneficial for designers who wish to avoid the cost of deploying unnecessary anchors.

Noise Factor Impact

With constant radius (approximately 0.0334) and the same randomly distributed nodes (3,969), Table 12 shows the impact of noise conditions on accuracy and performance. Strategies I1 and I2 did not provide consistent improvement over I0 for both average error and 95% error, yet they consistently increased execution time. Also, more noise in the network had a direct impact on estimation accuracy. Simulations of this kind may help designers determine the measurement noise level that will give an acceptable estimation error.

It can also be seen that strategies I2 and I1 (with added inequality constraints) provided consistent improvement for both average and 95% error, at the price of increased execution time.

Moving Sensor Simulation Results

Simulation results for the moving sensor localization methods were also obtained. The simulation setup was the same as described above using strategy I0, except with added information on dynamic sensors and distance updates at every tracking instant.

The simulation assumed a fixed number of moving sensors, and a given number of time intervals of fixed length over which the dynamic sensors were to be tracked. The movement pattern could be random or along some predefined path.

To simulate random movement of dynamic sensor i, the sensor's position was calculated at tracking instant t+1 to be a random step from 0 to a maximum step of move_size. The following formula was used to generate sensor i's next position from its current position $PP^t(:,i)$:

$$PP^{t+1}(:,i)=PP^t(:,i)+\text{move\_size}*(2*\text{rand}(2,1)-1). \qquad \text{Eq. 41}$$

Any points that fall outside the simulation area are regenerated.

Figure 18:
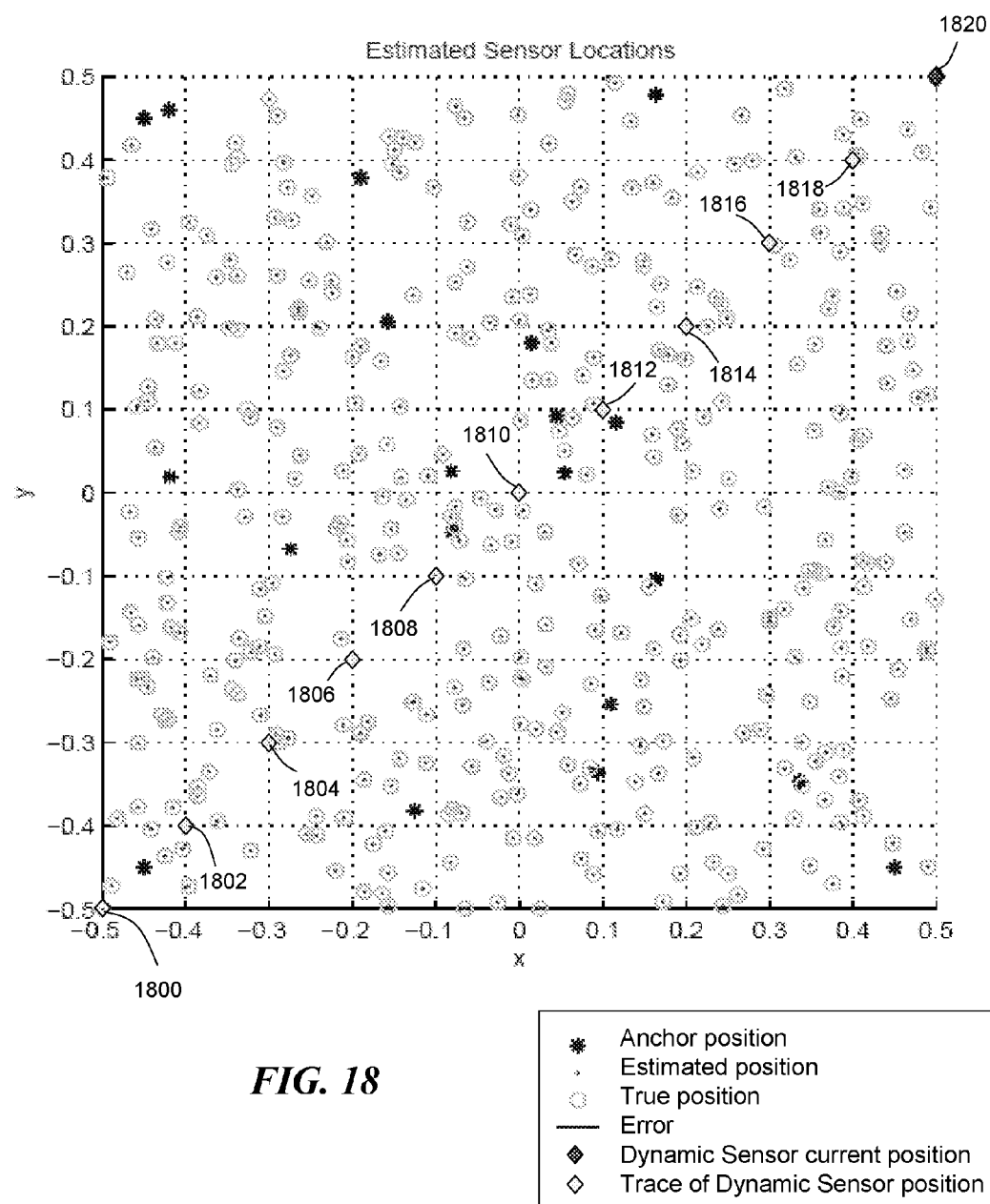
FIG. 18 depicts an exemplary plot of sensors, including a moving sensor, localized in accordance with one embodiment of the present invention.

As an example, FIG. 18 shows the simulation results of one sensor moving diagonally through a 400-node randomly uniform-distributed sensor network. The diamond 1820 represents the current position of the moving sensor, and the trail of diamonds 1802 through 1818 represents the trace of where the moving sensor has been. Following the moving sensor localization method discussed above, the network with 400 total nodes and 20 anchors is first localized by partitioning into subproblems in accordance with various embodiments of the present invention. Initially, the moving sensor is intentionally positioned at the bottom left corner. Then at every time interval, the sensor moves with a step of +0.1 in both x and y coordinates. FIG. 18 shows the result of ten movements. The algorithm method all 400 sensors initially with virtually no errors, and then tracks the moving sensor's ten steps with the same high accuracy.

Table 14 shows simulation results for 10% of the sensors moving randomly with a uniform distribution among a total of 49 to about 4000 randomly uniform-distributed sensors. The number of anchors and the radius both changed with the number of sensors being simulated in order to maintain a similar connectivity level. Noise was not included in this simulation. Error and Time in the table represent average errors and localization time per tracking instant for all moving sensors averaged over at least 20 tracking instants.

The execution time increased only linearly with the number of dynamic sensors in the network. The Error does not display a pattern because it depends more on the connectivity level of all sensors.

With a fixed total number of randomly uniform-distributed nodes (3,969, of which 63 are anchors), Table 15 shows the direct impact of the number of randomly moving sensors on accuracy and performance. (Noise was not included.)

As expected, Error increased with the number of moving sensors because at each tracking instant, any moving sensor cannot be used as an anchor. If the number of original anchors is held fixed at 63, the effect of more moving sensors is similar to having less available anchors, and thus lower connectivity levels. As the number of moving sensors increased to 1,250 (31%) and beyond, outliers appeared. With 50% moving, 10 sensors were unlocalizable.

The execution time displays a linear increase with the number of moving sensors until around 1,200. From 1,250 onwards, there was a sudden drop of execution time. This is because, at this connectivity level, the number of moving sensors connected to less than three anchors increases dramatically. As explained above, calls are made to the geometric subroutines instead of the SDP solver to localize sensors with less than 3 anchor connections. The geometric subroutines can localize this configuration of sensors significantly faster than the SDP solver.

The speed of the moving sensors does not impact how quickly the algorithm can track them. The issue is the accuracy of the moving sensor's estimated position versus the time interval between the tracking instants.

For example, with a 1-second time interval, tracking a walking person who carries a sensor can be a lot more accurate than tracking a moving car that carries a sensor, because at the end of the 1-second interval, a person with a maximum walking speed of 3 miles an hour can be at most 1.4 meters away from his previous interval, but a car traveling at 60 miles an hour could be 27 meters away. In order to achieve the same estimation accuracy, the tracking instant interval may be reduced for sensors traveling at a higher speed. But a smaller time interval means fewer dynamic sensors that the algorithm can keep track of.

Table 16 lists the simulation results for tracking the maximum number of sensors with various traveling speeds at different levels of position estimation accuracy. The column under "Speed" indicates the sensors' maximum traveling speed, ranging from 2.24 mph to 600 mph. The first row of the table lists estimation accuracy, ranging from 1 meter to 100 meters, and there are two columns associated with each level of estimation accuracy. The column labeled "Time" represents the time interval (in milliseconds) during which a dynamic sensor moves the distance indicated by the estimation accuracy in the row above and at the speed indicated in the left-hand column. This time defines the frequency for estimating the maximum number of moving sensors. The column labeled "#" gives the maximum number of moving sensors; that is, the number of sensors that the algorithm can keep track of with the specified accuracy every specified number of milliseconds interval.

For example, the algorithm is capable of tracking 387 people walking at 3 miles an hour within 1 meter accuracy at 74.6 millisecond intervals, whereas only 2 trains traveling at 200 mph could be tracked with the same accuracy at 1.12 milliseconds intervals. Alternatively, the algorithm could keep up with one airliner traveling at 600 mph with 2.5 meter accuracy at 0.93 millisecond intervals. As many as 14 airliners could be tracked with 10 meter accuracy every 3.73 milliseconds.

Figure 19:
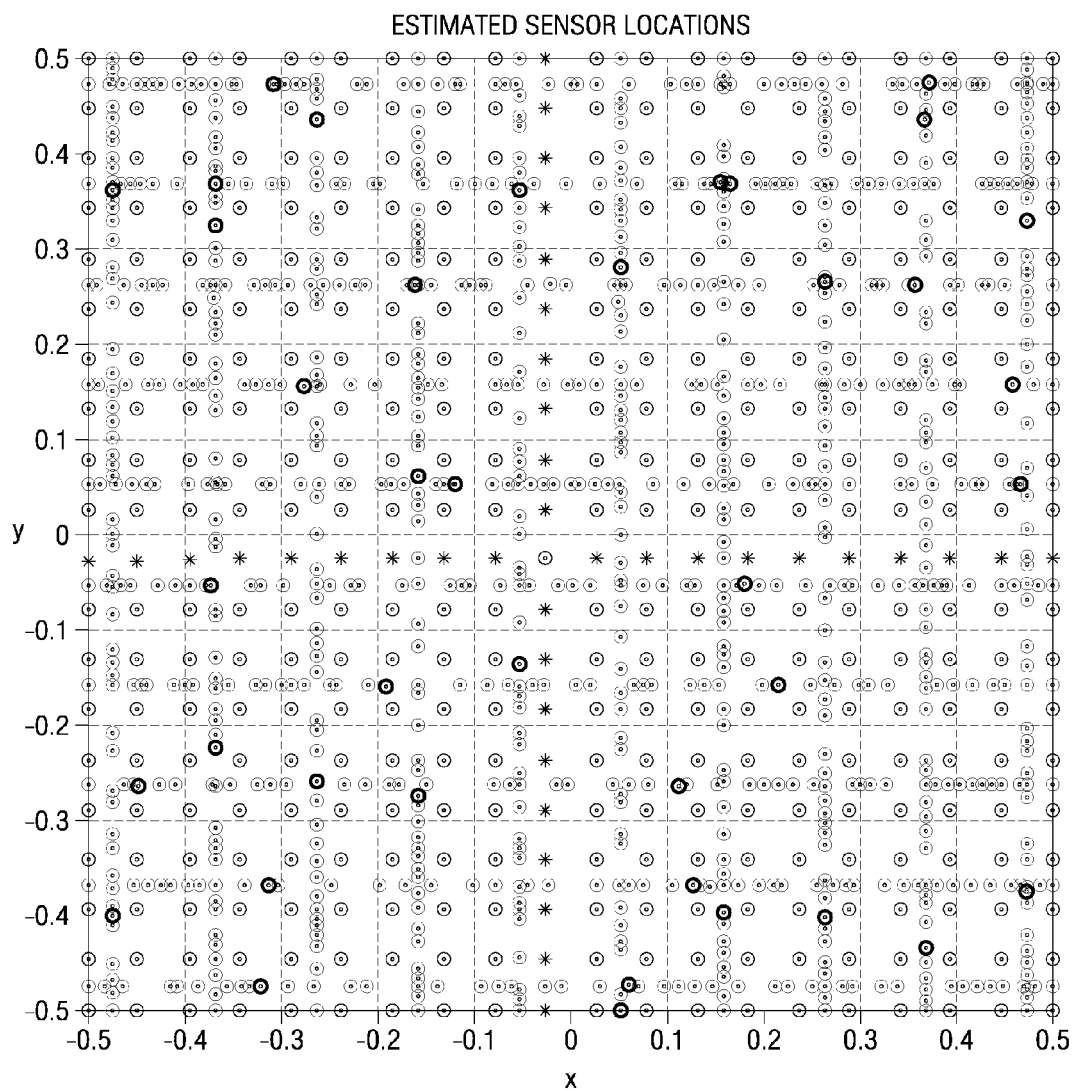
FIG. 19 depicts an exemplary plot of sensors, including moving sensors, localized in accordance with one embodiment of the present invention.

FIG. 19 depicts a simulation run of a sample bus transit network. In this ad hoc network, 400 static sensors are located at all bus stops and/or in between bus stops, of which 39 are anchors with their locations known ahead of time. These anchors are positioned in the middle of the network horizontally and vertically as represented by the stars. Each adjacent two rows or columns of sensors represent a vertical or horizontal street. Two buses are running on each street (represented by twenty bold diamonds) with their initial positions at opposite ends of the street. (The light diamonds represent the traces of where a bus has been.)

The movement of different buses with different step sizes can be simulated to represent different maximum traveling speeds that might be imposed on different streets. The dynamic sensor localization algorithm initially localizes all sensors, including the static sensors at all bus stops and the dynamic sensors on all buses. Then with a given time interval, random directional movements for all buses can be generated (following a random uniform distribution), and the dynamic sensor localization method of the present disclosure tracks all dynamic sensors for a sequence of time intervals.

Distributed Algorithm Simulation Results

Simulations were also run using the distributed algorithm of the present disclosure. All assumptions made in the above simulation (using strategy I0) regarding simulation region, MaxAnchorReq, radio range, measured distances, and average estimation errors were applicable here, except various adjustments to the clustered architecture. The clustered network had the same characteristics as the example shown in FIG. 8. The simulation followed the cluster priority assignment routine discussed above.

The simulation results were averaged over ten runs to show the scalability of the distributed algorithm. The impact of different numbers of three-anchor clusters and different node densities on the performance of the algorithm may be observed.

Number of Three-Anchor Clusters Impact

In a clustered wireless sensor network, some clusters may have three anchors while some clusters may only have the cluster heads as anchors. The impact of the number of three-anchor clusters on the accuracy and performance of the distributed algorithm was observed using simulation results from sample networks.

FIGS. 20A-20L display the topologies of networks with different numbers of three-anchor clusters that the simulations were based on. Each network has 4,900 nodes and 25 clusters. Each cluster contains 196 nodes that were uniformly distributed on 14×14 square grids within the cluster. All cluster heads (which are also anchors) were positioned in the middle of their clusters. Each cluster head is shown as a black dot in the figures. A three-anchor cluster also has two extra anchors, one on the immediate right grid of the cluster head, and the other on the immediate lower grid of the cluster head. A three-anchor cluster is shown as three black dots in the figures. When making choices on the locations of the three-anchor clusters among all 25 clusters, their locations may be chosen such that the rest of the one-anchor clusters can achieve as high a cluster priority as possible.

With constant radius (approximately 0.01) and no noise, Table 17 shows the impact of the number of three-anchor clusters on performance. Since the simulation was run on a single processor, the sequential time recorded the total time to have all clusters localized in the whole network. Time per cluster is a calculated average time taken to localize each cluster. Parallel time is given as an estimate of execution time if the computation could be done in real clustered (parallel) networks. It can be seen that when the radio range is sufficiently large, the number of anchors in the network has barely any impact on estimation accuracy because all test cases show negligible errors. At the same time, the per cluster execution time remained substantially similar for all test cases. However, the execution time in a parallel computing environment reduced as the number of 3-anchor clusters increased. This analysis is beneficial for designers to gauge the performance of a given design, or to decide on a particular design with a given desired performance.

Node Density Impact

In order to study the impact of node density, one of the networks was chosen to have eight three-anchor clusters. Then the number of nodes in each cluster was varied to see its impact on performance. With a fixed total number of 25 clusters and radio range of approximately 0.1, Table 18 shows the direct impact of the number of nodes in each cluster on accuracy and performance. (Noise was not included.) The table shows that the algorithm can accurately position all sensors with substantially no errors. As expected, increasing node density increased the execution time.

Number of Clusters Impact

Simulations were run for networks of 4 to 36 clusters. The number of nodes in each cluster remained the same at 256 nodes. The number of anchors and radius changed with the number of sensors being simulated in order to maintain the same connectivity level. It was assumed that all clusters are three-anchor clusters, and the radio range was half the size of the cluster's square width. Noise was not included in this simulation.

Table 19 shows the simulation results of the number of clusters' impact on performance (all have negligible estimation errors). With the increase of the number of clusters in the network, the parallel execution time increased. This was caused by the distributed algorithm's synchronization routine. The larger the network, the more neighbors to search and synchronize.

3D Localization Simulation Results

Figure 21A:
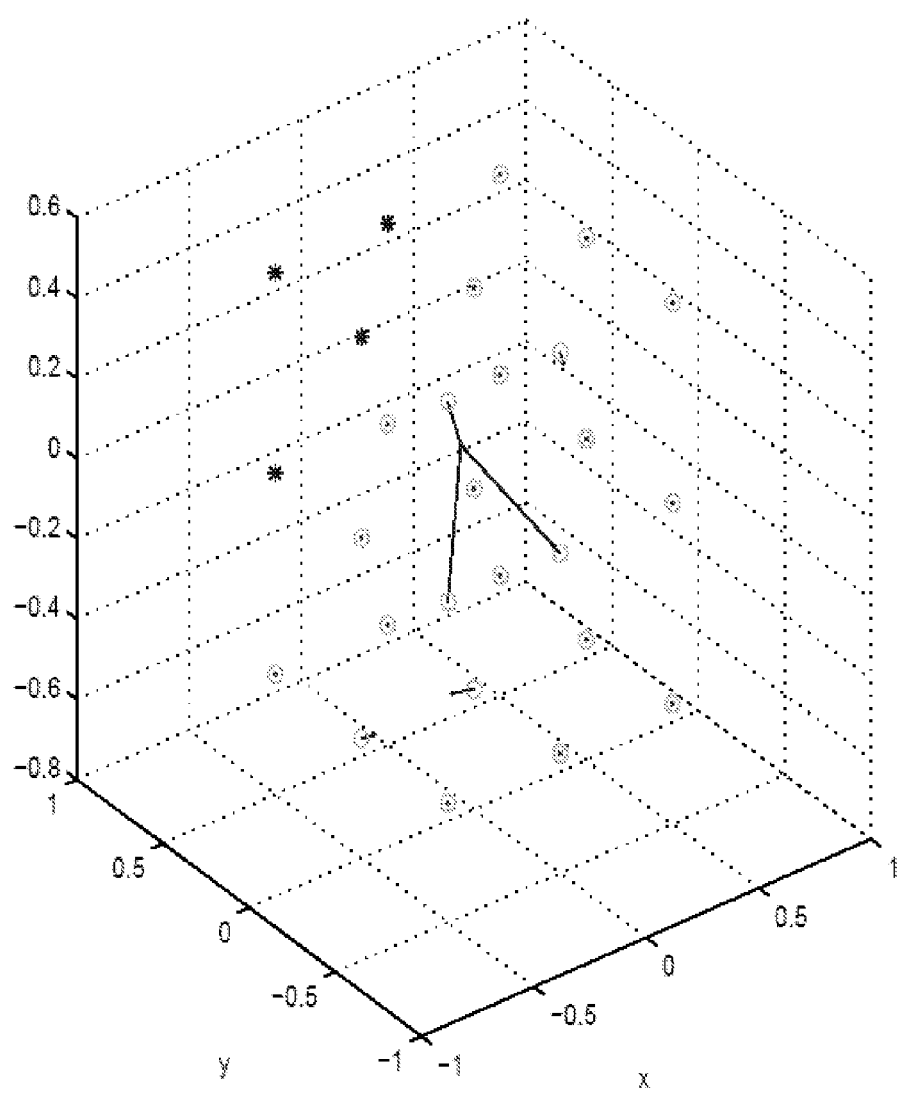
FIG. 21A depicts an exemplary plot of sensors in 3D space.
Figure 21B:
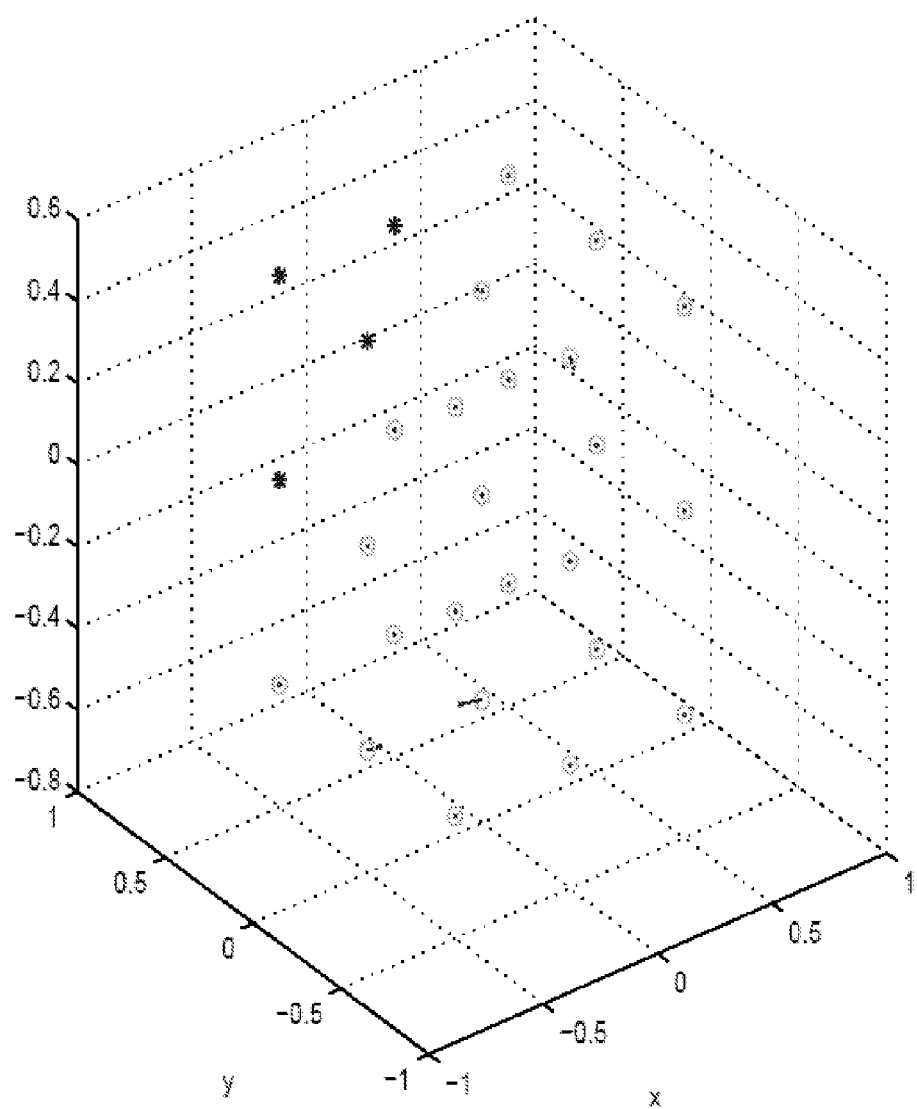
FIG. 21B depicts an exemplary plot of sensors in 3D space.

FIGS. 21A and 21B show an example of results of localization accuracy in 3D with the auxiliary geometric routine (FIG. 21A) and without the auxiliary geometric routine (FIG. 21B). Twenty-seven sensor nodes were purposely placed on square grids within a 1×1×1 volume in 3D, within which four of the nodes were anchors. With a radio range of 1, some of the sensors did not have at least four independent connected anchors (original or acting) to localize them. As depicted in FIGS. 21A and 21B, the geometric subroutine can be effective in reducing error under this condition. The average error without the geometric routine was approximately 0.0689, but with the geometric routine, the average error was reduced to approximately 0.0124.

Figure 22:
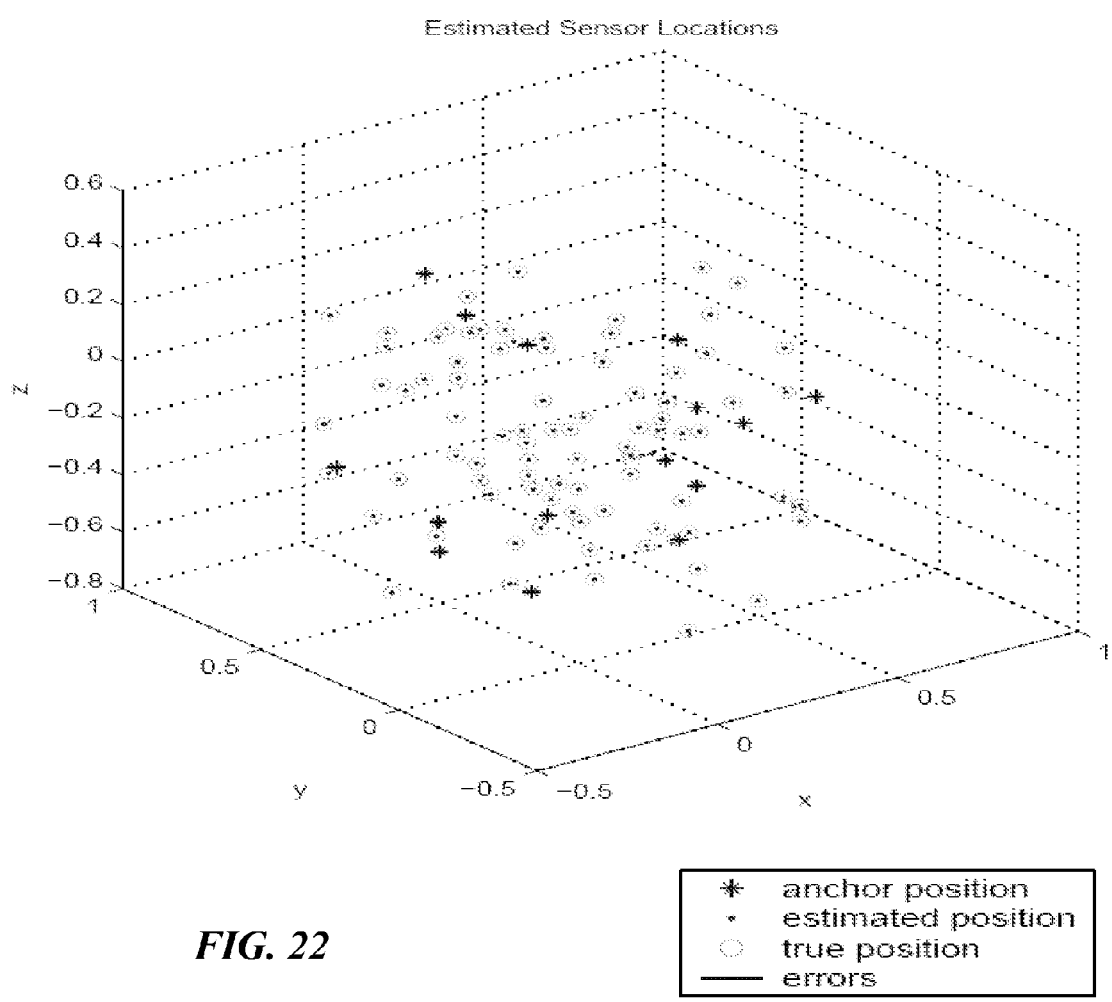
FIG. 22 depicts an exemplary plot of sensors in 3D space.

A simulation was run for the 3D case similar to the simulation for the 2D case discussed above using strategy I0, except the area was confined within 1×1×1 in 3D. FIG. 22 shows 100 randomly uniform-distributed nodes localized in 3D space in accordance with various embodiments of the present invention. All nodes were localized accurately with substantially no error.

Scalability

Table 20 shows scalability results for 27 to 10,000 randomly uniform-distributed sensors being localized using the 3D localization algorithm. All sensors' positions were randomly generated with a uniform random distribution in the 1×1×1 volume with anchors also randomly chosen. The number of anchors and radius changed with the number of sensors being simulated in order to maintain the same connectivity level. Noise was not included in this simulation.

Comparing with the 2D case in Table 6, it can be seen that the execution times increased steadily with increasing sizes of the networks.

Objective Function with $l_2$ Norm

The localization problem can be formulated as in Eq. 8: minimizing the $l_1$ norm of the squared-distance errors $\alpha_{ij}$ and $\alpha_{ik}$. The localization problem can also be formulated as a least-squares problem, minimizing the $l_2$ norm of the errors $\alpha_{ij}$ and $\alpha_{ik}$ subject to the same equality and inequality constraints as in Eq. 8:

$$\minimize_{x_i,x_j,\alpha_{ij},\alpha_{ik}} \sum_{(i,j)\in N_1} \alpha_{ij}^2 + \sum_{(i,k)\in N_2} \alpha_{ik}^2 \qquad \text{Eq. 42}$$

subject to $$\|x_i - x_j\|^2 - \alpha_{ij} = (\hat{d}_{ij})^2, \forall (i,j) \in N_1,$$

$$\|x_i - a_k\|^2 - \alpha_{ik} = (\hat{d}_{ik})^2, \forall (i,k) \in N_2,$$

$$\|x_i - x_j\|^2 \geq r_{ij}^2, \forall (i,j) \in \overline{N}_1,$$

$$\|x_i - a_k\|^2 \geq r_{ik}^2, \forall (i,k) \in \overline{N}_2,$$

$$x_i, x_j \in \mathbb{R}^2, \alpha_{ij}, \alpha_{ik} \in \mathbb{R},$$

$$i, j = 1, \ldots, s.$$

$$k = s+1, \ldots, n.$$

The 2 norm formulation increases the nonlinearity of the problem. SeDuMi is capable of handling this objective function directly. For DSDP5.0 additional variables and semidefinite constraints of the form $$\begin{pmatrix} 1 & \beta_{ij} \\ \beta_{ij} & \alpha_{ij} \end{pmatrix} \geq 0$$

could be included.

The least-squares form of the localization problem and its SDP relaxation have been studied. The studies show that the $l_2$ objective gives a weighted maximum likelihood estimation. This formulation could be used for all of the subproblems solved by various methods of the present invention.

A Bootstrap Procedure

Various embodiments of the present invention work effectively when the step of subproblem creation finds subsensors connected to at least three anchors. A difficult situation may arise if there are more than three anchors in the network but no subsensor is directly connected to three anchors (in 2D space; similar conclusions apply to 3D space). A network with anchors placed at the borders of the region is such an example. Subproblems that involve sensors connected to only two or one anchors may lead to a less accurate final solution.

When there is sufficient connection information for sensors to be indirectly connected to at least three anchors through other sensors, the full SDP approach can find a solution (in 2D space; similar conclusions apply to 3D space). In accordance with various embodiments of the present invention, a subproblem may be chosen to include the anchors, certain subsensors, and the sensors on each shortest path from a subsensor to an anchor.

In accordance with various embodiments of the present invention, a special bootstrap procedure may be used to choose a subproblem. It may be called whenever the above situation arises and the network has at least three anchors (in 2D space; a similar procedure can be applied to 3D space). It is assumed that there are m anchors $a_1, a_2, \ldots, a_m$. The following steps B1-B6 may be performed:

B1: Assign p=1, q=3, and assign m to be the total number of anchors. (Note: for 3D space, q=4.)

B2: Calculate the anchor distance matrix R. Each element is the Euclidean distance between two anchors defined as: $r_{ij}=\|a_i-a_j\|$.

B3: Choose q anchors to be included in the subproblem. 1. Among all elements of R, pick $r_{ks}$ such that it is the p-th smallest among all $r_{ij}$. 2. Find the smallest element among the row k and column s in R, and assume the smallest element's corresponding row or column number is t. 3. If anchors $a_k$, $a_s$, and $a_t$ are dependent, p=p+1, go back to step 1 in B3. Otherwise continue to next step. 4. These three anchors, k and s, and t become the three anchors for the subproblem.

B4: Choose subsensors to be included in the subproblem. 1. From distance matrix $\hat{d}$, find the shortest path among $a_k$–$a_s$, $a_k$–$a_t$, and $a_s$–$a_t$. 2. If all anchors are connected to each other through these three paths, any sensors on the shortest path are selected to be subsensors; go to B5. 3. If a path cannot be found among these three anchors, increment p=p+1). 4. If p<len (len=length of non-zero element of matrix R), go to step B3. 5. If p=len, go to step B6.

B5: Subanchors and subsensors are found for the subproblem; stop.

B6: Cannot find sufficient connections; stop.

Conclusions and Extensions

The following summarizes the proposed suite of algorithms for various sensor localization applications.

The basic SDP relaxation approach may be adopted for solving the subproblems generated by various embodiments of the present invention. Other approaches for solving the subproblems, however, may be used, and the scope of the present invention is not limited to methods wherein SDP is used. As a non-limiting example, triangulation-based methods may be used to solve the subproblems. In addition, a recent development by Biswas, Liang, et al. adds regularization terms to the SDP problem and uses a gradient-descent method to refine the SDP solution, and significant accuracy improvement is reported. After-arising methods of solving the subproblem may also be used.

Various embodiments of the present invention may proceed iteratively by estimating only a portion of the total sensors' locations at each iteration.

Some anchors and sensors are chosen according to a set of rules to form a (very small) localization subproblem. This is solved by the SDP approach, or by auxiliary geometric subroutines.

The subproblem solution is then returned to the full problem and the method iterates again until all sensors are localized.

Various embodiments of the present invention may be used as a building block for more general localization methods. A dynamic sensor localization algorithm may be used to track hundreds or thousands of sensors moving within a larger network in real-time. This utilizes various embodiments of the present invention with extracted data sets that only affect the moving sensors. A 3D version extends its utility further.

Figure 23:
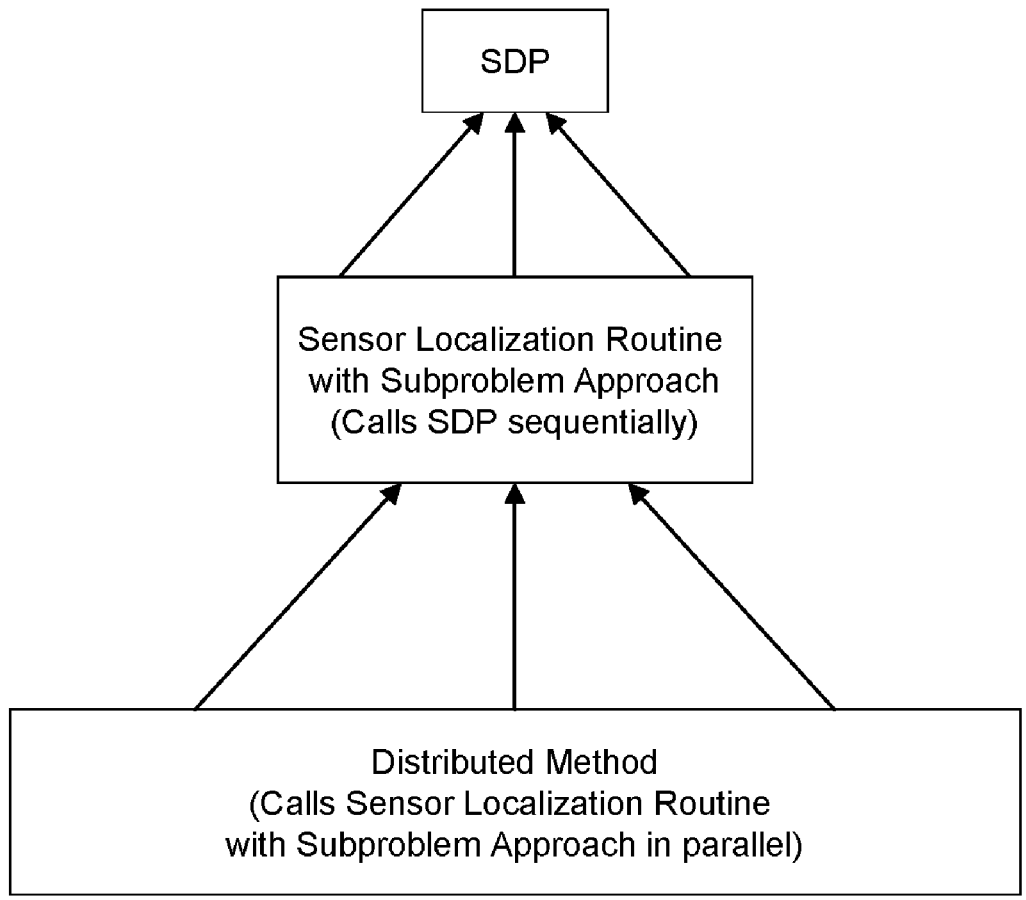
FIG. 23 depicts a block diagram of a hierarchical algorithm structure.

A priority-driven hierarchical scheme that utilizes distributed computing may be used for large clustered networks and distributed environments. FIG. 23 depicts such a hierarchical scheme. Scalability may be achieved through parallelism at the cluster level. Various embodiments of the present invention may be used to obtain essentially linear complexity on clustered networks of virtually unlimited size.

A preprocessor may be used to localize sensors in anchorless networks in accordance with various embodiments of the present invention.

Various embodiments of the present invention transform academic research in the area into usable software deployable in practical sensor networks.

For example, in accordance with certain embodiments, the methods of the present disclosure may be applied to the field of biotechnology. In biotechnology, there exist ways to obtain clustered pair-wise distance measurements between atoms inside a molecule. The problem then is how to deduce the molecular structure utilizing these known distance measurements, so that the molecule's characteristics can be further analyzed. This molecular structure identification problem is very similar in form to the geometric distance model for sensor localization. The protein folding problem and the Euclidean Distance Matrix problem are also closely related.

As another example, methods of the present invention may be employed in the field of cartography. A least-squares approach may be used to construct a map using pair-wise distance measurements between neighboring villages. This is closely related to the sensor localization problem. The distance matrix is sparse, and the solution may be in 3D (to allow for curvature of the earth).

A wide variety of other fields such as agriculture, weather, aerospace, military, environment or industrial control and monitoring, wildlife monitoring, security monitoring, inventory control, and many others can benefit from the teachings of various embodiments of the present invention.

Dynamic sensor networks may find applications in many areas. For example, an ad hoc wireless sensor network can be used to form a battlefield tracking system. Static sensors can be spread around a battlefield by a helicopter. They may be used to track enemy forces or friendly forces (depending on the type of sensor and who is currently occupying the territory). All soldiers could wear dynamic sensors in order to determine where their comrades are in the adjacent neighborhood. Another application in the battlefield is to track moving vehicles.

Another example application is a police patrol car monitoring and dispatching system. Similar logic can be applied to taxi monitoring and dispatching. Each taxi in a network may carry a dynamic sensor. Finding an idle taxi nearest to the customer requiring service can then be accomplished using the methods of the present disclosure.

An ad hoc wireless sensor network can be designed around a car-sharing network. Each car in the network may carry a dynamic sensor, to enable monitoring of the car's location at any time. Each person in the desiring to find a car may have a dynamic sensor installed in his or her user-portable wireless data devices (such as PDAs or cell phones, etc.). A similar method could be used for bike-sharing networks.

A traffic monitoring system is yet another application that may benefit from the methods of the present disclosure. There have been many studies on the automated highway system, particularly on the development of an inter-vehicle communication system. Such a system may be used for dynamic traffic routing, driver assistance and navigation, co-operative driving, and platooning. Static sensors may be spread around major roadways to form ad hoc wireless sensor networks, and cars may carry dynamic sensors.

The real-time speed map may be used by police patrol officers, or by fire-fighters to predict a problem even before people could report a problem on the road. At the same time, if a car's display is connected to the central computing facility, the car driver may download any portion of the map in real-time to decide on the best option to his or her destination.

An even more proactive approach may be achieved by predefining the route a particular driver is to take to his or her destination. If there are abnormal conditions on any road along the route, the driver may be notified with a number of top alternative routes with estimated total distance and travel times. An alternative is to mark the actual speed on the map in real-time instants for the driver to reference while driving. Various different labels may be used to correspond to different traffic conditions of highways according to the speed detected by the sensors. For example, five levels may be used to represent traffic conditions, with level 1 being totally smooth and level 5 being totally blocked.

Another application of the methods of the present disclosure is for a personnel monitoring system. Static sensors can be installed to form an ad hoc wireless sensor network in a limited area such as a university campus, a corporate complex, a retail mall, or a prison to monitor people's movements for different purposes. One example application is the prisoner monitoring system.

Still another application of the methods of the present invention is for a bus transit arrival reporting system.

The variety and scale of future network applications begs for software that can fully utilize the multitude of sensor devices currently being created. The broad impact of the research is that it has produced an enabling technology analogous to the device technology itself. Efficient and accurate localization for networks of arbitrary size helps tomorrow's wireless sensor networks to provide their intended services.

Moreover, the processing power in sensor devices of the near future may be far less than a current Pentium laptop. Various embodiments of the present invention are already an advance for networks on the order of approximately ten thousands nodes. The distributed method takes a further quantum leap by attaining true scalability and deployability.

The localization algorithms disclosed herein may be implemented in MATLAB, with a Mex interface to the SDP solver DSDP5.0 (which is implemented in C). The MATLAB codes may be converted to C or other languages to facilitate their application to real network implementations.

As discussed above, coordinates may be used to represent sensors' locations. Some applications may use a landmark (called a spot) to pinpoint where the sensors are. A spot fitting interface may be developed for network applications of this nature. Also, many applications would simply provide a digital map for identifying sensor locations. The sensors' coordinates may be converted into a corresponding spot in the digital map.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as exemplary embodiments. Various modifications may be made without departing from the scope of the invention. For example, equivalent elements or materials may be substitute for those illustrated and described herein, and certain features of the invention may be utilized independently of the use of other features, all as would be apparent to one skilled in the art after having the benefit of this description of the invention. In addition, the terms "a" and "an" are generally used in the present disclosure to mean one or more.

APPENDIX

TABLE 1

| An example: priority list when MaxAnchorReq = 3 | | | | | | | |
|---|---|---|---|---|---|---|---|
| Priority value | Level 1 anchor | Level 3 anchor | Level 5 anchor | Level 7 anchor | Level 9 anchor | ... | Resulting anchor level |
| 1 | $\geq 3$ | | | any | | | 3 |
| 2 | =2 | $\geq 1$ | | any | | | 5 |
| 3 | =1 | $\geq 2$ | | any | | | 7 |
| 3 | =2 | =0 | $\geq 1$ | | any | | 7 |
| 4 | =1 | =1 | $\geq 1$ | | any | | 9 |
| 4 | =2 | =0 | =0 | $\geq 1$ | any | | 9 |
| 5 | =1 | =1 | =0 | $\geq 1$ | any | | 11 |
| 5 | =2 | =0 | =0 | =0 | $\geq 1$ | any | 11 |
| ... | =0 | | | total $\geq 3$ | | | (11, bigN) |
| bigN | | | | total = 2 | | | bigN |
| bigN + 1 | | | | total = 1 | | | bigN + 1 |

TABLE 2

| Cluster priority: an example | | | | |
|---|---|---|---|---|
| Cluster priority | 3-anchor cluster itself | # of neighboring clusters with priority value of 10 | # of neighboring clusters with priority value of 2x | ... |
| 10 | yes | — | — | — |
| 21 | no | 8 | — | — |
| 22 | no | 7 | — | — |
| 23 | no | 6 | — | — |
| 24 | no | 5 | — | — |
| 25 | no | 4 | — | — |
| 26 | no | 3 | — | — |
| 27 | no | 2 | — | — |
| 28 | no | 1 | — | — |
| 31 | no | 0 | 8 | — |
| 32 | no | 0 | 7 | — |
| 33 | no | 0 | 6 | — |
| 34 | no | 0 | 5 | — |
| 35 | no | 0 | 4 | — |
| 36 | no | 0 | 3 | — |
| 37 | no | 0 | 2 | — |
| 38 | no | 0 | 1 | — |
| ... | no | 0 | 0 | ... |

TABLE 3

| Cluster priorities for example in FIG. 8 | |
|---|---|
| Cluster index | Cluster priority |
| 1 | 28 |
| 2 | 28 |

TABLE 3-continued

Cluster priorities for example in FIG. 8

| Cluster index | Cluster priority |
|---|---|
| 3 | 27 |
| 4 | 28 |
| 5 | 28 |
| 6 | 28 |
| 7 | 10 |
| 8 | 27 |
| 9 | 10 |
| 10 | 28 |
| 11 | 28 |
| 12 | 27 |
| 13 | 26 |
| 14 | 27 |
| 15 | 28 |
| 16 | 35 |
| 17 | 28 |
| 18 | 10 |
| 19 | 28 |
| 20 | 35 |
| 21 | 37 |
| 22 | 28 |
| 23 | 28 |
| 24 | 28 |
| 25 | 37 |

TABLE 4

Cluster rank list for example in FIG. 8

| Cluster priority | 10 | 26 | 27 | 28 | 35 | 37 |
|---|---|---|---|---|---|---|
| Cluster rank | 1 | 2 | 3 | 4 | 5 | 6 |
| Cluster index | 7 9 18 | 13 | 3 8 12 14 | 1 2 4 5 6 10 11 15 17 19 22 23 24 | 16 20 | 21 25 |

TABLE 5

Accuracy and speed comparison

| Number of nodes | Radio range | Error | | | Time (sec) | | | SDP calls | | |
|---|---|---|---|---|---|---|---|---|---|---|
| | | 10 | 11 | 12 | 10 | 11 | 12 | 10 | 11 | 12 |
| (a) Full SDP | | | | | | | | | | |
| 4 | 2.24 | 0.0317 | 0.0317 | 0.0317 | 0.01 | 0.01 | 0.01 | 1 | 1 | 1 |
| 9 | 1.12 | 0.1267 | 0.1203 | 0.1203 | 0.02 | 0.05 | 0.05 | 1 | 2 | 2 |
| 16 | 0.75 | 0.0837 | 0.0703 | 0.0680 | 0.10 | 0.21 | 0.35 | 1 | 2 | 3 |
| 25 | 0.56 | 0.0938 | 0.1170 | 0.1170 | 0.37 | 0.80 | 1.26 | 1 | 2 | 3 |
| 36 | 0.45 | 0.0719 | 0.0618 | 0.0561 | 0.81 | 1.88 | 3.02 | 1 | 2 | 3 |
| 49 | 0.40 | 0.1190 | 0.1190 | 0.1190 | 2.10 | 5.33 | 5.33 | 1 | 2 | 2 |
| 64 | 0.40 | 0.1218 | 0.0919 | 0.0954 | 3.43 | 9.21 | 21.60 | 1 | 2 | 4 |
| 81 | 0.40 | 0.1380 | 0.0894 | 0.0885 | 7.26 | 19.66 | 59.05 | 1 | 2 | 5 |
| 100 | 0.25 | 0.1268 | 0.1292 | 0.1403 | 13.87 | 34.20 | 140.26 | 1 | 2 | 4 |
| 121 | 0.40 | 0.1157 | 0.1088 | 0.1091 | 23.24 | 81.62 | 182.74 | 1 | 2 | 3 |
| 144 | 0.21 | 0.1480 | 0.1899 | 0.1891 | 37.76 | 168.43 | 584.23 | 1 | 2 | 4 |
| 169 | 0.40 | 0.1283 | 0.1141 | 0.1217 | 71.87 | 278.72 | 692.12 | 1 | 2 | 4 |
| 196 | 0.18 | 0.1404 | 0.1275 | 0.1286 | 151.52 | 461.97 | 1081.35 | 1 | 2 | 4 |
| 225 | 0.40 | 0.1568 | 0.1589 | 0.1571 | 232.31 | 752.75 | 2408.67 | 1 | 2 | 5 |
| 256 | 0.15 | 0.1429 | 0.1375 | 0.1370 | 356.86 | 1089.52 | 3260.33 | 1 | 2 | 5 |
| 324 | 0.14 | 0.1685 | 0.1685 | 0.1685 | 962.66 | 2620.20 | 2620.20 | 1 | 2 | 2 |
| 361 | 0.13 | 0.1734 | 0.1842 | 0.1833 | 1391.04 | 5051.05 | 15281.26 | 1 | 2 | 4 |
| 400 | 0.12 | 0.1819 | 0.1970 | 0.1968 | 1662.22 | 5950.34 | 20321.60 | 1 | 2 | 4 |
| (b) Subproblem Approach | | | | | | | | | | |
| 4 | 2.24 | 0.0317 | 0.0317 | 0.0317 | 0.02 | 0.02 | 0.02 | 1 | 1 | 1 |
| 9 | 1.12 | 0.0513 | 0.0513 | 0.0513 | 0.04 | 0.04 | 0.04 | 6 | 6 | 6 |
| 16 | 0.75 | 0.0615 | 0.0559 | 0.0559 | 0.06 | 0.19 | 0.09 | 8 | 9 | 9 |
| 25 | 0.56 | 0.0597 | 0.0608 | 0.0608 | 0.13 | 0.13 | 0.13 | 12 | 13 | 13 |
| 36 | 0.45 | 0.0364 | 0.0294 | 0.0294 | 0.17 | 0.20 | 0.20 | 20 | 23 | 23 |
| 49 | 0.40 | 0.0252 | 0.0252 | 0.0252 | 0.21 | 0.21 | 0.21 | 26 | 26 | 26 |
| 64 | 0.40 | 0.0272 | 0.0273 | 0.0273 | 0.30 | 0.34 | 0.34 | 38 | 42 | 42 |
| 81 | 0.40 | 0.0286 | 0.0295 | 0.0295 | 0.37 | 0.41 | 0.41 | 49 | 53 | 53 |
| 100 | 0.25 | 0.0232 | 0.0203 | 0.0203 | 0.46 | 0.49 | 0.49 | 54 | 56 | 56 |
| 121 | 0.40 | 0.0238 | 0.0227 | 0.0227 | 0.57 | 0.61 | 0.61 | 74 | 77 | 77 |
| 144 | 0.21 | 0.0230 | 0.0237 | 0.0237 | 0.69 | 0.70 | 0.70 | 84 | 89 | 89 |
| 169 | 0.40 | 0.0200 | 0.0190 | 0.0190 | 0.80 | 0.84 | 0.84 | 100 | 106 | 106 |
| 196 | 0.18 | 0.0177 | 0.0177 | 0.0177 | 0.98 | 1.08 | 1.08 | 84 | 90 | 90 |
| 225 | 0.40 | 0.0226 | 0.0207 | 0.0208 | 1.07 | 1.41 | 1.47 | 94 | 109 | 110 |
| 256 | 0.15 | 0.0208 | 0.0235 | 0.0249 | 1.21 | 1.44 | 1.50 | 118 | 131 | 132 |
| 324 | 0.14 | 0.0179 | 0.0178 | 0.0178 | 1.64 | 1.70 | 1.70 | 157 | 158 | 158 |
| 361 | 0.13 | 0.0218 | 0.0217 | 0.0217 | 1.89 | 2.01 | 2.01 | 177 | 181 | 181 |
| 400 | 0.12 | 0.0176 | 0.0175 | 0.0175 | 2.02 | 2.37 | 2.37 | 184 | 201 | 201 |

TABLE 6

Scalability: Strategies 11 and 12 generate same results

| Nodes | Anchors | Radius | Subsize | Error 10 | Error 11, 12 | 95% Error 10, 11, 12 | Time 10 | Time 11, 12 | SDP's 10 | SDP's 11, 12 |
|---|---|---|---|---|---|---|---|---|---|---|
| 49 | 7 | 0.3412 | 3 | 4.5840e−8 | | 3.4449e−8 | 0.18 | | 18 | |
| 100 | 10 | 0.2275 | 3 | 1.4679e−7 | | 1.1523e−7 | 0.35 | | 46 | |
| 225 | 15 | 0.1462 | 3 | 4.4940e−7 | | 3.1248e−7 | 0.82 | | 112 | |
| 529 | 23 | 0.0931 | 3 | 2.1662e−8 | | 8.9873e−7 | 2.02 | | 278 | |
| 1089 | 33 | 0.0620 | 5 | 1.1969e−4 | | 7.1510e−5 | 4.48 | | 587 | |
| 2025 | 45 | 0.0451 | 4 | 1.4917e−4 | 1.4115e−4 | 9.6839e−5 | 8.85 | 9.28 | 1006 | 1007 |
| 3969 | 66 | 0.0354 | 4 | 1.2399e−4 | | 7.2414e−5 | 18.79 | | 1867 | |
| 3041 | 71 | 0.0319 | 6 | 1.5172e−4 | | 1.1918e−4 | 27.19 | | 2210 | |
| 6084 | 78 | 0.0290 | 6 | 1.7126e−4 | | 1.1475e−4 | 33.66 | | 2742 | |
| 7056 | 84 | 0.0269 | 7 | 5.2369e−5 | | 4.0388e−5 | 40.59 | | 3117 | |
| 8100 | 90 | 0.0251 | 7 | 2.7376e−4 | 2.7353e−4 | 1.7071e−4 | 47.87 | 49.71 | 3564 | 3566 |
| 9025 | 95 | 0.0238 | 7 | 2.1141e−4 | 2.1977e−4 | 1.6039e−4 | 54.41 | 56.08 | 3957 | 3958 |
| 10000 | 100 | 0.0226 | 7 | 2.0269e−4 | | 1.5836e−4 | 59.33 | | 4452 | |

TABLE 7

3D algorithm scalability

| Nodes | Anchors | radius | sub_size | Error | 95% Error | Trace | 95% Trace | Time | SDPs |
|---|---|---|---|---|---|---|---|---|---|
| 27 | 9 | 1.0000 | 2 | 2.7e−10 | 1.9e−10 | 1.9e−10 | 1.5e−10 | 0.04 | 9 |
| 64 | 16 | 0.6667 | 2 | 9.1e−9 | 2.0e−9 | 7.8e−9 | 9.9e−10 | 0.20 | 24 |
| 125 | 25 | 0.5000 | 2 | 8.1e−9 | 4.4e−9 | 1.9e−9 | 8.4e−10 | 0.42 | 50 |
| 216 | 36 | 0.4000 | 2 | 3.9e−8 | 1.9e−8 | 5.9e−9 | 3.8e−9 | 0.76 | 90 |
| 512 | 64 | 0.2858 | 2 | 5.4e−4 | 2.7e−8 | 1.1e−8 | 4.8e−9 | 2.09 | 225 |
| 1000 | 100 | 0.2223 | 3 | 2.3e−4 | 3.6e−8 | 1.1e−8 | 6.1e−9 | 4.71 | 301 |
| 2197 | 169 | 0.1667 | 4 | 1.2e−7 | 5.2e−8 | 3.2e−8 | 8.7e−9 | 11.88 | 508 |
| 2744 | 196 | 0.1539 | 5 | 9.6e−5 | 6.3e−8 | 1.7e−8 | 1.1e−8 | 15.73 | 512 |
| 3375 | 225 | 0.1429 | 5 | 1.1e−4 | 5.9e−8 | 1.6e−8 | 9.2e−9 | 20.34 | 631 |
| 4096 | 256 | 0.1334 | 6 | 1.1e−4 | 6.6e−8 | 2.5e−5 | 9.8e−9 | 26.52 | 642 |
| 4913 | 289 | 0.1250 | 6 | 1.2e−7 | 7.3e−8 | 1.7e−7 | 1.1e−8 | 33.71 | 772 |
| 5832 | 324 | 0.1177 | 7 | 1.4e−5 | 8.3e−8 | 4.6e−6 | 1.2e−8 | 42.34 | 788 |
| 6859 | 361 | 0.1112 | 7 | 2.2e−5 | 9.5e−8 | 2.6e−8 | 1.4e−8 | 52.85 | 930 |
| 8000 | 400 | 0.1053 | 7 | 3.4e−5 | 1.1e−7 | 2.6e−8 | 1.7e−8 | 65.42 | 1087 |
| 9261 | 441 | 0.1010 | 7 | 4.8e−5 | 1.2e−7 | 3.6e−8 | 2.0e−8 | 81.61 | 1263 |
| 10648 | 484 | 0.0960 | 7 | 4.9e−5 | 1.4e−7 | 1.2e−6 | 2.2e−8 | 99.80 | 1455 |

TABLE 8

Node density impact with number of clusters = 25, number of 3-anchor clusters = 8, radius = 0.100; noise_factor = 0

| Total nodes | Nodes per cluster | Error | 95% Error | Sequential time | Per cluster time | Parallel time |
|---|---|---|---|---|---|---|
| 400 | 4 * 4(16) | 9.4e−8 | 2.5e−8 | 0.76 | 0.03 | 0.12 |
| 625 | 5 * 5(25) | 5.0e−8 | 1.1e−8 | 1.37 | 0.05 | 0.22 |
| 1225 | 7 * 7(49) | 2.5e−8 | 4.7e−9 | 2.92 | 0.12 | 0.47 |
| 2025 | 9 * 9(81) | 1.1e−8 | 2.0e−9 | 5.07 | 0.20 | 0.81 |
| 3025 | 11 * 11(121) | 8.5e−9 | 2.2e−9 | 8.22 | 0.33 | 1.32 |
| 4225 | 13 * 13(169) | 8.0e−9 | 1.7e−9 | 12.86 | 0.51 | 2.06 |
| 4900 | 14 * 14(196) | 1.0e−8 | 2.2e−9 | 15.13 | 0.61 | 2.42 |
| 5625 | 15 * 15(225) | 5.0e−9 | 1.3e−9 | 18.78 | 0.75 | 3.00 |
| 6400 | 16 * 16(256) | 8.8e−9 | 2.0e−9 | 22.79 | 0.91 | 3.65 |
| 7225 | 17 * 17(289) | 6.3e−9 | 1.5e−9 | 29.01 | 1.16 | 4.64 |
| 8100 | 18 * 18(324) | 5.9e−9 | 1.2e−9 | 34.45 | 1.38 | 5.51 |
| 9025 | 19 * 19(361) | 8.5e−9 | 1.7e−9 | 45.47 | 1.82 | 7.27 |
| 10000 | 20 * 20(400) | 7.1e−9 | 1.6e−9 | 55.03 | 2.20 | 8.80 |

TABLE 9

Inequality impact on accuracy and speed: 100 nodes, 10 anchors, no noise, radius 0.2275

| Methods | Error | 95% Error | Time | SDPs |
|---|---|---|---|---|
| Full SDP with I0 or I1 or I2 | 1.7877e−3 | 1.7483e−10 | 11.97 | 1 |
| Subproblem approach with I0 and no geometric routines | 1.7890e−3 | 1.1684e−7 | 0.38 | 47 |
| Subproblem approach with I1 or I2 and no geometric routines | 1.7134e−3 | 1.1684e−7 | 0.42 | 48 |
| Subproblem approach with I0 and geometric routines | 1.4679e−7 | 1.1523e−7 | 0.35 | 46 |

TABLE 10

Inequality impact on accuracy and speed: 100 nodes, 10 anchors, noise_factor 0.1, radius 0.25

| Methods | Error | Time | SDPs |
|---|---|---|---|
| Full SDP with I0 | 0.1268 | 13.87 | 1 |
| Full SDP with I1 | 0.1292 | 34.20 | 2 |
| Full SDP with I2 | 0.1403 | 134.50 | 4 |
| Subproblem approach with I0 | 0.0231 | 0.45 | 54 |
| Subproblem approach with I1 or I2 | 0.0203 | 0.51 | 56 |

TABLE 11

Radio range impact: nodes = 3969, anchors = 63, no noise, sub_size = 5

| radius | Error 10 | Error 11 | Error 12 | 95% Error 10 | 95% Error 11 | 95% Error 12 | Time 10 | Time 11 | Time 12 | SDP's 10 | SDP's 11 | SDP's 12 |
|---|---|---|---|---|---|---|---|---|---|---|---|---|
| 0.0304 | 2.444e−3 | 2.359e−3 | 2.359e−3 | 4.035e−4 | 5.757e−4 | 5.757e−4 | 18.03 | 18.00 | 18.00 | 1743 | 1688 | 1689 |
| 0.0306 | 1.122e−3 | 1.123e−3 | 1.123e−3 | 5.638e−4 | 5.644e−4 | 5.644e−4 | 18.13 | 18.70 | 18.70 | 1747 | 1749 | 1749 |
| 0.0308 | 2.400e−3 | 1.412e−3 | 1.412e−3 | 7.952e−4 | 6.039e−4 | 6.039e−4 | 18.64 | 19.30 | 19.51 | 1879 | 1895 | 1896 |
| 0.0310 | 1.087e−3 | 1.083e−3 | 1.083e−3 | 4.424e−4 | 4.397e−4 | 4.397e−4 | 18.39 | 19.05 | 19.05 | 1809 | 1814 | 1814 |
| 0.0312 | 2.480e−3 | 2.481e−3 | 2.481e−3 | 3.142e−4 | 3.146e−4 | 3.146e−4 | 18.30 | 18.93 | 18.93 | 1715 | 1717 | 1717 |
| 0.0314 | 5.464e−4 | 5.337e−4 | 5.337e−4 | 2.612e−4 | 2.612e−4 | 2.612e−4 | 18.90 | 19.53 | 19.53 | 1897 | 1900 | 1900 |
| 0.0316 | 4.828e−4 | 4.827e−4 | 4.827e−4 | 2.645e−4 | 2.645e−4 | 2.645e−4 | 18.95 | 19.54 | 19.54 | 1916 | 1917 | 1917 |
| 0.0318 | 3.018e−4 | 3.013e−4 | 3.013e−4 | 1.955e−4 | 1.955e−4 | 1.955e−4 | 19.06 | 19.65 | 19.65 | 1911 | 1913 | 1913 |
| 0.0320 | 4.214e−4 | 4.214e−4 | 4.214e−4 | 1.781e−4 | 1.781e−4 | 1.781e−4 | 18.91 | 19.49 | 19.49 | 1847 | 1848 | 1848 |
| 0.0322 | 2.842e−4 | 2.842e−4 | 2.842e−4 | 1.702e−4 | 1.702e−4 | 1.702e−4 | 18.89 | 19.45 | 19.45 | 1894 | 1895 | 1895 |
| 0.0324 | 5.213e−4 | 5.495e−4 | 5.495e−4 | 2.968e−4 | 3.020e−4 | 3.020e−4 | 18.91 | 19.58 | 19.71 | 1859 | 1865 | 1866 |
| 0.0326 | 4.091e−4 | 4.033e−4 | 4.033e−4 | 2.323e−4 | 2.315e−4 | 2.315e−4 | 18.96 | 19.51 | 19.51 | 1890 | 1893 | 1893 |
| 0.0328 | 2.299e−4 | 2.289e−4 | 2.289e−4 | 1.363e−4 | 1.363e−4 | 1.363e−4 | 18.87 | 19.46 | 19.46 | 1921 | 1922 | 1922 |
| 0.0330 | 2.057e−4 | 2.160e−4 | 2.161e−4 | 9.435e−5 | 9.450e−5 | 9.450e−5 | 18.89 | 19.52 | 19.64 | 1873 | 1875 | 1875 |
| 0.0332 | 6.192e−4 | 6.439e−4 | 6.439e−4 | 3.537e−4 | 3.357e−4 | 3.537e−4 | 19.37 | 20.04 | 20.04 | 1849 | 1853 | 1853 |
| 0.0334 | 1.240e−4 | 1.240e−4 | 1.240e−4 | 7.241e−5 | 7.241e−5 | 7.241e−5 | 18.79 | 18.79 | 18.79 | 1867 | 1867 | 1867 |

TABLE 12

Noise factor impact: nodes = 3969, anchors = 400, radius = 0.0334, sub_size = 5

| noise factor | Error 10 | Error 11 | Error 12 | 95% Error 10 | 95% Error 11 | 95% Error 12 | Time 10 | Time 11 | Time 12 | SDP's 10 | SDP's 11 | SDP's 12 |
|---|---|---|---|---|---|---|---|---|---|---|---|---|
| 0.01 | 9.60e−4 | 9.59e−4 | 9.59e−4 | 1.90e−6 | 3.18e−4 | 3.16e−4 | 20.36 | 21.18 | 21.20 | 1622 | 1623 | 1623 |
| 0.05 | 3.15e−3 | 8.33e−3 | 8.35e−3 | 3.16e−4 | 3.57e−3 | 3.57e−3 | 21.56 | 21.75 | 21.86 | 1479 | 1253 | 1256 |
| 0.10 | 6.37e−3 | 7.36e−3 | 1.03e−2 | 1.91e−3 | 5.17e−3 | 6.95e−3 | 21.46 | 24.73 | 22.94 | 1447 | 1592 | 1230 |
| 0.20 | 1.55e−2 | 1.57e−2 | 1.65e−2 | 4.95e−3 | 1.16e−2 | 1.25e−2 | 21.55 | 25.67 | 23.83 | 1208 | 1433 | 1390 |
| 0.30 | 1.51e−2 | 1.48e−2 | 1.46e−2 | 1.17e−2 | 1.27e−2 | 1.24e−2 | 21.09 | 29.76 | 31.78 | 1411 | 1829 | 1844 |
| 0.40 | 1.98e−2 | 1.79e−2 | 1.79e−2 | 1.32e−2 | 1.57e−2 | 1.57e−2 | 21.30 | 32.05 | 35.15 | 1523 | 19$$ | 2073 |
| 0.50 | 3.05e−2 | 2.35e−2 | 2.28e−2 | 2.86e−2 | 2.16e−2 | 2.08e−2 | 22.07 | 35.27 | 39.26 | 1608 | 2157 | 2252 |

TABLE 13

Number of anchors impact: nodes = 3969, radius = 0.0334, no noise, sub_size = 5

| Anchors | Error 10 | Error 11, 12 | 95% Error 10 | 95% Error 11, 12 | Time 10 | Time 11, 12 | SDP's 10 | SDP's 11, 12 |
|---|---|---|---|---|---|---|---|---|
| 40 | 1.052e−3 | 1.052e−3 | 8.408e−4 | 8.409e−4 | 19.30 | 19.88 | 1908 | 1958 |
| 50 | 1.109e−3 | 1.128e−3 | 7.748e−4 | 7.745e−4 | 19.38 | 20.15 | 1861 | 1865 |
| 100 | 8.782e−4 | 7.280e−4 | 5.337e−4 | 5.115e−4 | 19.16 | 19.96 | 1870 | 1872 |
| 150 | 2.716e−4 | 2.717e−4 | 1.025e−4 | 1.025e−4 | 18.86 | 19.60 | 1806 | 1808 |
| 200 | 4.889e−5 | 4.872e−5 | 1.473e−5 | 1.473e−5 | 18.77 | 19.52 | 1795 | 1796 |
| 250 | 1.716e−5 | 1.699e−5 | 7.760e−6 | 7.760e−6 | 18.55 | 19.32 | 1748 | 1749 |
| 300 | 1.538e−5 | 1.521e−5 | 4.408e−6 | 4.408e−6 | 18.20 | 18.99 | 1750 | 1751 |
| 350 | 7.533e−6 | 7.365e−6 | 2.858e−6 | 2.858e−6 | 18.13 | 18.93 | 1684 | 1685 |
| 400 | 6.383e−6 | 6.215e−6 | 1.841e−6 | 1.841e−6 | 18.16 | 18.96 | 1560 | 1591 |

TABLE 14

Moving sensor performance: 10% moving sensors

| Nodes | Moving | Anchors | radius | sub_size | Error | Time (sec) |
|---|---|---|---|---|---|---|
| 49 | 5 | 7 | 0.3412 | 3 | 1.7e−4 | 0.011 |
| 100 | 10 | 10 | 0.2275 | 3 | 2.1e−8 | 0.020 |
| 225 | 20 | 15 | 0.1462 | 3 | 1.1e−8 | 0.039 |
| 529 | 50 | 23 | 0.0931 | 3 | 2.4e−8 | 0.095 |
| 1089 | 100 | 33 | 0.0620 | 4 | 1.8e−6 | 0.190 |
| 2025 | 200 | 45 | 0.0451 | 4 | 2.8e−5 | 0.426 |
| 3969 | 400 | 63 | 0.0330 | 5 | 7.2e−6 | 0.778 |

TABLE 15

Effect of # of moving sensors: Anchors = 63, radius = 0.033, subproblem_size = 9, no noise

| Nodes | Moving | sub_size | Error | Outliers | Time (sec) |
|---|---|---|---|---|---|
| 3969 | 1 | 3 | 6.99e−8 | 0 | 0.0080 |
| 3969 | 5 | 3 | 4.31e−8 | 0 | 0.0185 |
| 3969 | 10 | 3 | 8.59e−8 | 0 | 0.0305 |
| 3969 | 20 | 3 | 4.70e−8 | 0 | 0.0476 |
| 3969 | 30 | 3 | 7.09e−8 | 0 | 0.0666 |
| 3969 | 40 | 3 | 1.28e−7 | 0 | 0.0872 |
| 3969 | 50 | 3 | 7.83e−8 | 0 | 0.1037 |
| 3969 | 100 | 4 | 7.26e−8 | 0 | 0.2002 |
| 3969 | 200 | 4 | 7.94e−8 | 0 | 0.3956 |
| 3969 | 300 | 4 | 8.04e−8 | 0 | 0.5758 |
| 3969 | 400 | 5 | 1.69e−7 | 0 | 0.7782 |
| 3969 | 500 | 5 | 5.53e−6 | 0 | 0.9615 |
| 3969 | 600 | 5 | 2.56e−5 | 0 | 1.1557 |
| 3969 | 700 | 5 | 1.97e−5 | 0 | 1.4315 |
| 3969 | 800 | 5 | 3.94e−5 | 0 | 1.6281 |
| 3969 | 900 | 5 | 6.51e−5 | 0 | 1.8387 |
| 3969 | 1000 | 5 | 8.81e−5 | 0 | 1.9545 |
| 3969 | 1200 | 7 | 1.61e−4 | 0 | 2.4104 |
| 3969 | 1250 | 7 | 3.01e−3 | 1 | 0.1357 |
| 3969 | 1400 | 7 | 3.01e−3 | 1 | 0.1522 |
| 3969 | 1500 | 7 | 3.04e−3 | 1 | 0.1628 |
| 3969 | 1600 | 7 | 3.06e−3 | 1 | 0.1723 |
| 3969 | 1800 | 7 | 3.33e−3 | 3 | 0.1974 |
| 3969 | 2000 | 7 | 3.54e−3 | 10 | 0.2203 |

TABLE 17

Number of 3-anchor clusters impact: 25 clusters, 4900 total nodes, 196 nodes in each cluster, radius 0.1, no noise

| 3-anchor clusters | No. of anchors | Total rankings | Sequential time | Per cluster time | Parallel time |
|---|---|---|---|---|---|
| 2 | 29 | 6 | 14.34 | 0.57 | 3.44 |
| 3 | 31 | 6 | 14.48 | 0.58 | 3.48 |
| 4 | 33 | 4 | 14.35 | 0.57 | 2.30 |
| 5 | 35 | 4 | 14.43 | 0.58 | 2.31 |
| 6 | 37 | 4 | 14.48 | 0.58 | 2.32 |
| 7 | 39 | 4 | 14.59 | 0.58 | 2.33 |
| 8 | 41 | 4 | 14.63 | 0.59 | 2.34 |
| 9 | 43 | 3 | 14.86 | 0.59 | 1.78 |
| 12 | 49 | 3 | 14.58 | 0.58 | 1.75 |
| 13 | 51 | 3 | 14.80 | 0.59 | 1.78 |
| 17 | 59 | 3 | 14.87 | 0.59 | 1.78 |
| 20 | 65 | 3 | 14.66 | 0.59 | 1.76 |

TABLE 18

Node density impact with number of clusters = 25, number of 3-anchor clusters = 8, radius = 0.100; noise_factor = 0

| Total nodes | Nodes per cluster | Sequential time | Per cluster time | Parallel time |
|---|---|---|---|---|
| 400 | 4 * 4(16) | 0.76 | 0.03 | 0.12 |
| 625 | 5 * 5(25) | 1.37 | 0.05 | 0.22 |
| 1225 | 7 * 7(49) | 2.92 | 0.12 | 0.47 |
| 2025 | 9 * 9(81) | 5.07 | 0.20 | 0.81 |
| 3025 | 11 * 11(121) | 8.22 | 0.33 | 1.32 |
| 4225 | 13 * 13(169) | 12.86 | 0.51 | 2.06 |
| 4900 | 14 * 14(196) | 15.13 | 0.61 | 2.42 |
| 5625 | 15 * 15(225) | 18.78 | 0.75 | 3.00 |
| 6400 | 16 * 16(256) | 22.79 | 0.91 | 3.65 |
| 7225 | 17 * 17(289) | 29.01 | 1.16 | 4.64 |
| 8100 | 18 * 18(324) | 34.45 | 1.38 | 5.51 |
| 9025 | 19 * 19(361) | 45.47 | 1.82 | 7.27 |
| 10000 | 20 * 20(400) | 55.03 | 2.20 | 8.80 |

TABLE 16

Number of moving sensors that can be tracked versus speed of movement: Anchors = 63, radius = 0.033, subproblem size = 9, no noise, speed in miles/hr, time in milliseconds

| | Speed | | | | | | | | | | | | |
|---|---|---|---|---|---|---|---|---|---|---|---|---|---|
| | 1 m Time | # | 2.5 m Time | # | 5 m Time | # | 10 m Time | # | 20 m Time | # | 50 m Time | # | 100 m Time | # |
| 2.24 | 100 | 520 | 250 | 1200 | 500 | — | 1000 | — | 2000 | — | 5000 | — | 10000 | — |
| 3 | 74.6 | 387 | 186 | 900 | 373 | — | 746 | — | 1492 | — | 3729 | — | 7458 | — |
| 5 | 44.7 | 231 | 112 | 577 | 224 | 1100 | 447 | — | 895 | — | 2237 | — | 4475 | — |
| 10 | 22.4 | 112 | 55.9 | 287 | 112 | 577 | 224 | 1100 | 447 | — | 1119 | — | 2237 | — |
| 20 | 11.2 | 56 | 28.0 | 141 | 55.9 | 287 | 112 | 577 | 224 | 1100 | 559 | — | 1119 | — |
| 40 | 5.59 | 24 | 14.0 | 68 | 28.0 | 141 | 55.9 | 287 | 112 | 577 | 280 | — | 559 | — |
| 60 | 3.73 | 14 | 9.32 | 43 | 18.6 | 89 | 37.3 | 189 | 74.6 | 387 | 186 | 900 | 373 | — |
| 80 | 2.80 | 8 | 6.99 | 31 | 14.0 | 68 | 28.0 | 141 | 55.9 | 287 | 140 | 650 | 280 | — |
| 100 | 2.24 | 7 | 5.59 | 24 | 11.2 | 56 | 22.4 | 112 | 44.7 | 231 | 112 | 577 | 224 | 1100 |
| 150 | 1.49 | 4 | 3.73 | 14 | 7.46 | 33 | 14.9 | 72 | 29.8 | 151 | 74.6 | 387 | 149 | 700 |
| 200 | 1.12 | 2 | 2.80 | 8 | 5.59 | 24 | 11.2 | 56 | 22.4 | 112 | 55.9 | 287 | 112 | 577 |
| 250 | 0.89 | 1 | 2.24 | 7 | 4.47 | 18 | 8.95 | 41 | 17.9 | 88 | 44.7 | 231 | 89.5 | 463 |
| 300 | 0.74 | 0 | 1.86 | 5 | 3.73 | 14 | 7.46 | 33 | 14.9 | 72 | 37.3 | 189 | 74.6 | 387 |
| 400 | 0.56 | 0 | 1.40 | 3 | 2.80 | 8 | 5.59 | 24 | 11.2 | 56 | 28.0 | 141 | 55.9 | 287 |
| 500 | 0.45 | 0 | 1.12 | 2 | 2.24 | 7 | 4.47 | 18 | 8.95 | 41 | 22.4 | 112 | 44.7 | 231 |
| 600 | 0.37 | 0 | 0.93 | 1 | 1.86 | 5 | 3.73 | 14 | 7.46 | 33 | 18.6 | 89 | 37.3 | 189 |

TABLE 19

Number of clusters impact with 256 nodes in each cluster; all 3-anchor clusters

| No of clusters | No of nodes | Radio range | Sequential time | Parallel time |
|---|---|---|---|---|
| 4 | 1024 | 0.2500 | 3.17 | 0.79 |
| 9 | 2304 | 0.1670 | 7.62 | 0.85 |
| 16 | 4096 | 0.1250 | 13.91 | 0.87 |
| 25 | 6400 | 0.1000 | 22.31 | 0.89 |
| 36 | 9216 | 0.0833 | 32.97 | 0.92 |

TABLE 20

3D algorithm scalability

| Nodes | Anchors | radius | Sub_size | Time | SDPs |
|---|---|---|---|---|---|
| 27 | 9 | 1.0000 | 2 | 0.04 | 9 |
| 64 | 16 | 0.6667 | 2 | 0.20 | 24 |
| 125 | 25 | 0.5000 | 2 | 0.42 | 50 |
| 216 | 36 | 0.4000 | 2 | 0.76 | 90 |
| 512 | 64 | 0.2858 | 2 | 2.09 | 225 |
| 1000 | 100 | 0.2223 | 3 | 4.71 | 301 |
| 2197 | 169 | 0.1667 | 4 | 11.88 | 508 |
| 2744 | 196 | 0.1539 | 5 | 15.73 | 512 |
| 3375 | 225 | 0.1429 | 5 | 20.34 | 631 |
| 4096 | 256 | 0.1334 | 6 | 26.52 | 642 |
| 4913 | 289 | 0.1250 | 6 | 33.71 | 772 |
| 5832 | 324 | 0.1177 | 7 | 42.34 | 788 |
| 6859 | 361 | 0.1112 | 7 | 52.85 | 930 |
| 8000 | 400 | 0.1053 | 7 | 65.42 | 1087 |
| 9261 | 441 | 0.1010 | 7 | 81.61 | 1263 |
| 10648 | 484 | 0.0960 | 7 | 99.80 | 1455 |

The invention claimed is:

1. A computerized method for estimating locations of wireless sensors in a wireless sensor network, the method comprising the acts of:
    obtaining pair-wise distance measurements between a sensor whose location is unknown and an anchor sensor whose location is known and between sensors whose locations are unknown;
    formulating a subproblem to include a subset of anchor sensors whose locations are known and to further include a subset of sensors whose locations are unknown, including setting a maximum number of sensors to be included in the subset of sensors;
    determining a location of at least one of the sensors in the subset of sensors within a tolerable error by solving the subproblem using a semidefinite programming relaxation;
    classifying the at least one sensor whose location has been determined within a tolerable error as a new anchor sensor; and
    iteratively repeating the acts of formulating, determining, and classifying;
    wherein the act of formulating the subproblem comprises the acts of:
    selecting one or more sensors as candidates for the subset of sensors; and
    prioritizing each of the candidates based on a type of anchor sensor to which the candidate is relatively localized.

2. The method as claimed in claim 1, wherein the act of formulating the subproblem comprises the acts of:
    selecting one or more sensors as candidates for the subset of anchor sensors; and
    prioritizing each of the candidates based on shortness of the distance measurements.

3. The method as claimed in claim 1, wherein the sensors are static.

4. The method as claimed in claim 1, wherein the sensors are located within a two-dimensional space.

5. The method as claimed in claim 1, wherein the wireless sensor network comprises at least 1,000 sensors.

6. The method as claimed in claim 1, wherein the wireless sensor network comprises at least 10,000 sensors.

7. The method as claimed in claim 1, wherein the act of determining a location of at least one of the sensors in the subset of sensors by solving the subproblem using the semidefinite programming relaxation comprises solving the following model:

$$\text{minimize} \sum_{(i,j) \in N_1} (\alpha_{ij}^+ + \alpha_{ij}^-) + \sum_{(i,k) \in N_2} (\alpha_{ik}^+ + \alpha_{ik}^-)$$

$$\text{subject to } diag(A_I^T Z A_I) = b_I,$$

$$\begin{pmatrix} e_{ij} \\ 0 \end{pmatrix}^T Z \begin{pmatrix} e_{ij} \\ 0 \end{pmatrix} - \alpha_{ij}^+ + \alpha_{ij}^- = (\hat{d}_{ij})^2 \forall (i,j) \in N_1,$$

$$\begin{pmatrix} e_i \\ -a_k \end{pmatrix}^T Z \begin{pmatrix} e_i \\ -a_k \end{pmatrix} - \alpha_{ij}^+ + \alpha_{ij}^- = (\hat{d}_{ik})^2 \forall (i,k) \in N_2,$$

$$\begin{pmatrix} e_{ij} \\ 0 \end{pmatrix}^T Z \begin{pmatrix} e_{ij} \\ 0 \end{pmatrix} \geq r_{ij}^2 \forall (i,j) \in \overline{N}_1,$$

$$\begin{pmatrix} e_i \\ -a_k \end{pmatrix}^T Z \begin{pmatrix} e_i \\ -a_k \end{pmatrix} \geq r_{ik}^2 \forall (i,k) \in \overline{N}_2,$$

$$Z \succeq 0, \alpha_{ij}^+, \alpha_{ij}^-, \alpha_{ik}^+, \alpha_{ik}^- \geq 0,$$

$$i, j = 1, \ldots, s,$$

$$k = s+1, \ldots, n,$$

wherein s represents how many sensors have unknown locations;
wherein n represents how many total sensors are in the network;
wherein $X = (x_1 \ x_2 \ \ldots \ x_s)$ comprises a 2×s matrix to be determined;
wherein $\hat{d}_{ij}$ represents a distance measurement between sensor i whose location is unknown and sensor j whose location is unknown;
wherein $\hat{d}_{ik}$ represents a distance measurement between sensor i whose location is unknown and anchor sensor k whose location is known;
wherein $2n + n(n+1)/2$ pair-wise distance measurements exist;
wherein $N_1 = \{(i,j) \text{ with known } \hat{d}_{ij} \text{ and } i<j\}$;
wherein $\overline{N}_1 = \{(i,j) \text{ with unknown } \hat{d}_{ij} \text{ and } i<j\}$;
wherein $N_2 = \{(i,k) \text{ with known } \hat{d}_{ik}\}$;
wherein $\overline{N}_2 = \{(i,k) \text{ with unknown } \hat{d}_{ik}\}$;
wherein $a_{ij}$ represents a squared Euclidean distance $\|x_i - x_j\|^2$ from sensor i to sensor j;
wherein $r_{ij}$ represents the range within which sensor i and sensor j can detect each other;
wherein $r_{ik}$ represents the range within which sensor i and anchor sensor k can detect each other;
wherein $a_{ik}$ represents a difference between $(\hat{d}_{ik})^2$ and $\|x_i - a_k\|^2$ from sensor i to anchor sensor k;
wherein $e_{ij}$ comprises a zero column vector except for 1 in location i and −1 in location j, such that $\|x_i - x_j\|^2 = e_{ij}^T X^T X e_{ij}$;

wherein $e_{ij}$ comprises a zero column vector except for 1 in location i, such that $$\|x_i - a_k\|^2 = \begin{pmatrix} e_i \\ -a_j \end{pmatrix}^T (X\ I)^T (X\ I) \begin{pmatrix} e_i \\ -a_k \end{pmatrix};$$

wherein Y is defined to be $X^TX$;
wherein $$A_l = \begin{pmatrix} 0 & 0 & 0 \\ 1 & 0 & 1 \\ 0 & 1 & 1 \end{pmatrix};$$

wherein $$b_l = \begin{pmatrix} 1 \\ 1 \\ 2 \end{pmatrix};$$

wherein $$Z_1 \equiv \begin{pmatrix} Y & X^T \\ X & I \end{pmatrix} \succeq 0;$$

and
wherein the solution is given by $$\bar{Z} = \begin{pmatrix} \bar{Y} & \bar{X}^T \\ \bar{X} & I \end{pmatrix}.$$

8. The method as claimed in claim 1, wherein the act of determining a location of at least one of the sensors in the subset of sensors by solving the subproblem using the semidefinite programming relaxation comprises the act of:
if pair-wise distance measurements between one of the sensors and less than three anchor sensors are known, considering a location of a neighboring anchor sensor whose distance measurement to one of the other anchor sensors is known.

9. The method as claimed in claim 1, wherein the act of determining a location of at least one of the sensors in the subset of sensors by solving the subproblem using the semidefinite programming relaxation comprises the acts of:
if a first distance measurement between one of the sensors and a first anchor sensor is known, and a second distance measurement between said sensor and a second anchor sensor is unknown, considering a location of a neighboring anchor sensor whose distance measurement to the first anchor is known; and
locating said sensor at a middle point between two points at which a first circle representing a radio range of the first anchor sensor intersects with a second circle representing a radio range of the neighboring anchor sensor.

10. The method as claimed in claim 1, wherein at least one of the sensors is moving.

11. The method as claimed in claim 10, further comprising the acts of:
iteratively repeating the following acts at each tracking instant in a plurality of tracking instants:
identifying static sensors;
identifying dynamic sensors;
updating a distance matrix $\hat{d}$,
wherein $$\hat{d} = \begin{pmatrix} DIST11 & m\_distance \\ m\_distance^t & DIST22 \end{pmatrix};$$

wherein DIST11 represents an s by s matrix representing distance measurements among s dynamic sensors;
wherein m_distance represents an s by m matrix representing distance measurements among s dynamic sensors with m static sensors; and
wherein DIST22 represents an m by m matrix representing distance measurements among m static sensors;
formulating an updated subproblem model based on the static sensors, dynamic sensors, and updated $\hat{d}$; and
obtaining locations of the dynamic sensors by solving the updated subproblem.

12. The method as claimed in claim 10 wherein the act of identifying dynamic sensors comprises the act of:
detecting a distance change between two tracking instants.

13. The method as claimed in claim 1, further comprising the acts of:
partitioning the network into a plurality of clusters;
determining a priority for each of the clusters; and
determining locations of sensors in each of the clusters,
wherein clusters of different priorities are localized sequentially in order of priority, and wherein clusters of equal priorities are localized substantially in parallel.

14. The method as claimed in claim 13, wherein the act of determining a priority for each of the clusters is based on total number of anchor sensors in each cluster.

15. The method as claimed in claim 13, wherein the act of determining a priority for each of the clusters is based on priority for a neighboring cluster.

16. The method as claimed in claim 13, wherein the act of determining a priority for each of the clusters is based on total number of anchor sensors in each neighboring cluster.

17. The method as claimed in claim 13, wherein each sensor is included in only one cluster and wherein each cluster comprises a cluster head.

18. The method as claimed in claim 1, wherein the sensors are located within a three-dimensional space.

19. The method as claimed in claim 18, wherein the act of determining a location of at least one of the sensors in the subset of sensors by solving the subproblem using the semidefinite programming relaxation comprises the act of:
if pair-wise distance measurements between one of the sensors and less than four anchor sensors are known, considering a location of a neighboring anchor sensor whose distance measurement to one of the other anchor sensors is known.

20. A non-transitory computer readable medium containing computer instructions stored therein for causing a computer to for performing the method recited in claim 1.

* * * * *